US009049259B2

(12) United States Patent  (10) Patent No.: US 9,049,259 B2
Rathod  (45) Date of Patent: Jun. 2, 2015

(54) SYSTEM AND METHOD FOR DYNAMICALLY PROVIDING VISUAL ACTION OR ACTIVITY NEWS FEED

(75) Inventor: Yogesh Chunilal Rathod, Maharashtra (IN)

(73) Assignee: ONEPATONT SOFTWARE LIMITED, Mumbai, Maharashtra (IN)

( * ) Notice: Subject to any disclaimer, the term of this patent is extended or adjusted under 35 U.S.C. 154(b) by 0 days.

(21) Appl. No.: 13/264,370

(22) PCT Filed: May 25, 2011

(86) PCT No.: PCT/IN2011/000361
§ 371 (c)(1),
(2), (4) Date: Oct. 13, 2011

(87) PCT Pub. No.: WO2012/150602
PCT Pub. Date: Nov. 8, 2012

(65) Prior Publication Data
US 2014/0129942 A1    May 8, 2014

(30) Foreign Application Priority Data

May 3, 2011    (IN) .......................... 1369/MUM/2011

(51) Int. Cl.
G06F 17/30    (2006.01)
H04L 29/06    (2006.01)
H04N 21/442   (2011.01)
H04N 21/4788  (2011.01)
H04N 21/63    (2011.01)
G06Q 50/00    (2012.01)

(52) U.S. Cl.
CPC ........ *H04L 65/403* (2013.01); *H04N 21/44222* (2013.01); *H04N 21/4788* (2013.01); *H04N 21/632* (2013.01); *G06Q 50/01* (2013.01)

(58) Field of Classification Search
USPC .................. 707/608, 687, 705, 790, 813, 821
See application file for complete search history.

(56) References Cited

U.S. PATENT DOCUMENTS

| | | | |
|---|---|---|---|
| 2007/0033531 A1* | 2/2007 | Marsh ............................ | 715/738 |
| 2011/0202968 A1* | 8/2011 | Nurmi ............................... | 726/1 |
| 2012/0150997 A1* | 6/2012 | McClements, IV .......... | 709/217 |
| 2012/0159356 A1* | 6/2012 | Steelberg ....................... | 715/760 |
| 2013/0104070 A1* | 4/2013 | Blake et al. ................... | 715/777 |

* cited by examiner

Primary Examiner — Sana Al Hashemi

(57) ABSTRACT

The method of presenting and accessing visual, video, stream media or multimedia actions and activities feeds is described. A method includes monitoring, tracking, capturing & recording each user's sequences of a plurality of actions and activities with associate data and metadata from one or more sources based on one or more preferences, privacy settings and filtering of action or activity types, storing and processing each user's said plurality of actions and activities in a database in image frame(s), video, streaming media or multimedia data format with contextual, relevant and location & position specific one or more actions or activities items & associate data and metadata, generating visual, video, stream media or multimedia actions and activities feeds for one or more actions or activities for one or more determined receiving users based on one or more filters, preferences and privacy settings of sender(s) and/or receiver(s), dynamically presenting said visual or video actions and activities feeds from one or more sources or senders to one or more determined receiving or viewing users based on one or more filters, preferences and privacy settings of sender(s) and/or receiver(s), allowing viewing user to select, search, match, load, download, edit, filter, access, process and play, forward, backward, pause, stop said visual or video actions and activities feeds based on one or more preferences and settings, dynamically presenting current image frame(s), video, stream or multimedia data position specific or action or activity item(s) video clip specific one or more contextual, associate and relevant action or activity item(s) with associate data and metadata and allowing user to dynamically access said one or more presented dynamic, contextual, associate and relevant action or activity item(s) and associate data and metadata.

34 Claims, 18 Drawing Sheets

E.g. Select or Filter one or more Activities or Actions or status or log Types 7010

(Include theses actions in my action feed):

- ☑ Sharing Content or search results
- ☑ Collaborative Searching
- ☑ Questions
- ☑ Join Group(s)
- ☑ Create Group(s)
- ☑ Leave Group(s)
- ☑ Purchase Transaction
- ☑ Birth Day Event
- ☐ Sent Notification
- ☑ Installed Application
- ☑ Un-Installed Application
- ☐ Bookmarked Applications
- ☑ Edit Profile
- ☑ Add Photo(s)
- ☐ Add Comment
- ☑ New Service
- ☑ Subscribe Service
- ☑ Un-subscribe Service
- ☑ Like a video
- ☑ Comments on a video
- ☑ Subscribe to a channel
- ☑ Favorite a video
- ☑ Upload a video

Where do I share my activities, actions, status & logs? 7011
Automatically post my activities, actions, status & logs to:
You can subscribe to 20 more friends

What you are doing in following sources, external domains, applications & services: 7012

| [A] Action Date & Time (Chronological Order) | [B] [From] (i.e. Activity or Action item received from Subject User ID, Name & Profile Link) | [C] Action Taxonomy Classification (Categories or Type of Activity or Actions) | [D] Activity or Action related Messages or Details or Descriptions with [B] From (URL) + [C] Classification + [E] any Action Source(s) & namespace or URL(s) identifying action or status or activity or log related relevant & accessible objects like User, ID, Links, Media, Profiles, Pages, AI Agents, People, Utilities, Services, node(s), question, Applications, Data, Group, Name, Query, Multi media Content, Networks, Message with default user action | [F] Action related Attachments (Dynamically attaching any types of link(s) including one or more Informational, multi media or Active Links for accessing, participation and workflow) | [G] Action related Lists | [H] Action related shared and dynamic system or user created Workspace comprising one or more related actions, links, messages, tasks, dynamically attach applications or application features, services and users for collaboration, communication, searching, sharing, tracking, participating and workflow. (Active Link(s)) | [I] Action Service Source for accessing service or one or more features of service (Active Link(s)) | [J] Action related Utilities or tool(s) or Application(s) features (Dynamically attaching one or more related utilities, apps for participation and workflow (e.g. Join, Share, Download etc.) (Active Link(s)) | [K] Action Tracking Status or Status (Further monitoring of action (Loop) or Participation or use or to-do or view) | [L] Action related Communication Details (Query, give comment, rank, review, Report, keywords, further discussion, message and like) |
|---|---|---|---|---|---|---|---|---|---|---|
| 7015 | 7020 | 7025 | 7030 | 7035 | 7040 | 7045 | 7050 | 7055 | 7060 | 7065 |
| 7075 24-07-2010 (11:00 AM) | X <User Home Page or Profile URL> | Group -> Joins Group | [B] User X + [C] Joins Group + [E] "XYZ" | Join | - | Group "XYZ" (Join, Share) | Service "Group XYZ" (Join, Share) | Group Management (Join, Share) | Pending | Why you join this group? |
| 7076 24-07-2010 (11:30 AM) | Y <User Home Page or Profile URL> | User Log -> Profile -> Edited Profile | [B]User Y + [C] Changes Photo and E-mail address to + [E] abc@v.com | Download, Share, Print | Photo abc@v.com | Workspace Y (Share) | Y - Profile Management (Share) | Profile Management (Share Tool) (Download Utility) | Un-Read | - |
| 7077 25-07-2010 (01:00 PM) | Y <User Home Page or Profile URL> | Sharing -> Photos -> Added Photos | User Y add 3 photos related to Las Vegas travel | Travel Las Vegas Photos | Photo 1 Photo 2 Photo 3 | Workspace Y (Share) | My Photo Service (Share) | Photo Management (Share) | Viewed | Please give more details about Photos. |
| 7078 25-07-2010 (03:00 PM) | Z <User Home Page or Profile URL> | Applications & Services -> Installed Application | User Z + Installed Application + "Travel" (By clicking on "Travel" default associate user action is install said application) | Applications Manual | Related Applications | Workspace Z (Travel) | - | Application Management (Travel) | Pending | Any other similar applications. |
| 7079 26-07-2010 (10:30 PM) | X <User Home Page or Profile URL> | E-commerce & Transactions -> Purchase | User X Purchase "Brand WWW" | Products Presentations | Product A Product B | Workspace X (Brand WWW) | Brand WWW | E-commerce Management (Brand WWW) | Purchased or Subscribed | I also want to purchase the product. |
| 7080 26-07-2010 (10:45 AM) | Z <User Home Page or Profile URL> | Events -> Birthday Event | User Z invite you for Birthday party at "Hotel W" | Invitation Card | Invited Friends Lists | Workspace Z (Hotel W) | Hotel W | Event Management (Hotel W) (Message Manager) | Active | How many friends coming today? |
| 7081 27-07-2010 (11:00 AM) | Amita <User Home Page or Profile URL> | User Support Services -> Posts Question | Amita Posts Question "I need travel information for Las Vegas?" | Give Answer, Attached Video | - | Collaborative Answer (Answer Manager) (IM) | Question and Answer | Question and Answer (Answer Manager) (IM) | Answered | Please give your travel plan in detail. (Clarify) |

Figure 7

| Select communication Channels ▼ | | | | | |
|---|---|---|---|---|---|
| User Actions on Action Items ▼ | Sort ▼ | Filter ▼ | Search ▼ | Views ▼ | |

☑ Yogesh Rathod purchase <u>ABC</u> brand watch from <u>Super Mall</u>
  <u>Active Links:</u> (1) <u>Chat</u> (2) <u>IM</u> (3) <u>Deals</u> (4) <u>Map</u> (5) <u>Buy</u> (6) <u>Share</u>
  <u>User Actions:</u> (1) Amita Rathod buy's <u>ABC</u> from "<u>Smart Mall</u>" (2) <u>Chat with Yogesh Rathod</u> (3) <u>Bookmark</u>
  <u>Tracking Status:</u> (1) View (2) Chat (3) Buy
  Date & time: 10 minutes ago - Categories: Shopping, Watch - Location - New York City - <u>5 Comments</u>
  <u>Source(s) of Action(s):</u> Super Mall and ABC Mobile
  <u>Presented To:</u> (1) <u>Amita Rathod</u> (2) <u>Vijay Rathod</u>
  <u>Communication Details:</u> (1) <u>Chat communication details</u> (2) <u>Buying ABC transaction details</u> ∼9010

☐ Yogesh Rathod's current location is <u>New York City</u> ( <u>Super Mall</u> )
  <u>Active Links:</u> (1) <u>Chat</u> (2) <u>IM</u> (3) <u>Photos</u> (4) <u>Map</u>
  <u>User Actions:</u> (1) <u>View Photos</u>
  <u>Tracking Status:</u> (1) View
  Date & time: 10 minutes ago - Categories: Shopping - Location - New York City - <u>5 Comments</u>
  <u>Source(s) of Action(s):</u> ABC Mobile
  <u>Presented To:</u> (1) <u>Amita Rathod</u>
  <u>Communication Details:</u> ∼9020

☐ Amita Rathod currently attending birth day of <u>aishwarya Rai</u> ( <u>Taj hotel, Mumbai</u> )
  <u>Active Links:</u> (1) <u>Chat</u> (2) <u>IM</u> (3) <u>Photos</u> (4) <u>Map</u> (5) <u>Buy Virtual Gifts or Greeting Cards</u>
  <u>User Actions:</u> (1) I gave gift to <u>aishwarya Rai</u> (2) <u>View Photos</u>
  <u>Tracking Status:</u> (1) Birthday party attended
  Date & time: 10 minutes ago - Categories: Birth day, party, events - Location - Mumbai - <u>5 Comments</u>
  <u>Source(s) of Action(s):</u> Taj hotel, Mumbai
  <u>Presented To:</u> (1) <u>Yogesh Rathod</u>
  <u>Communication Details:</u> ∼9030

☐ BMW Car of <u>Yogesh Rathod's</u> current location is <u>New York City</u> ( <u>Times Square</u> )
BMW Car<u>User Actions:</u>
  <u>Active Links:</u> (1) <u>Chat</u> (2) <u>IM</u> (3) <u>Photos</u> (4) <u>Map</u>
  <u>Tracking Status:</u> (1) Pending
  Date & time: 10 minutes ago - Categories: Shopping - Location - New York City - <u>5 Comments</u>
  <u>Source(s) of Action(s):</u> BMW Car
  <u>Presented To:</u> (1) <u>Amita Rathod</u> (2) <u>Ankit Rathod</u>
  <u>Communication Details:</u> ∼9040

Figure 9

Select communication Channels ▼ ☐ 10045

User Actions on Action Items ▼ ☐ 10050  |Sort ▼|Filter ▼|Search ▼|Views ▼ 10055

10000

☑ Yogesh Rathod takes photos via mobile (ABC) from New York City
Active Links: (1) Photos (2) Add Photos in Album (3) Share (4) Comments (5) Rank (6) Chat
User Actions:(1) View Photos (2) Add Photos in Album (3) Share with Pooja Rathod
Tracking Status: (1) View (2) Add photo (3) share photos
Date & time: 10 minutes ago - Categories: Photos, Travel - Location - New York City - 5 Comments
Source(s) of Action(s): Mobile (ABC)
Presented To: (1) Amita Rathod
Communication Details:
10010

☑ Yogesh Rathod communicate with Amita Rathod via mobile (ABC) from New York City
Active Links: (1) Communication Details (2) Calendar (3) Chat (4) IM (5) Photos
User Actions: (1) Listen Communication (2) Read transcript
Tracking Status: (1) Communicate with Amita Rathod
Date & time: 10 minutes ago - Categories: Shopping - Location - New York City - 5 Comments
Source(s) of Action(s): Mobile (ABC) of Yogesh Rathod and Mobile (ABC) of Amita Rathod
Presented To: (1) Yogesh Rathod (2) Amita Ratrhod
Communication Details: (1) Recorded Call (2) Transcript of communication
10020

☐ Yogesh Rathod is currently available for answering question or providing services
Active Links: (1) Chat (2) IM (3) Answers (4) Services (5) Workspace(s)
User Actions: (1) Answers 20 questions (2)
Tracking Status: (1) Available for providing answer(s) of questions
Date & time: 10 minutes ago - Categories: user service, answers - Location - NYC - 5 Comments
Source(s) of Action(s): Action Server.com
Presented To: Public
Communication Details: (1) 20 Questions and Answer(s)
10030

☐ BMW Car of Yogesh Rathod is currently available in New York City ( Times Square )
BMW Car Active Links: (1) Chat (2) IM (3) Book Car (4) Map
BMW Car User Actions: (1) Book Car for 1 hour
Tracking Status: (1) Driving
Date & time: 10 minutes ago - Categories: Shopping - Location - New York City - 5 Comments
Source(s) of Action(s): (1) BMW Car
Presented To: Public
Communication Details: (1) Car booking transaction details
10040

SYSTEM AND METHOD FOR DYNAMICALLY PROVIDING VISUAL ACTION OR ACTIVITY NEWS FEED

PRIORITY CLAIM

The present application is a national stage patent application under 35 U.S.C. §371 of International Patent Application No. PCT/IN2011/000361 filed May 25, 2011, which claims the benefit of Indian Patent Application No. 1369/MUM/2011, filed May 3, 2011, the disclosures of which are incorporated herein by reference in their entireties.

COPYRIGHTS INFORMATION

A portion of the disclosure of this patent document contains material that is subject to copyright protection. The copyright owner has no objection to the facsimile reproduction by anyone of the patent document or the patent disclosure, as it appears in the Patent and Trademark Office patent file, but otherwise reserves all copyright rights whatsoever. The applicant acknowledges the respective rights of various Intellectual property owners.

FIELD OF INVENTION

The present invention provides system, method, protocol, service, platform, and framework for dynamically monitoring, tracking, storing, determining, & processing user(s)' or any types of entities' physical or digital filtered activities, actions, interactions, responses, events, transactions, life stream, life stream, locations, behavior, movement, environment, status, states & conditions from one or more filtered sources and dynamically presenting said visual action or activity or status or log item(s) with dynamically attached active links to determined receivers, wherein said active links enables user to access action or activity or status or log item(s) specific functionalities including any types of application, service, accessing, processing functionalities, take one or more actions on action or activity or status or log item(s), communicate, collaborate, participate, provide services & responses, workflow and any types of application, service functionalities. The present invention further provides system, method, protocol, service, platform, and framework for customized, contextual, dynamic & unified communication.

CROSS-REFERENCE TO RELATED APPLICATION

The present application incorporates by reference U.S. Pat. No. 7,991,764, titled: "Method and system for communication, publishing, searching, sharing and dynamically providing a Journal Feed", U.S. patent application Ser. No. 12/973,370, titled: "A System and method for publishing, communication and real time searching", U.S. patent application Ser. No. 12/973,370, U.S. patent application Ser. No. 12/975,036, titled: "A method and system for integrated online communication and collaboration", U.S. patent application Ser. No. 12/973,387, titled: "A method & system for publishing and subscribing in social network", U.S. patent application Ser. No. 12/847,840, titled: "A system and method of targeting advertisements and providing advertisements management", U.S. patent application Ser. No. 12/954,564, titled: "a method and systems for brands social networks", U.S. patent application Ser. No. 12/847,861, titled: "A System and Method for accessing applications for social networking and communication in plurality of networks", U.S. patent application Ser. No. 13/015,224, titled: "A System and Method for publishing, sharing and accessing selective contents in a Social Network", U.S. patent application Ser. No. 13/015,238, titled: "A System and Method for generating and updating information of connections between and among nodes of social network", U.S. patent application Ser. No. 13/045,489, titled: A system and method for communication, publishing, searching and sharing, PCT patent application No: PCT/IB2011/051318, titled: "A Method and System for Dynamically Publishing, Sharing, Communication and Subscribing", PCT patent application No: PCT/IB2011/051318, titled: "A Method and System for Customized, Contextual, Dynamic & Unified Communication, Zero Click Advertisement, Dynamic E-Commerce and Prospective Customers Search Engine", U.S. application Ser. No. 13/001,785, titled: "A system and method for social networking for managing multidimensional life stream related active note(s)", India patent application No: 1174/MUM/2011, titled: "A system and method for O-Mail or omnipresent communication, 0-Mail address, O-Mail service, O-Mail client, O-Mail Server, network, platform and pin point communication protocol (PPP)", India patent application No: 868/MUM/2011, titled: "A system and method for managing, monitoring, tracking, updating, measuring and facilitate in maintaining user status & state"

BACKGROUND OF THE INVENTION

Conventionally, user can manually provide information about one or more activities, actions, interactions, responses, events, transactions, life stream, life stream, locations, behavior, movement, environment, status, states & conditions to other connected or related users via social networking web sites, mobile device, applications, email and other communication channels. For example a user may post information about brands purchased or like from particular mall or shop, create a group, install application, a user takes photos via mobile and share with connected users.

Recently, social networking web sites have provides digital action feed functionalities to users of social network which automatically monitors, records and generates user's actions, events, transactions, life stream, life stream, & activities and send to connected or determined other users of social network.

Typically, however, these mechanisms monitors, records, generates and provides read only digital action & activities of user to other connected or related users of social network. What is needed is dynamically monitoring, tracking, storing, recording, determining, automatically generating & processing each user's or any types of entities' one or more filtered physical or digital activities, actions, interactions, responses, events, transactions, life stream, life stream, locations, behavior, movement, environment, status, states & conditions from one or more filtered sources and dynamically presenting said action or activity or status or log item(s) with dynamically attached active links to determined receivers, wherein said active links enables user to access action item specific functionalities including any types of application, service, accessing, processing functionalities, take one or more actions on action item, communicate, collaborate, participate with sender, provide services & responses, workflow.

Present invention provides interactive video or multimedia action & activity feed to users for fast viewing & accessing of plurality of connected or related users' specific plurality of news or actions and activities items in user friendly manner.

Therefore, it is with respect to these considerations and others that the present invention has been made.

OBJECT OF THE INVENTION

The principal object of the present invention is to dynamically monitoring, tracking, storing, filtering, recording, determining, automatically generating & processing each user's or any types of entities' one or more types of physical or digital activities, actions, interactions, responses, events, transactions, life stream, life stream, locations, behavior, movement, environment, status, states & conditions from one or more filtered sources and dynamically presenting said generated action or activity or status or log item(s) with dynamically attached active links to determined receivers, wherein said active links enables receivers to access action item specific functionalities including any types of application, service, accessing, processing functionalities, take one or more actions on action item, communicate, collaborate, participate with sender, provide services & responses and workflow.

Another significant objective of the present invention is to provide customized, contextual, dynamic & unified communication and dynamically or automatically or manually associate or attach or link one or more identified active links which are controlled by user and exist in social network with message and sent to determined target users, wherein said active link(s) with message enables receiving user to sell, purchase, transact, participate with same activities as sender user, communicate, collaborate, workflow with sender user, provide response, take one or more actions, access in any manner in an integrated, dynamic and unified manner.

Another significant objective of the present invention is to providing or presenting visual or video news or journal feed or Activity or Action or Status or Log Feed to viewing users based on monitoring, tracking, recording, filtering, processing, and storing of each user's one or more actions, activities, events, transactions, status, and log. System records user's sequences of actions in video or multimedia data format with action associate accessible objects, date & time, categories, source user's link, dynamic and contextual active links and application features. Source user can edit process & filter said actions, activities, events, transactions, status, log recording and determine receivers of said video news or journal feed or Activity or Action or Status or Log Feed based on selecting one or more connected or related or matched users or subscribers or target receivers. Viewing or receiving users of said video or visual news or journal feed or Activity or Action or Status or Log Feed can view, play, forward, backward, stop and navigate video and system dynamically present current video position specific contextual and relevant news or journal items or Activity or Action or Status or Log item to viewing users in text format with accessible active links and objects.

DETAIL DESCRIPTION OF THE PREFERRED EMBODIMENT

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "receiving" shared contents, user services, user actions, data items, updates, request, response, or other message, from a device or component includes receiving the message indirectly, such as when forwarded by one or more other devices or components. Similarly, "sending" an item, shared contents, user services, user actions, data items, updates, request, response, or other message to a device or component includes sending the item indirectly, such as when forwarded by one or more other devices or components.

As used herein, the term "client application" refers to an application that runs on a client computing device. A client application may be written in one or more of a variety of languages, such as 'C', 'C++', 'C#', 'J2ME', Java, ASP.Net, VB.Net and the like. Browsers, email clients, text messaging clients, calendars, and games are examples of client applications. A mobile client application refers to a client application that runs on a mobile device.

As used herein, the term "network application" refers to a computer-based application that communicates, directly or indirectly, with at least one other component across a network. Web sites, email servers, messaging servers, and game servers are examples of network applications.

Briefly stated, the present invention is directed towards providing system, method, protocol, service, platform, and framework for dynamically monitoring, recording, processing, attaching dynamic, contextual & accessible active links & presenting of physical or digital activities, actions, locations, logs, life stream, behavior & status.

Moreover, the present invention makes use of the following terms, definitions, acronyms, and abbreviations for describing the invention:

User: Various entities may perform activities, actions, or assume particular roles. While typically, an entity may assume a single role, the invention is not so constrained, and an entity may also assume a plurality of roles or personae. Thus, within the present invention, a "User" is who have action or activity or status server or network account and send and receive activity, action, status & log feed to and from one or more other users, domains, applications, services, objects, networks, groups, web pages, databases, devices who are identified or registered with system, a "User" is source or creator & receiver of activity, action, status & log feed, shared contents, profiles, provider & receiver of responses, user services & actions or "User" is "Provider User" of network or "Service Provider" or "User" is "Friends" of or "Connected"

to other user or "User" is enterprise user's administrator or "User is "Experts" or "User" is developer of the applications and services or "User" is advertiser or content partner and like. The terms "administrator" or "admin" refer to those entities whose primary role includes managing the one or more activity, action, status & log feed or items, shared contents, user services & actions, profiles, and/or updating resources, shared contents and actions, establishing the editorial workflows and/or creating accounts, and managing the multi domain communications. The terms "end-user," and "user" refer to those entities that may register for use of the activity, action, status & log feed enabled Social Network including Central Server or Platform or System or Network or Framework or any feature(s) or service(s) or application(s) or device(s), and typically provide "auto generated or manually provided or described contents regarding user's one or more activities, actions, status & logs". While an entity typically represents a person, the invention is not so limited and including one or more individuals, team or association, collaboration of one or more pre-identified individuals and one or more entities including but not limited to company, associations, organization, professional bodies, social bodies, shops, manufacturer, wholesaler, supplier, dealers and distributor, web site, portal, research agency, governmental bodies and enterprises or an entity that exists as a particular and discrete unit. Thus, an entity may include virtually any person, group of persons, businesses, organizations, or even a computing structure including a program, or the like. Intended user or groups of individual or volunteer or experts or service providers or any entity like company or organization can register with one or more profile(s) to the central server. User profile may comprise one or more expertise area of provider(s), service details, service type, keywords, taxonomies, ontology, rank, points, levels, payment details, availability timings, applications, services, subscribers, subscriptions, privacy settings, preferences, metadata, connections, and list of preferred external domains & associate users, connected users of users, applications, services, objects, devices, databases, groups, networks of external domains. Central server make said service profile(s) searchable for users for subscribing or selecting or matching said one or more provider(s) for receiving and updating shared contents, user services and actions.

Sender(s) and receiver(s)/responder(s) comprising digital sources including mobile, computer, video camera(s), RFID, touch screen, speech & text recognition system and automated sources, communication systems, imports from other systems, applications, services, devices and networks, multimedia content sources including image, video, file, extracts from video or voice, editor, wizard, search engine, survey, historical data, logs, sensor systems, multi Artificial Intelligence Agent(s), languages & translation system, speech or voice source(s) & paper forms, users of social network(s), human mind, experts, user's related groups, connected users, subscribers, 3rd parties and like minded users and one or more individuals, groups, collaboration of one or more pre-identified individuals comprising company, organization, professional and social bodies, web site, governmental bodies and enterprises, service providers, data and application providers and 3rd parties providers on behalf of animals, birds, non living things including tree, products, road, building, location, tourist place.

Life stream: Life stream comprising user related chronological stream of categories all digital resources provided & generated by user, connected users and auto generated, auto identified, auto detected, auto sensed user related resources based on user's activities, actions, events, current locations, transactions, extracted from recorded video, sensed by sensors. Life stream includes all categories action item(s) and associated one or more ranked responses & actions which are used or executed or best matched or preferred or selected or implemented or tried or liked or selected and satisfied to the user or selected & successfully implemented by user or choose, buy or purchase or subscribed by user including any branded or un-branded products and services, solve the user's problem(s), provides right direction or help to the user for any types of important action(s), activities, act(s), deed(s), behavior, steps, before doing, buying, subscribing, selecting, experimenting something, before going, traveling, migrating somewhere, how to do something, purpose, event, pursuit, search, match making, tracking, alerts, matter, affair, question, puzzle, doings, hobby, difficulty, trouble, struggle, decision, subject, topic, thing, problem, issue, interest, procedure(s), task(s), job(s), pastime, work(s), service(s), professional(s), occupation, business, manufacturing, processing, diversion change, alteration, transformation, shift, migration, career, goal, plan, project, target, consulting, situation, duty, mission, responsibility, function, construction, deal, transaction, arrangement, matter, operation, contract, undertaking, enterprise, scheme, development, exercises, assignment, obligation, industry, selling, marketing, production, company, firm, organization, establishment, news, travels, health, education, finance and like. Life stream covers all chronological users generated or created or provided or updated action item(s) with metadata including taxonomy categories, date & time, rank, review notes or comments and like.

Active Link(s): Active link is a link of one or more applications, services, objects, multi AI agents, multimedia data & contents, people, networks, groups, links or URLs, ID, user Profiles, profile objects, pages, attachments, informational links, shared workspaces which are available or invoked from networks and/or from external domains, applications, networks, services and devices with one or more associate data. User can create and update one or more categories lists of identified active links which are controlled by user and exist in and manage by social network based on user selection, uploaded by user, search & match, suggested & provided by connected & matched users, suggested list or auto generated by central unit based on user profiles, user data, user activities, recorded user's actions, past responses, interest, list of active links, list of active links of connected users, installed applications and provided by $3^{rd}$ parties developers, service providers and advertisers based on users privacy settings and preferences. Sender can search, select, identify and manually attach or auto attach one or more active links with said action item(s) or response of action item(s), wherein said one or more attached active links enables receivers and/or responders to provide one or more responses & actions, communicate, collaborate, answer, share, search, workflow, take one or more actions, transact, e-commerce, social networking and participating activities of sender of message. Associate data of active link comprising URL or namespace of each active link for identifying and allowing to access active link associate objects, applications, services, media data, people, entities, identities, profile, group, network, page & other objects of network, active link related one or more metadata, categories, keywords, sources, providers, details, descriptions, properties, links, attachments, features, upload, created & use date & time, help, identifier & profile(s) of sender & receiver of active link, active link associate tracking status & status, active link associate object related user data and preferences, security policies, authentication information and privacy settings of accessing & sharing active link and active link associate object(s) related user data.

User Actions: Central unit can identifying, storing, ranking, processing & presenting one or more user defined and system generated actions on each action item(s), related responses, communications, sharing, collaboration, searching and associate active links based on monitoring, recording, logging of user actions & activities and one or more filters & privacy settings with action date & time, action categories, user provided or auto recorded action related details, action related response & message, one or more action source(s) including people, applications, services, shared workspace, media data or contents, objects, groups, networks, pages, items, links and any action related identified objects from network and/or external domains, attachments, lists, tracking status, further communication details, ratings or ranks, comments and user provided and/or dynamically associated one more active links, services, objects, media data, shared workspaces and applications.

Custom commands & search syntax: User can use one or more or group(s) or combinations or series or sequence of custom commands & syntax or command templates or scripts with action item(s), response(s) of action item(s) and/or search operators and parameters for searching, matching, two way matching, selecting, filtering, subscribing, mapping, downloading, accessing, invoking, programming, book marking, attaching, detaching, assigning, federating, aggregating, integrating, distributing, collaborating & communicating, composing, comparing, co-coordinating, orchestrating, choreographing, organizing, recording, configuring or customizing, classifying & grouping, connecting, disconnecting, removing, adding, alternating or changing or modifying, updating, replicating or synchronizing, transacting, binding with 3rd party applications, networks, services & devices, routing or redirecting, forwarding, transferring, merging, joining, listing, linking, arranging, scheduling, automating, sequencing and ordering as per workflow & rule based, collecting, receiving, managing, monitoring, registering, accounting & metering, reporting, logging and executing one or more or group or combinations or series or sequences of action item(s), action item(s) senders, action item(s) receiver(s), action item(s) response providers, responses, communications, tracking status, metadata, actions on action item(s), action item(s) or response associate active links, active link related objects & objects data, contents from database(s) and service applications from plurality of sources via command scripting language and integrate with any $3^{rd}$ parties applications, services, devices and networks via web services, APIs, SDK, plug-ins, plug & play and any programming & scripting languages.

User can also use one or more or combinations of search Boolean operators including AND (+), OR, NOT (−), Phrases, multiple brackets for multiple inner searches, domain specific semantic and ontology syntax and parameters including one or more domain(s) list, action item(s) senders or providers list, action item(s) response providers list, service(s) name list, source(s) type, taxonomy categories or classification(s) or cluster(s) list, service type(s) including free or paid or sponsored, preferences including bookmark or save results or export results, rank & hits range, data range, language(s) list, location(s) list, safe search, two way match making preferences, set number of results per page & search up to number of depth(s) of sources, apply one or more filter(s) including ALL, EXACT, ANY, NONE words and one or more or combination of sorting type(s) including ascending & descending order, rank wise, category wise, date & time wise, hit wise, location wise, language wise, availability status wise, price wise (free or paid) with one or more search or command syntax string(s).

User can also concurrently searching for one or more or multiple search string(s) of one or more or multiple fields or categories or taxonomy classifications or clusters and each search results presented in one or more pages via categories tabbed interfaces and each result of each said search results comprising source URL or profile link, full or partial or abstract of contents, messages, action item(s), responses of action item(s), resource, data, source details & URL, category, date & time, ranks & reviews, hit statistics, online status, subscription status, metadata & properties and sorting as per date & time, source, rank, hits, location, language, status and ascending & descending order and presenting individually or in one or more categories group or filtering and user can select one or more search result of said one or more search results related to said one or more search strings and take one or more group actions on said selected one or more search result(s) including bookmarking, filtering, comparing, sorting & ordering, saving, subscribing, un-subscribing, inviting for subscriptions, blocking sources, send messages.

Taxonomy wise action or activity or status or log item(s) Project Management: User can use project management and workspace for managing plurality of action or activity or status or log item(s), active link(s), responses, communications, messaging with plurality of known as well as unknown receiver and/or responder of action item(s) for communication, collaboration, workflow, responses, taking one or more actions on action item(s) including searching, matching, book marking, subscribing, attaching, detaching, assigning, federating, planning, aggregating, integrating, distributing, collaborating & communicating, composing, comparing, co-coordinating, orchestrating, classifying & grouping, connecting, disconnecting, removing, adding, alternating or changing or modifying, testing or trialing, updating & upgrading, replicating or synchronizing, transacting, ranking & grading, analyzing, invoking, mapping, binding with $3^{rd}$ party applications, networks, services & devices, filtering, routing or redirecting, forwarding, transferring, merging, joining, listing, linking, arranging, scheduling, automating, sequencing and ordering as per workflow & rule based, choreographing, organizing, recording, configuring or customizing, collecting, receiving, selecting, assigning, managing or administrating, monitoring, programming, registering, certifying, accounting & metering, reporting, logging and subscribing plurality of action item(s), action item(s) senders, action item(s) receivers and/or responders, response providers or service providers, responses of action item(s) and said project management and workspace & workflow works in multiple users & accounts, multiple messaging to multiple users, multiple remote users, multiple roles or rights & privileges, multiple members, multiple administrators levels, multiple communication clients or applications or services or networks or devices, multiple communication & collaboration channels, multiple scaling and multiple interface styles modes.

Action or Activity or Status or log items: any types of auto generated and/or manually described actions or activity or status or logs or records based on one or more types of physical or digital activities, actions, interactions, communications, responses, events, transactions, life stream, logs, locations, behavior, movement, environment, status, states & conditions from one or more sources.

User status type: User status type comprising user's all categories activities of life or life cycle related status. User comprising individual and status comprising all activities related to human including one or more categories of education, health, food, life style, training, job, business, travel, entertainment. User comprising any entities like company and status comprising all employees related status, workflow status, earning status, advertising & marketing status, status of office, status of furniture, each department's status, market status, development status, sales status, and like. User comprising college and status comprising status of each student of each class, education status, extra activities status, skill status, student job status, student travel status, student food status, student campus status, student supplies (stationery, books, uniforms) status. User comprising any entity of world including individual, groups of individual, organization, company, government, tourist places, city, tree, building, road, mountain, forest, environment, animals, birds and status of user comprising any types of user related categories activities, actions, events, transactions, location, relations, connections, interactions, behavior, engagement, process, workflow, life cycle, steps, procedures, environment, development, growth, stages, phase, manners which require support, help, resources, knowledge, information, guidance, transaction support, training, consultancy, match making, workflow, task fulfillment, management, search, sharing, learning, supplying, facilitating, maintaining, protection, directions, services, entertaining, marketing, advertising, food, power, finance.

Provider(s): Resources are provided by one or more providers based on one or more one or more physical or digital activities, actions, interactions, communications, responses, events, transactions, life stream, logs, locations, behavior, movement, environment, status, states & conditions types specific one or more action or activity or status or log items submit or sent or publish or advertise or broadcast or updates by user and from public or shared or selected life stream resources. Resources comprising any types of resources contributed or shared or provided by one or more providers individually or collaboratively including multiple angles of viewpoints, information, knowledge, help like finance or money or physical resources, resources related to any types of status data items including actions, activities, acts, work, task, job, order, promotion, loan or financing, e-commerce, shopping, supplies, development, production, contract, business process, knowledge process, information process, procedure, assignment, solution for problem, need, requirement, goal, target, enquiry, tracking, follow-up, presentation, sales, marketing, advertising by providing support, help, answer, feedback, reference, experience, guess, logic, consulting & advising, survey, research, analysis, data mining & processing, review, comments, ranking, guidance, opinions, decision making, comparing, planning, suggestions, tips, tricks, education, learning, training, tutoring, testing, collection, organizing, projection, referring, agent or mediation, support services, discussion, content authoring & management and like. Provider includes any individual or person or administrator or any entity. While an entity typically represents a person, the invention is not so limited and including one or more individuals, team or association, collaboration of one or more pre-identified individuals and one or more entities including but not limited to company, associations, organization, professional bodies, social bodies, shops, manufacturer, wholesaler, supplier, dealers and distributor, web site, portal, research agency, governmental bodies and enterprises or an entity that exists as a particular and discrete unit. Thus, an entity may include virtually any person, group of persons, businesses, organizations, or even a computing structure including a program, or the like.

Activity Recognition: Activity recognition aims to recognize the actions and goals of one or more agents from a series of observations on the agents' actions and the environmental conditions. To understand activity recognition better, consider the following scenario. An elderly man wakes up at dawn in his small studio apartment, where he stays alone. He lights the stove to make a pot of tea, switches on the toaster oven, and takes some bread and jelly from the cupboard. After taking his morning medication, a computer-generated voice gently reminds him to turn off the toaster. Later that day, his daughter accesses a secure website where she scans a checklist, which was created by a sensor network in her father's apartment. She finds that her father is eating normally, taking his medicine on schedule, and continuing to manage his daily life on his own. That information puts her mind at ease. Due to its many-faceted nature, different fields may refer to activity recognition as plan recognition, goal recognition, intent recognition, behavior recognition, location estimation and location-based services.

Types of Activity Recognition

Sensor-based, single-user activity recognition: Sensor-based activity recognition integrates the emerging area of sensor networks with novel data mining and machine learning techniques to model a wide range of human activities. Mobile devices (e.g. smart phones) provide sufficient sensor data and calculation power to enable physical activity recognition to provide an estimation of the energy consumption during everyday life. Sensor-based activity recognition researchers believe that by empowering ubiquitous computers and sensors to monitor the behavior of agents (under consent), these computers will be better suited to act on our behalf.

Levels of sensor-based activity recognition: Sensor-based activity recognition is a challenging task due to the inherent noisy nature of the input. Thus, statistical modeling has been the main thrust in this direction in layers, where the recognition at several intermediate levels is conducted and connected. At the lowest level where the sensor data are collected, statistical learning concerns how to find the detailed locations of agents from the received signal data. At an intermediate level, statistical inference may be concerned about how to recognize individuals' activities from the inferred location sequences and environmental conditions at the lower levels. Furthermore, at the highest level a major concern is to find out the overall goal or sub goals of an agent from the activity sequences through a mixture of logical and statistical reasoning.

Sensor-based, multi-user activity recognition: Recognizing activities for multiple users using on-body sensors. Other sensor technology such as acceleration sensors were used for identifying group activity patterns during office scenarios.

Vision-based activity recognition: It is a very important and challenging problem to track and understand the behavior of agents through videos taken by various cameras. The primary technique employed is computer vision. Vision-based activity recognition has found many applications such as human-computer interaction, user interface design, robot learning, and surveillance, among others.

In vision-based activity recognition, a great deal of work has been done. Researchers have attempted a number of methods such as optical flow, Kalman filtering, hidden Markov models, etc., under different modalities such as single camera, stereo, and infrared. In addition, researchers have considered multiple aspects on this topic, including single pedestrian tracking, group tracking, and detecting dropped objects.

Levels of vision-based activity recognition: In vision-based activity recognition, the computational process is often divided into four steps, namely human detection, human tracking, human activity recognition and then a high-level activity evaluation Approaches of Activity Recognition:

Recognition through logic and reasoning: Logic-based approaches keep track of all logically consistent explanations of the observed actions. Thus, all possible and consistent plans or goals must be considered.

Activity recognition through probabilistic reasoning: Probability theory and statistical learning models are more recently applied in activity recognition to reason about actions, plans and goals.

Wi-Fi-Based Activity Recognition

Data Mining Based Approach to Activity Recognition

Plurality of physical action or activities recognition algorithm, research, systems, method, devise can apply or use or employ for identifying, recognizing various types of user or any entities including human, non-human, building, tree, device, machine, bird, group of humans related actions, status, environment, conditions, logs, transactions, events, interactions, and activities including human related like edits, touches, senses, motion, hear, view or see something, taste, experience, environment, reads, eat, drink, like, drive, walk, talk, think, feel, breathe, performance, interaction with people, object or anything, user status & conditions, attention, pick something, running, standing, setting, shopping, doing housework, dancing, singing, jump, fall, preparing dinner & lunch, listing to music, taking medications, watching, washing, bathing, dressing, cleaning, sleeping, resting, buying, selling and plurality of other human or group of humans or environment of human actions, activities, status.

Wireless sensor network (WSN) consists of spatially distributed autonomous sensors to monitor physical or environmental conditions, such as temperature, sound, vibration, pressure, motion or pollutants and to cooperatively pass their data through the network to a main location. The more modern networks are bi-directional, enabling also to control the activity of the sensors. Applications of wireless sensor network (WSN) are Area monitoring, Environmental monitoring, Air pollution monitoring, Forest fires detection, Greenhouse monitoring, Landslide detection, Industrial monitoring like Machine health monitoring, Water/wastewater monitoring, Landfill ground well level monitoring and pump counter, Fleet monitoring In an embodiment, presenting action, activity, status, log feed comprising:

monitoring & tracking user's one or more types of physical or digital activities, actions, interactions, communications, responses, events, transactions, life stream, logs, locations, behavior, movement, environment, status, states & conditions from one or more sources;

storing, recording & logging said one or more types of physical or digital activities, actions, interactions, communications, responses, events, transactions, life stream, logs, locations, behavior, movement, environment, status, states & conditions from one or more sources;

processing said one or more types of physical or digital activities, actions, interactions, communications, responses, events, transactions, life stream, logs, locations, behavior, movement, environment, status, states & conditions including dynamically or manually or automatically attaching one or more accessible active links, metadata & data;

manually or auto determining receivers by sender and/or central server unit for sending, publishing, updating & presenting logged one or more types of physical or digital activities, actions, interactions, communications, responses, events, transactions, life stream, logs, locations, behavior, movement, environment, status, states & conditions with one or more active links, metadata & data;

dynamically presenting said one or more types of physical or digital activities, actions, interactions, communications, responses, events, transactions, life stream, logs, locations, behavior, movement, environment, status, states & conditions with one or more active links, metadata & data to determined receivers; and allow to access said received or presented one or more types of physical or digital activities, actions, interactions, communications, responses, events, transactions, life stream, logs, locations, behavior, movement, environment, status, states & conditions specific one or more action or activity or status or log item(s) associate or attached one or more accessible active links, metadata & data.

In an embodiment, action source or user (sender or receiver) of action feed or action or activity or status or log item(s) comprising registered user, unregistered user, users of social network, connected or related users of user, group(s) of user, objects, animals, birds, tree, vehicles, machineries, fixture & furniture, building, structure or infrastructure, location, tourist places, non-living things, digital or automated sources & destinations, auto selection or extraction from user's life stream, auto extraction from video, auto identification, auto determination, auto detection and auto sense one or more action item(s) from one or more sources, applications, services, networks including communication networks, external networks, non-social networks, centralized or peer to peer networks, groups, devices, sensors, automations, communication systems, multi artificial intelligence agent(s), $3^{rd}$ parties web sites, applications, services, devices, sensors, databases, repositories, networks, other users on behalf of user including connected or related users, friends, family members, co-workers, classmates, sellers, teachers, doctors, lawyers, professionals, and any combination thereof.

In one embodiment, central unit maintains for each of plurality of users of network(s), a user account(s) including verified and/or anonymous or general, one or more public, private & shared profile(s) including one or more action or activity or status or log items provider and action or activity or status or log items responders' profiles & service profiles, preferences & privacy settings and set of connections with other users of the network(s), wherein allowing users to creating and updating connections list(s) based on contacts, invitations, finding people from internal or external networks, searching & matching, subscribers, book marks and match making preferences.

In one embodiment, user profile(s) comprising user name, unique identity (ID), profile link, details, descriptions, categories, keywords, types, taxonomies, metadata, location, age, preferences, metadata, presentation settings, subscribers & subscriptions, dynamic relationships or connections among said users and privacy settings.

In one embodiment, presenting one or more predefined or dynamically created categories or types of activities based on one or more preferences, privacy settings, behavior, filters, relevancy, rank, hits and rules including physical & digital activities, actions including physical & digital actions, events, transactions, life stream, locations, behavior, movement, motion, workflow, logs, tracking, monitoring, follow-ups, environment, status, states & conditions for user selections and filtrations for allowing system to monitor, track, process, determine receivers, generate, present, access one or more action categories or types specific action or activity or status or log item(s).

In one embodiment, one or more selectable filters include one or more types of action or activity or status or log items including one or more devices, mobile, telephone, video camera, printer, set top box, machine, RFID, printer, sensors, locations, condition type, applications, services, sources, connections, networks, groups, keywords, categories, multimedia content type including text, URL, video, image, file and database.

In one embodiment, monitoring & tracking user's one or more activities, actions, events, transactions, life stream, locations, behavior, facial expressions, emotions, movement, workflow, logs, follow-ups, environment, status & conditions based on one or more action or activity recognition research, algorithm, methods and systems, sensors, detectors, transducers, video cameras, audio recorders, imaging, RFID, barcodes, touch screens, devices including mobile, digital televisions, digital watch, digital pen, automations, scanners, robotics, computer system, computer chips or processors, instruments, speech & text recognition, video & face recognition, speech or voice sources, translating system, application, services, networks, logs, programming, and human mediated actions including analysis, logic, guess, selections, privacy settings, preferences, settings, inspection, checking, verification.

In an embodiment, monitoring, tracking activities, actions, events, transactions, life stream, locations, behavior, movement, workflow, status, states & conditions of user comprising monitoring, tracking from present network or social network, one or more external domains including web sites, portals, applications, services, networks, groups, devices, sensors, locations and out site of social network including monitoring, tracking, recording, storing, processing activities, actions, interactions, events, transactions, life stream, locations, behavior, movement, environment, status, states & conditions from physical worlds.

In an another embodiment, monitoring, tracking activities, actions, events, transactions, life stream, locations, behavior, movement, status, states & conditions based on preferences and privacy settings including preferences and privacy settings of sender, domain of sender, receiver(s), domain(s) of receiver(s), domain(s) where actions are monitored and tracked and any combination thereof.

In an another embodiment, actions, activities, status, logs are based on one or more applications, services, social & personal networks, interactions, events, transactions, manually or automatically monitored, tracked & recorded or generated log data, life stream data, user profile, searching, sharing, communication, collaboration, e-commerce, blog, messages, connected users of user, multimedia contents among one or more networks, physical interactions, behavior, events, motions, actions, activities and transactions with location, people, groups, place, machine, device, products and any entities.

In one embodiment, activities, actions, status & logs comprise user's actions, events, logs, transactions, interactions, behavior, motion, status, life stream including but not limited to adding a photo, editing a profile, posting a question and/or a blog, subscribing to a service, joining a network, installing an application, sharing content or search results, publishing or broadcasting, forming new relationships, interacting with other users, sending a notification or message, commenting, exchanging feedback, transacting via e-commerce.

In an another embodiment, activities or actions are based on physical activities, actions, interactions, events, transactions, life stream, locations, behavior, movement, environment, status, states & conditions including change of weather, physically visiting mall & physically shopping or buying or selling or like particular brands, products & services, detecting or identifying user location and all activities & actions related to that location, user status update, entering into particular location, appearing in some occasions like meeting, party, fair, library, hotel, viewing movie in particular cinema hall, sailing in boat or cruise, eating particular food in particular hotel, damage of particular goods & machines, vehicle ignores traffic signal, particular user or group(s) of users including human or individual(s) or machine is free or ideal or available for particular works or not available or busy, tasks and like or seat(s) of cinema or hotel room(s) are vacant or full, particular vehicles(s) in particular location(s) are free, attending lecture of class, playing sports, listing music, available in particular location, marketing products & services, taking photos via mobile or camera or device, call or communicate with somebody via mobile or phone, interacting with others, doing particular works or tasks or jobs, providing particular service(s), giving gifts to friends, praying in religious places, quarrel with others, others complaint of user or user complaint others, teacher teaches students, salesman displaying & marketing products & services, user mobile is not working or become old or outdated or damages, cook is preparing particular food, user is not well or unhealthy, user is hungry, user is tired, user is free, user is uncomfortable, doctor is available or not available, user viewing and experiencing something, waiter is not coming, status of user or task or work or process including not started, pending, completed, location, availability, status of tree(s) or building or vehicle or machinery or items or products including productivity, location, maintenance requirements, user spends money, user want to buy something or particular products, brands & services, user touch something, user consulting with doctor and any identified activities, actions, interactions, events, transactions, life stream, locations, behavior, movement, environment, status, states & conditions of user which helps user & others in any manner.

In one embodiment, dynamic, contextual, & accessible active links associated or attached with said action item enables sender(s) and/or receiver(s) to communicate, collaborate, edit, update, process, access, order, direct, consult, warning, alerts, notification, send something via courier, provide comments, assign jobs & tasks, provide alternative works or tasks to available users, fulfill workflow, provide service, purchase products & services, accept deals, negotiate with customers, guiding somebody, sharing photos, provide directions and location information, refer brands, products & services to connected users and allow them to buy products & services, teach how to play sports, prescribe medicines, share brands purchase or preferred or like by user, modify food prepared by cook as per customers requirements, send person for repairing, maintenance, training, helping, selling, preparing, guide based on user preferences, profile, interest, education, age and like, and takes any types of user actions.

In one embodiment, user can filter predetermined activities, actions, status & logs based on one or more criteria comprising selection of one or more connected or like minded or matched users, groups, networks, applications, keywords, locations, languages, devices, activities or actions types, searching, matching, predefined schedule, rules, categories, behavioral characteristics, random filtering of said activities, tracking of activities, preferences, subscription, ranks & hits, interactions, and privacy policies.

In another embodiment, said activities, actions, status & logs can be automatically selected by the central unit, wherein said selection is based on selections, searching, matching, connections, relationships, affinity, location, events, transactions, life stream, levels, preferences, contents, profiles, transactions, life stream, behavior, privacy settings, one or more filters, ranks, rules, relevancy and context, random.

In one embodiment, processing activities, actions, status & logs item(s) comprising, storing, updating, indexing, validating & formatting including editing, clarifying, update details, spell checking, language & spam detecting, translating, transcribing, converting to other formats like voice, text, associating priority types including high, normal, low, expiration, date & time, categories, keywords, locations, advertisements, payment information, profile data, URL, dynamically attaching or associating one or more action or activity or status or log item specific accessible active links, metadata & system data, determining one or more receivers of action item(s) and applying privacy settings of sender, sender's domain, receiver and receiver's domain, and dynamic presentation preferences.

In an embodiment, Action(s) or Activity or Status or Log item(s) or generated action or activity or status or log item(s) comprising user name, identity, profile link whose actions are monitored, tracked & recorded, action identity, action source(s) including web site, application, service, network, device, sensor, connected or related user, location and digital or automated sources, action date & time, action categories or types, action location(s), action details or descriptions, action associate one or more active links, action associate one or more identified objects, applications, services, people, groups, networks, action related one or more lists, attachments, multimedia content types including text, video, audio, image, file, application, service, URL or links, conditions, rules, structured list, action associate metadata including categories, keywords, ontology, taxonomies, system data, advertisement, privacy settings, preferences, one or more determined responders or receivers & profile object and identity of each determined responders or receivers, title or subject, sending priority types including high, normal, low, expiration date & time, sender user profile, location(s), language(s), size, source id, source profile(s), dynamically associated or attach one or more services, applications, links, utilities & shared workspace link(s) for participate in the same activity as the sending user, take related actions, sharing, searching, tracking, communication, collaboration, accessing information and workflow, action source related availability status, tracking status, responses, communications, logs.

In one embodiment, dynamically associate one or more active links are action item specific and enables receiver or viewing user to access one or more applications, services, objects, multi AI agents, multimedia data & contents, people, networks, groups, links or URLs, ID, user profiles, profile objects, pages, attachments, informational links, shared workspaces, to participate in the same activity as the sending user, take related actions, sharing, searching, tracking, communication, collaboration, accessing information, workflow, forward, share, edit, process, update, re-send, bookmark, format, buy, sale, refer, convert, dynamically present, action item(s).

In one embodiment, active link comprising one or more applications, services, objects, multi AI agents, multimedia data & contents, people, networks, groups, links or URLs, ID, User Profiles, profile objects, pages, attachments, informational links, shared workspaces for collaboration from networks and/or from external domains, applications, networks, services and devices with one or more associate data, wherein said associate data of active link comprising URL or namespace of each active link for identifying and allowing to access active link associate objects, applications, services, media data, people, entities, identities, profile, group, network, page & other objects of network, active link related one or more metadata, categories, keywords, sources, providers, details, descriptions, properties, links, attachments, features, upload, created & use date & time, help, identifier & profile(s) of sender & receiver of active link, active link associate tracking status & status, active link associate object related user data and preferences, security policies, authentication information and privacy settings of accessing & sharing active link and active link associate object(s) related user data.

In one embodiment, user can create and update one or more categories lists of identified active links which are controlled by user and exist in social network based on user selection, uploaded by user, search & match, suggested & provided by connected & matched users, suggested list or auto generated by central unit based on user profiles, user data, user activities, recorded user's actions, past responses, interest, list of active links, list of active links of connected users, installed applications and provided by $3^{rd}$ parties developers, service providers and advertisers based on users privacy settings and preferences.

In one embodiment, sender can search, select, identify and manually attach or auto attach one or more active links with said action item(s), wherein said one or more attached active links enables receivers and/or responders to provide one or more responses & actions, communicate, collaborate, answer, share, search, workflow, take one or more actions, transact, e-commerce, social networking and participating activities of sender of message, wherein said associate tracking status & status of active link and user of active link comprising pending, online, offline, transacting, transaction complete, using, downloading, viewed, install and other active link associate tracking status & status.

In one embodiment, one or more senders and receivers of active link can share active link & active link associate objects and said object related at least part of user data with one or more users based on privacy settings for communication, grouping, workflow and collaboration.

In one embodiment, auto attaching & identifying one or more active links with action item(s) or response of action item(s) based on action item(s) and associate metadata, user profile, user data.

In one embodiment, wherein responder of action item(s) can attach one or more active links based on sender user's message, sender user's profile, sender user's data, sender user's connections, responder user's analysis, suggestion from other connected users of responders, auto match making and suggested by sender of message.

In one embodiment, user can register and verify one or more active links including objects, profiles, accounts, identities, applications, services, multimedia media contents, networks, groups, connections, pages and other objects with central unit.

In one embodiment, active links & objects provided and host by the central unit and/or users and/or $3^{rd}$ parties developers, service providers and advertisers.

In one embodiment, user can share selective user profiles and user data with application and services of network, $3^{rd}$ parties' application and services, connected & matched users based on privacy settings and user preferences.

In one embodiment, active links & objects manage and invoked in an integrated environment.

In one embodiment, one or more active links are attached to action or activity or status or log item(s) about sender user's posting of a question, and the said one or more active links enable the responder user to answer the question.

In one embodiment, one or more active links are attached to action or activity or status or log item(s) about provider user's submitting of a search query, and the one or more active links enables the viewing user to provide search results for said search query.

In one embodiment, one or more active links are attached to action or activity or status or log item(s) about provider user's requesting of a booking or purchase of product or service, and the one or more active links enables the viewing user to book or confirm purchase order for said request.

In one embodiment, one or more active links are attached to action or activity or status or log item(s) about provider user's submitting of a task request, and the one or more active links enables the one or more viewing user to collaborate and workflow for said task.

In one embodiment, one or more active links are attached to action or activity or status or log item(s) about provider user's creating workspace for project, and the one or more active links enables the one or more viewing user to participate in said workspace of project.

In one embodiment, one or more active links are attached to action or activity or status or log item(s) about provider user's sharing resources, and the one or more active links enables the viewing user to view or download shared resources.

In one embodiment, one or more active links are attached to action or activity or status or log item(s) about provider user's creating group or social network or personal network, and the one or more active links enables the viewing user to join said group or social network or personal network.

In one embodiment, the listing of one or more of the action or activity or status or log item(s) comprises one or more action or activity or status or log item(s) about an activity external to the social network domain.

In one embodiment, the listing of one or more of the action or activity or status or log item(s) comprises one or more action or activity or status or log item(s) about activities of one or more users who are connected or related to the user in the social network.

In one embodiment, the listing of one or more of the action or activity or status or log item(s) comprises one or more action or activity or status or log item(s) about the user's own activities or actions.

In one embodiment, selecting for the listing a set of action or activity or status or log item(s) based on connection or relationship of the action or activity or status or log item(s) with the viewing user.

In one embodiment, storing privacy settings and preferences of the user; and filtering or relating one or more activities or actions from the generated action or activity or status or log item(s) based on the user's privacy settings and preferences.

In one embodiment, one or more active links are attached to action or activity or status or log item(s) about sender user's sell of one or more brands, and the said one or more active links enable the responder user to buy said one or more brands.

In one embodiment, one or more active links are attached to action or activity or status or log item(s) about sender user's activities, and the said one or more active links enable the responder user to participate with sender user's activities.

In one embodiment, the action or activity or status or log item(s) comprises a story about user's and connected users' activities, where the activities are that the user installed particular application, join a group, add a photo, subscribe a service, post a message or blog, update status and automatically logged activities from existing or external networks(s).

In one embodiment, the action or activity or status or log item(s) comprises user's task, where the task is that the user want to purchase brand(s) or book movie tickets.

In one embodiment, the action or activity or status or log item(s) comprises user's e-commerce where the e-commerce is that the user wants to sell one or more branded products and services.

In one embodiment, users of network can send, receive, share, search, bookmark, attach, access one or more action or activity or status or log item(s), related responses, associate active links and user actions from $3^{rd}$ party web sites, applications, services, networks and devices.

In one embodiment, the message comprises user's requirements where the requirements are that the user wants collections of images regarding particular subject, search results for particular keywords(s), articles & blogs of particular categories, list & details of top mobiles.

In one embodiment, the action or activity or status or log item(s) comprises user's workflow where the workflow is that the user wants to collect money from customers.

In one embodiment, responder of action or activity or status or log item(s) can attach or associate one or more active links with response, wherein said one or more attached active links enables sender of action or activity or status or log item(s) to communicate, collaborate, share, search, workflow, take one or more actions, transact and participating activities of responder.

In one embodiment, one or more active links are attached to response of action or activity or status or log item(s) about booking of tickets as per action or activity or status or log item(s) or requirements of sender of action or activity or status or log item(s), and the said one or more active links enable the sender of action or activity or status or log item(s) or receiver of response to book the tickets.

In one embodiment, one or more active links are attached to response about downloading collections of photos as per action or activity or status or log item(s) or requirements of sender of action or activity or status or log item(s) that the user want collections of photos regarding particular subject, and the said one or more active links enable the sender of action or activity or status or log item(s) or receiver of response to download and view the collections of photos attachments in an integrated environment.

In one embodiment, one or more active links are attached to response about book domain name as per action or activity or status or log item(s) or requirements of sender of action or activity or status or log item(s), and the said one or more active links enable the sender of action or activity or status or log item(s) or receiver of response to search, book domain name(s).

In one embodiment, one or more active links are attached to response about marketing report as per action or activity or status or log item(s) or marketing task assignment of sender of action or activity or status or log item(s), and the said one or more active links enable the sender of action or activity or status or log item(s) or receiver of response to view the marketing reports and assignment.

In one embodiment, privacy settings and preferences of receiver comprising receive message only from one or more selected & connected users, receive message as per set date, time and duration range, receive message related to one or more categories, keywords, location, language, age range, education & qualification, income range.

In one embodiment, enabling receiver of action or activity or status or log item(s) to access said action or activity or status or log item(s) associate one or more active links.

In one embodiment, enabling receiver of action or activity or status or log item(s) to provide response(s) for said received action or activity or status or log item(s), where response comprising media data and dynamically attach one or more identified active links.

In one embodiment, wherein receiving and processing said each response(s) from each responders of said action or activity or status or log item(s) and presenting to the sender of said action or activity or status or log item(s) as per privacy settings and preferences comprising receive response only from one or more selected & connected responders and experts, receive response date, time and duration range, receive response related to one or more categories, keywords, location, language, education & qualification.

In one embodiment, enabling sender of action or activity or status or log item(s) or receiver of response of action or activity or status or log item(s) to access said response associate one or more active links.

In one embodiment, determine receivers based on searching, matching, selecting, auto match making, select target receivers from one or more groups, suggested or dynamically presented lists, subscribers list, auto fill lists & user defined or dynamically created categories lists, select one or more types, keywords and categories specific one or more receivers, select from list of contacts and connections including list of friends, family, co-workers, known people and like minded users, wherein said auto match making and presenting for user selections of one or more receivers while sending action item(s) based on text of prospective or candidate action item(s), privacy settings, preferences, default selections, subscribers, subscriptions, ranking, availability, connections, conditions, rules, user profile, user data, categories, keywords, receivers privacy settings & preferences.

In one embodiment, the monitored, tracked, recorded and logged actions include a purchase made on the third-party or external domain or website or application or service or network or device.

In one embodiment, receiving actions or activities or status or logs items of members of the social network outside of the social network comprises receiving a from an action recorder device, action recorder application, mobile, smart devices, databases, digital television or set-top receiver.

In one embodiment, generating action or activity or status or log item(s) based on user's one or more privacy settings, preferences, aggregation, counting, filtering, categorizing, dynamic presentation settings, user profile, user data, determined target receivers, rank & weight of determined receivers, privacy settings of receiver, priority of sender and/or receiver, privacy settings & preferences of sender domain and/or receiver domain.

In one embodiment, presenting one or more monitored, tracked, stored, recorded, processed, generated action or activity or status or log item(s) to user based on one or more privacy settings, preferences, filters, action type filters, auto match making criteria including keywords, categories, sender profile & data, privacy settings & preferences of determined receivers, behavior, intention, interest and any combination thereof for selecting one or more candidate action or activity or status or log item(s) for presenting or sending to determined receivers.

In one embodiment, sender can manually monitor, track, record, store, process, send, present, edit, update one or more action or activity or status or log items, attach one or more active links for sender and/or receiver(s), active links associate objects, applications, workspaces, advertisements, metadata including categories, keywords, set tracking status, dynamically determine receivers, dynamically apply privacy settings and preferences, attach dynamic presentation & application features.

In one embodiment, determining one or more action feed receivers by sender based on selecting one or more connected or matched or filtered users, connected users of connected users or one or more degrees of separations, subscribers or categories of subscribers, verified & expert service providers, all users (public) of network and determine by other users including user selected, connected, matched users.

In one embodiment, said categorized contacts or connections or dynamic relationships comprise contacts determined by searching and selecting known connections of connected users, unknown likeminded users based on one or more search criteria, said categorized contacts optionally enabled by accepting invitations from users.

In one embodiment, said subscription based on selections, send request or invite others, connections, contacts, search people, find friends from contacts, search sources from message(s) associate source(s), search subscribers & subscriptions of each public user, one or two way match making preferences, rules, conditions, categories, taxonomy wise directories & lists, auto match making based on preferences, profile, user data and user activities, actions, events & transactions, life stream.

In one embodiment, auto determining one or more action feed receivers by the central unit by auto match making of receivers based on action item(s) & associate metadata, sender and/or receiver's matchmaking preferences including filters, conditions, ranks, categories, keywords, sender profiles, sender privacy settings, user data, interest, behavior, available receivers, receivers profiles, responses.

In one embodiment, dynamically presenting action feed to determined receivers based on each receiver's dynamic presentation settings, privacy settings, preferences and processing, formatting, mapping, converting based on receiver's one or more presentation systems, applications, services, databases, web pages, devices, communication channels, networks, groups and associate privacy settings.

In one embodiment, allow sender and receiver of action item(s) to take one or more actions or group of actions on one or more selected or identified action or activity or status or log item(s) and associate active links, metadata & data comprising sort, filter, group, categories, share, rank, update, remove, bookmark, synchronies, send, organize & order, forward, transfer or assign, copy, search, match, present, apply privacy settings, metadata & preferences, view & access active links, user & providers actions and logs, report spam, abuse & violation, provide comments & ranks, attach or detach one or more active links, objects, profile objects, applications, services, connected, selected, matched users or group(s) of user(s) and providers, view, define & set tracking status, view statistics & analytics and set priority type, attach or detach receivers or responders, group members and add, update, delete one or more action or activity or status or log items, related each responses and active links, view logs, actions, transactions, events, activities & communications details, communicate with sender or receiver of messages, accessing of active links related each action details and provide user defined or auto recorded action details.

In another embodiment, identifying, monitoring, tracking, recording, logging, storing, ranking, processing & presenting said one or more user defined and system generated actions on said each action item(s), related responses and active links with action date & time, action categories, user provided or auto recorded action related details, action related response & message, one or more action source(s) including people, applications, services, shared workspace, media data or contents, objects, groups, networks, pages, items, links and any action related identified objects from network and/or external domains, attachments, lists, tracking status, further communication details, ratings or ranks, comments and user provided and/or dynamically associated one more active links, services, objects, media data, shared workspaces and applications based on one or more filters & privacy settings.

In one embodiment, receiving, storing, indexing, processing action item(s), related responses, active links and user actions & action associate logged data for making them searchable for other users based on one or more search criteria and/or send to subscribers or connected users of user based on sender & receiver user's privacy settings & preferences, wherein action associate said active links enable said one or more receiver users to access said active links and participate with sender user.

In one embodiment, user and connected users of user on behalf of user can create, update and identify action item(s) and select from past action item(s).

In one embodiment, tracking interaction of the user with the at least one of the plurality of action or activity or status or log item(s); and utilizing the interaction to present tracking status to user and generate or record one or more action or activity or status or log item(s).

In one embodiment, presenting or dynamically or automatically and/or manually associating or attaching one or more active links with action item can same or different for sending user and one or more receivers or viewing users of action item.

In one embodiment, action or activity or status or log items are extracted from user's or group of user's life stream based on detecting, identifying, monitoring, tracking one or more action or activity or status or log items from updated or recorded or stored life stream and dynamically send or present to determined receivers.

In one embodiment, life stream comprising user related chronological stream of categories digital resources provided & generated by user, connected users and auto generated, auto identified, auto detected, auto sensed user related resources based on user's activities, actions, events, current locations, transactions, extracted from recorded video, sensed by sensors.

In one embodiment, Life stream Management facilitates action or activity or status or log items provider and life stream administrator to manage and update life stream timeline related action or activity or status or log items provider & related resources with metadata including multimedia contents, text, messages, emails, communications, web links, videos, images, photos, albums, graphics, audio, voice, files, scanned documents, databases and related applications & services, connections, updated resources from connected users or internal or external sources & services, user's or connected users' generated contents like publications, blogs, news, events, updates, notes, experiences, reviews, discussion, likes & dislikes, activities, solutions, sharing, purchases, brands use and want to use, history and everything related to user's and connected users' activities or life, wherein said metadata comprising date & time, one or more taxonomies, ontology, categories, semantic syntax, keyword(s), comments, source, author.

In one embodiment, user can associate one or more taxonomies to said life stream for organizing life stream comprising allowing user or action or activity or status or log items provider provider(s) to download or synchronize or update one or more default top level or parent system taxonomies from the central unit and allow user to append or update one or more user created taxonomies of one or more levels to said default top levels or main system taxonomies.

In one embodiment, allowing user to share or publish or subscribe or synchronize one or more selected and updated life stream or selected one or more action or activity or status or log items of life stream to or with one or more selected or connected or matched users or subscribers based on one or more conditions, privacy settings and preferences.

In one embodiment action or activity or status or log items may comprising one or more statement(s) or sentence(s), templates, selected or edited concepts, note taking methods including tree structure, charting, outlining, mapping, mind maps, timelines, unstructured notes, structured notes with customize fields or tags, details, visual notes, flow charts, cluster notes, reports, summary, story, blog, descriptions, database, message(s), paper form, multimedia content types including text, image(s), photos, symbols, diagram, presentation, video(s), extracts or part of video &, voice, map, scanned documents, calendar, script, query, keyword(s) in one or more languages, phrase(s), Boolean operators, rules, condition(s), semantic syntax, ontology with associated one or more accessible metadata or fields.

In one embodiment, action or activity or status or log items provider can identify or select or extract one or more action or activity or status or log items from existing action or activity or status or log items of life stream and/or based on searching or subscribing & selecting of action or activity or status or log items from action or activity or status or log items of other users or drafting or preparing new action or activity or status or log items or sub action or activity or status or log items with one or more accessible metadata or fields.

In one embodiment, System can auto update said auto generate action or activity or status or log items to the user's life stream timeline or auto synchronizing and presenting identified action or activity or status or log items to related or connected or matched or subscribed responders as per preferences and privacy settings.

In one embodiment, action or activity or status or log items provider and/or receiver comprising one or more digital automated sources including mobile, computer, video camera(s), scanner, digital pen & pad, RFID, touch screen, speech & text recognition system, communication systems, note taking software, imports from other systems, applications, services, devices and networks, multimedia content sources including image, video, file, extracts from video or voice, editor, wizard, search engine, survey, historical data, logs, sensor systems, multi Artificial Intelligence Agent(s), languages & translation system, speech or voice source(s) & paper forms, users of social network(s), human mind, experts, user's related groups, connections, subscribers, $3^{rd}$ parties and like minded users and one or more individuals, groups, collaboration of one or more pre-identified individuals comprising company, organization, professional and social bodies, web site, governmental bodies and enterprises, service providers, data and application providers and $3^{rd}$ parties providers on behalf of animals, birds, non living things including tree, products, road, building, location, tourist place.

In one embodiment, action or activity or status or log items may related to any types of activities, concepts, purpose, updated status, thought, motive, logic, act, idea, what user currently doing or want to do or already did something, aim, goal, desire, want, wish, requirement, request, query, help, object, matter, plan, target, task, issue, subject, topic, project, case, event, problem, attempt, try, what next possibly user can do, what happen next, likes & dislikes, hobby, selection or choice, around anything related to user's or entity's environment like brands & services using, brands & services want to use, before spent money, experiences, reviews, interest, relation, connected people, all types of works, activities, actions, jobs, procedures, to do, about user, user's life, health, education, travel, entertainment, life style, finance, job, business, career, learning, training, food, habit, hobby, location and like.

In one embodiment, central unit can dynamically creates one or more groups of action or activity or status or log items providers and/or responders for collaboration and communication based on one or more action or activity or status or log items and/or types of action or activity or status or log items and/or sources of action or activity or status or log items, associate communication details, logs, responses and related metadata, keywords, categories, location, availability, date & time, language, invitation, relations or connections, subscriptions, searching & matching, preferences and profile data of action or activity or status or log items providers and receivers & responders.

In one embodiment, central unit can comprising server or processor or device linked to internet, intranet, peer to peer network including super nodes or hubs, LAN, WAN, mobile service provider(s), cluster of centralized or distributed servers, database(s) and one or more types of networks.

In one embodiment, central unit can registering one or more responders for providing one or more response(s) or services to one or more action or activity or status or log items providers for one or more types of action or activity or status or log items with service profile, wherein said service profile comprising service details, categories, keywords, location, language, expertise, subject or domains, availability or date & timings, payment information, conditions or rules, privacy settings, preferences, one or more associated connections and subscription lists and types of physical or digital activities, actions, interactions, communications, responses, events, transactions, life stream, logs, locations, behavior, movement, environment, status, states & conditions in which service provider want to receive action or activity or status or log items and provide service(s) to sender.

In one embodiment, determining receiving one or more related action or activity or status or log items from one or more action or activity or status or log items provider(s) by receivers(s) and/or responder(s) based on one or more subscriptions, services, connections, selections, preferences, privacy settings, profile(s) data, relations, collaboration with other responders or service providers, assignments by other connected users or service providers, filters, rules or conditions, locations, languages, timings or availability, payment information, ranks, points, historical data, behavior, interests, searching and/or subscribing action or activity or status or log item(s) provider(s) based on one or more search criteria, relevancy and auto matching criteria.

In one embodiment, responder(s) of action or activity or status or log item(s) can preparing or drafting response(s) based on one or more action or activity or status or log items, experience, analysis, one or more sources including search local & central database, online search engines & resources, social networks, 3rd parties databases, books, resources from connected users, collaboration of responders and service providers, by using one or more applications, services & devices from one or more networks.

In one embodiment, response(s) of action or activity or status or log item(s) comprises any types of resources and one or more multimedia contents including text, messages, emails, communications, web links, connections, videos, images, photos, albums, graphics, audio, voice, files, scanned documents, databases, applications, services, updated resources from internal or external sources, user generated contents or services from connected or subscribed or matched users including search results, articles, publications, blogs, news, events, experiences, reviews, discussion, actions, sharing, suggested brands, providing one or more concept(s) specific suggested resources & action(s) including one or more actions, what to do, better way to do, more ways, questions & related answers, answers, suggestions, solutions, guidance, helps, finance, supplies, information, knowledge, tips & tricks, training, learning, match making, ideas, what, where, when, why and how like information, one or more actions, suggestions, solution, direction, guidance, execution plan, step by step procedures, to do, tips & tricks, more particularly, but not exclusively to using a community to provides personalized or customized multi model or multidimensional active resources & actions for action or activity or status or log item(s), result-oriented actions, positive steps, active resources designed to actively promote and advance the user's status, any measures taken to rectify conditions, acts or deeds used to remedy a situation, solution for removing an error, or adjust a condition, how to carry out a task, how to execute the things, planned series of actions, tasks or steps designed to achieve an objective or goal, guide the implementation or improvements of any types of process including task assignments, milestones, timelines, resource allocations, data collection methodology, and evaluation, step or series of steps to be taken, detailed description of the steps used to implement a strategic plan, a plan to determine what information is missing or pending, where and when to collect this information, and who will need the information and anything related to action or activity or status or log item(s) which are useful to action or activity or status or log item(s) provider(s) and associate one or more accessible metadata or fields.

In one embodiment, sending, receiving and providing response(s) of action or activity or status or log item(s) session between or among action or activity or status or log item(s) provider(s), receiver(s) and responder(s) comprises one or more determining of receivers and/or responders, drafting or auto generating or identifying, sending and processing action or activity or status or log item(s) or sub action or activity or status or log item(s), identifying, sending, receiving, selecting, editing or modifying, processing & clarifying concepts, preparing, processing & sending response(s), communications, collaboration, clarification, answers, routing, assigning, workflow, calls, emails, messages, videos, online meetings, searching & matching, sharing, e-commerce, aggregating, tracking, follow-up, actions, events, transactions, activities, participation, attaching active links & resources including applications, services, multimedia contents or resources links with response, applying privacy settings and preferences, selecting, filtering, subscribing, mapping, downloading, accessing, invoking, programming, book marking, attaching, detaching, assigning, federating, integrating, distributing, ranking, commenting, composing, comparing, co-coordinating, orchestrating, choreographing, organizing, recording, configuring or customizing, classifying & grouping, connecting, disconnecting, editing, updating, synchronizing, transacting, binding with 3rd party applications, networks, services & devices via web services & API, forwarding, transferring, merging, joining, listing, linking, arranging, scheduling, automating, sequencing and ordering, sending, receiving, managing, monitoring, registering, accounting & metering, reporting, logging and executing between or among one or more or group or combinations or series or sequences of action or activity or status or log item(s) and/or action or activity or status or log item(s) provider(s) and/or response(s) and/or receivers and/or responder(s).

In one embodiment, the central unit can receiving and processing said one or more action or activity or status or log item(s) and/or response(s) from each of at least a portion of the target responders, wherein said processing comprising receiving, storing, updating, indexing, validating & formatting including editing, clarifying, update details, fonts settings, spell checking, language & spam detecting, translating, transcribing, converting to other formats like voice, text, associating priority types including high, normal, low, expiration, date & time, categories, keywords, locations, advertisements, payment information, profile data, URL, dynamically attaching one or more system data, suggested response(s), active links, informational links, attachments, multimedia contents, applications and service including communication utilities and shared workspace for providing response, collaboration, participation, tracking, answering, communication, workflow, services & task fulfillment, searching, sharing, social networking, purchasing, transactions, information and determining one or more receivers and/or responders for sending or routing or publishing said action or activity or status or log item(s) to one or more determined receivers and/or responders and determining one or more receivers or action or activity or status or log item(s) provider(s) for sending or routing or publishing or presenting said resource(s) to one or more determined receivers or action or activity or status or log item(s) provider(s) based on one or more preferences and privacy settings or searchers based on one or more search criteria.

In one embodiment, allow action or activity or status or log item(s) providers to assign rank, sort, organize, categories, bookmark, filter, select, save, share, edit or update, store, use, process one or more received action or activity or status or log item(s) and/or responses, set action or activity or status or log item(s) session status and tracking status including active, pending, completed, executed or used or like, action or activity or status or log item(s) or response received, set action or activity or status or log item(s) as public or private or shared types, associate metadata including keywords, categories, provide comments on one or more selected or executed or liked or used action or activity or status or log item(s) and responses and submit said one or more selected action or activity or status or log item(s) and/or related one or more responses to central unit for storing, editing or updating, indexing, validating, formatting, associating data, processing for making them searchable to other users based on one or more search criteria.

In one embodiment, allow receivers and/or responders to assign rank, sort & order, organize, categories, bookmark, filter, select, save, share, edit or update, store, process one or more received action or activity or status or log item(s), set response session status and tracking status including active, pending, completed, assigned or forwarded, concepts or response sent, set action or activity or status or log item(s) or response as public or private or shared types, associate metadata including keywords, categories, provide comments on one or more selected action or activity or status or log item(s) and submit said one or more selected action or activity or status or log item(s) and/or related one or more responses to central unit for storing, editing or updating, indexing, validating, formatting, associating data, processing for making them searchable to other users based on one or more search criteria.

In one embodiment, system can present or attach an advertisement to a user or action or activity or status or log item(s) provider(s) with or within action or activity or status or log item(s) and/or related responses during the sending, receiving, selecting and presenting.

In one embodiment, allowing a responder of action or activity or status or log item(s) to accept an action or activity or status or log item(s) to designate the advertisement. Advertisers may bid for position and placement and timing of ads associated with keywords on the responder's GUI and the responder(s) can optionally pick which advertisement is presented.

In one embodiment, a user interface that enables users to post content items in one or more communication channels of the social network also includes an interface that allows the posting user to identify one or more nodes or active links within the posted content item. For example, a trigger received in the interface may indicate that a user wishes to reference a node in the posted content item from list. Selectable links may be provided to enable the user to author a content item comprising a link to another node or active link in the social network. After sharing the content item comprising the link to another node in the social network, another user can access node or active link.

In one embodiment, a social network enables a user to identify, reference, or otherwise mention another node while posting a content item to the social network. "Nodes" on a social graph in a social network may represent objects on the social network, such as actual users and other entities within the social network that have profile information. These types of entities may post content to communication channels within the social network. For example, a user and the user's friends in the social network are included in this category of nodes. These nodes have "identities" because they represent actual users and entities with profile information. Entities such as products or brands, celebrities, and teams, may also have identities because an actual entity is identified and claimed in the social network. Other types of nodes, such as applications, services, actions, transactions, digital content, events, groups, network and objects, may also have "identities" because those nodes may be controlled by a specific user or entity.

In one embodiment, present invention provides managed, organized, secure, interactive, real time, trusted, unified and controlled new next generation super internet network, contextual search engine, multi communication channels, dynamic e-commerce, and human or social operating system which monitors, tracks, records each activities, actions, transactions, events of each participating users and facilitates each related activities, actions, transactions, events of each user by providing on demand, customize, contextual, dynamic & unified communication. Present invention can also able to predict future based on each entity related each recorded, updated and stored activity, actions, transactions, events and related ranked responses, active links and actions. User can search ranked actions, active links and response for action or activity or status or log item(s) from past action or activity or status or log item(s), related response, active links & actions.

In an embodiment, dynamic & accessible action, activity, status, log feed comprising:
  identify or register users or entities whose one or more activities, actions, interactions, events, transactions, life stream, locations, behavior, movement, environment, status, states & conditions are monitored & tracked from one or more sources and/or record, store, process and/or send or present to determined receivers and any combination thereof;
  identify activities, actions, interactions, events, transactions, life stream, locations, behavior, movement, environment, status, states & conditions types and/or sources;

allow to select, match & filter activities, actions, interactions, events, transactions, life stream, locations, behavior, movement, environment, status, states & conditions types and/or sources and apply privacy settings;

monitoring, tracking said identified and filtered activities, actions, interactions, events, transactions, life stream, locations, behavior, movement, environment, status, states & conditions types;

recording, logging & storing who, what, where, when, how, why about said each activities, actions, interactions, events, transactions, life stream, locations, behavior, movement, environment, status, states & conditions type specific one or more action or activity or status or log item(s) of each user or entity;

processing said each action or activity or status or log item(s) including attaching active links, converting, formatting, indexing, apply or associate privacy settings, metadata, dynamic presentation, input system & application features;

determining receivers based on various criteria;

presenting, sending, broadcasting, publishing, updating, synchronizing, highlighting, advertising, posting, appending, storing said one or more action or activity or status or log item(s) from one or more users or entities to one or more determined receivers;

allow to access one or more active links with said one or more action or activity or status or log item(s); and tracking one or more user action on said one or more action or activity or status or log item(s) and/or associate active links.

In an embodiment, customize, contextual, dynamic, unified and integrated communication comprising:

allow sender to determine target receivers;

allow sender to dynamically associate one or more identified active links with action item(s) or with response of action item(s);

allow sender to send or post said action item(s) or response of action item(s) with active link(s) to determined target receivers, wherein said active link(s) enables receivers to sell, purchase, transact, communicate, collaborate, search, share, workflow, provide response, participate in same activities as sender and access the active link(s) for action item(s) specific purpose in an integrated, contextual, customize and unified manner;

receiving and processing said action item(s) or response of action item(s) at the central unit; and presenting said action item(s) or response of action item(s) to determined target receivers as per preferences & privacy settings.

In an embodiment, customize, contextual, dynamic, unified and integrated communication comprising:

determine one or more target receivers and/or responders by sender and/or auto determined by central unit;

sending action item(s) with or without dynamically attaching one or more identified active links by sender and/or auto identifying, sending & attaching by central unit to one or more determined target receivers and/or responders, wherein said active links enables receiver and/or responder to communicate & collaborate with sender, provide response(s) & service(s) to sender, enabling workflow, e-commerce transaction, participate with sender's one or more activities and access active links;

receiving and processing said action item(s) at the central unit;

presenting said action item(s) to one or more target receivers and/or responders based on one or more preferences;

allow each said responders to send one or more responses for said action item(s) to sender of action item(s) with or without attaching one or more active links and/or auto attaching active links by central unit, wherein said active links enables receiver of response(s) to communicate & collaborate with responder, send action item(s), receive services, enabling workflow, participate with responder(s), make purchase transaction, e-commerce, view, share & search multimedia data & contents, solve any action item(s) specific solution and access active links;

allow user to take one or more actions on said action item(s) and/or related responses and/or associate active links;

identifying, monitoring, storing, recording, logging said one or more user actions based on one or more filters & privacy settings with action date & time, action categories, user provided or auto recorded action related details, action related data, responses & communications, one or more action source(s) including people, applications, services, shared workspace, media data or contents, objects, groups, networks, pages, items, links and any action related identified objects from network and/or external domains, attachments, lists, tracking status, further communication details, ratings or ranks, comments and user provided and/or dynamically associated one more active links, services, objects, media data, shared workspaces and applications; and receiving, storing, indexing, ranking, processing said action item(s), action item(s) related responses and actions & action associate logged data for making them searchable for other users and/or send to subscribers or connected users of user based on sender & receiver user's privacy settings & preferences, wherein action associate said active links enable said one or more receiver users to participate with sender user.

In an embodiment, managing active links comprising:

registering each user and storing each user's profile, connections and privacy settings;

registering and storing one or more active links and profile & metadata of active links by user, application & service providers and central unit;

maintaining in a database a plurality of said active links;

maintaining in a database each user related active links;

allow user to associate or attach one or more active links with message from said active links;

send message to determined one or more targeted receivers;

allow targeted receivers to access said active links or provide response and attaching one or more active link(s) with said response based on at least part of message;

allow user to take one or more actions on said message associate one or more active links and track one or more user actions on said message associate one or more active links; and storing each message associate one or more active links with said tracked user actions on said message associate one or more active links.

In an embodiment, managing nodes and connections among nodes in a network comprising:

maintaining in a database a plurality of nodes of a social graph;

maintaining in a database a plurality of connections in the social graph, where each connection represents a connection between two or more nodes in the social graph;

maintaining in a database information about one or more of the nodes and connections;

providing an interface for users of the social network to send content items in one or more communication channels of the social network to determined one or more target receivers and/or responders;

receiving via the interface a said content item from a user of the social network, the said content item including a link referencing a node of the social graph; and sending or presenting said content items in one or more communication channels of the social network to determined one or more target receivers and/or responders;

allow receivers and/or responders to send content items to sender of content items in response to received said content items including a link referencing a node of the social graph, wherein said referred links based on at least part of received content items;

tracking user actions on said link referencing a node of the social graph; and receiving, storing, indexing, ranking, mapping, processing said content items, associate one or more links referencing a node(s) of the social graph and related one or more tracked user actions.

In an embodiment, generating an action item(s), the method comprising:

allow user to filter pre-defined & pre-categories physical or digital activities, actions, interactions, communications, responses, events, transactions, life stream, logs, locations, behavior, movement, environment, status, states & conditions types and/or sources;

monitoring a plurality of physical or digital activities, actions, interactions, communications, responses, events, transactions, life stream, logs, locations, behavior, movement, environment, status, states & conditions of each user, said each user configurable to act as sender user and a receiver or responder user;

storing a plurality of said physical or digital activities, actions, interactions, communications, responses, events, transactions, life stream, logs, locations, behavior, movement, environment, status, states & conditions in a data repository unit;

determine one or more target receivers and/or responders by user and/or auto determined by central unit;

generating a plurality of action item(s) regarding one or more of the physical or digital activities, actions, interactions, communications, responses, events, transactions, life stream, logs, locations, behavior, movement, environment, status, states & conditions of each user with or without associating one or more active links with said action item(s), wherein said active links enable receiver or responder users to communicate & collaborate with sender, access active links, provide response(s) & service(s) to sender, enabling workflow, e-commerce transaction and participate in at least one of the activities as performed by the sender;

filtering plurality of action item(s) for one or more determined receiver or responder users; and presenting one or more action item(s) to said determined target receivers or responders.

In an embodiment, communication in a network(s) environment comprising:

allowing each user to subscribe to each other user for receiving each action item(s) of sender or publisher;

receiving and storing one or more user profiles, preferences, action item(s) subscribers, action item(s) subscriptions, dynamic relationships & connections, selections and privacy settings for sending and receiving action item(s) and communication at a central unit;

determining one or more target subscribers by a sender;

allowing the sender to send each action item(s) to the one or more target subscribers via a central unit;

receiving each action item(s) with or without associated with one or more active links from the sender or publisher at the central unit, wherein said active links enables subscribers to access active links, communicate, provide response(s) & service(s), workflow, e-commerce transaction, participate with sender's one or more activities;

storing, indexing and processing said each action item(s) with or without auto attaching one or more active links at the central unit wherein said active links enables subscribers to communicate, provide response(s) & service(s), workflow, e-commerce transaction, participate with sender's one or more activities;

determining one or more target subscribers by the central unit based on one or more preferences and subscriptions;

sending a representation of the each action item(s) to the one or more target subscribers by the central unit;

presenting each action item(s) in chronological order based on the preferences and privacy settings, subscriptions of target subscriber by the central unit; and receiving, storing, indexing, ranking and processing said each public action item(s), related responses, active links & user actions for making the searchable for users and allow to search & subscribe source of action item(s) publication based on at least part of message content and one or more predetermined criteria.

In an embodiment, communicating in a social network about action physical or digital activities, actions, interactions, communications, responses, events, transactions, life stream, logs, locations, behavior, movement, environment, status, states & conditions from an external domain comprising:

maintaining a profile for a plurality of users of the social network, each profile comprising profile data, privacy settings and connections to each of a plurality of other users of the social network;

determine one or more target receivers and/or responders by user and/or auto determined by central unit;

receiving a plurality of user posted action item(s) with or without attaching one or more active links by user and/or auto attaching by central unit from the external domain, each action item(s) representing user posted action item(s) or an action taken by a user of the social network in the external domain, wherein said active links enables receiver and/or responder to access active links, communicate, provide response(s) & service(s), workflow, e-commerce transaction, participate with sender's one or more activities;

receiving & processing said action item(s) and/or logging or recording the actions at the social network, each logged action including information about the action; and generating one or more messages wherein each of said messages represents one or more of said recorded actions; and presenting said action item(s) and/or generated messages to each determined target receivers and/or responders.

In an embodiment, dynamically creating groups for physical or digital activities, actions, interactions, communications, responses, events, transactions, life stream, logs, locations, behavior, movement, environment, status, states & conditions, action or activity or status or log item(s), related responses, communication in a network environment, the method comprising:

receiving and storing users profiles, real time location information of users, preferences, connections, selections, privacy settings at the central unit;

determining one or more users for dynamically created or user created & updated one or more groups based on action item(s), related responses, active links & user actions and associate categories, keywords & metadata, match making of users preferences, real time location information based on wireless devices and wired devices, date & time, online availability of users, bookmarked action or activity or status or log item(s) providers or responders, one or more accepted invitations, permissions for joining the group, conditions, searching & matching, selected connections, subscriptions & selections of users, privacy settings, user profiles & data, interest & activity types, filters and any combinations thereof and/or based on one or more users auto match by the central unit;

allowing members of said one or more groups to post action or activity or status or log item(s), provide & receive responses, attach and access active links, establish communication, create social network(s), provide service(s), collaborate, bookmark, rank, search and share multimedia contents.

In an embodiment, displaying physical or digital activities, actions, interactions, communications, responses, events, transactions, life stream, logs, locations, behavior, movement, environment, status, states & conditions, action or activity or status or log item(s), related responses, active links and user actions in a social network, the method comprising:

receiving by a social network a plurality of action or activity or status or log item(s), related responses, active links and user actions from users of the social network;

providing a user interface to a user of the social network;

displaying in the user interface some of the action or activity or status or log item(s), related responses, active links and user actions received from users in the social network;

providing to the user one or more selectable filters, each filter specifying a criteria to be applied to the action or activity or status or log item(s), related responses, active links and user actions;

receiving a selection of a filter from the user; and updating or presenting or synchronizing said action or activity or status or log item(s), related responses, active links and user actions based on the said received selected filter and presenting said one or more updated action or activity or status or log item(s), related responses, active links and user actions.

In one embodiment, said synchronizing comprising snapshot, merge and transactional synchronization and pull and/or push publication or subscription with one or more preferences by central unit or one or more users or publishers.

In one embodiment, said one or more selectable filters comprise one or more groups of users of the social network.

In one embodiment, said the one or more selectable filters include a user-defined list of other users.

In one embodiment, said the one or more selectable filters include one or more types of journal items including one or more applications, services, sources, connections, multimedia content type including text, URL, video, image, file and database.

In an embodiment, managing unified communications and collaboration for one or more physical or digital activities, actions, interactions, communications, responses, events, transactions, life stream, logs, locations, behavior, movement, environment, status, states & conditions and action or activity or status or log item(s), the method comprising:

receiving from one or more users of a social network a request to initiate a new communication for one or more action or activity or status or log item(s);

initiating a plurality of new communications responsive to the requests, for each of a plurality of the communications, receiving requests from one or more users of the social network to join the communications;

attaching users to the communications responsive to the requests to join;

receiving and/or sending action or activity or status or log item(s), related responses, active links, user actions & communication data from a plurality of the users in connection with one or more of the action item(s) related communications, for each communication, presenting to each member of said communication the plurality of action or activity or status or log item(s), related responses, active links, user actions & communication data received for the communication in a tree style or format based on one or more preferences and privacy settings.

In an embodiment, prospective customers search engine comprising:

receiving, storing, indexing, ordering, ranking and processing action or activity or status or log item(s) and associate data from plurality of users;

identifying, storing & processing prospective customers related action or activity or status or log item(s) based on said action or activity or status or log item(s) and associate data including metadata, attachments, privacy settings, list of responders, responses, communications, active links and user actions;

receiving search query for searching prospective customers related action or activity or status or log item(s) and associate data & active links;

presenting ranked & chronological search results to searching user based on matching search query with said identified prospective customers data for said search query comprising one or more identified action or activity or status or log item(s) & associate data including active links related to one or more prospective customers, wherein said each active link(s) associate with action or activity or status or log item(s) enable searching user to provide response, communicate, collaborate, participate, make offer, provide deal, sale product or ecommerce, workflow, make transaction with buyer, negotiate, provide discount, share and provide media data & information to related prospective customer or sender of action item(s); and notify each author or sender of each action or activity or status or log item(s) of search results about searching user searches, selects and received said search results related action or activity or status or log item(s) and allow each author or sender of action or activity or status or log item(s) to communicate, collaborate, participate, accept offer, receive deal, buy product or ecommerce, make transaction with seller, negotiate with seller, ask or receive discount, share and receive media data & information with selective one or more action or activity or status or log item(s) receiver or seller with receivers based on said action or activity or status or log item(s) associate active link(s).

In an embodiment, said action or activity or status or log item(s) associate accessible data & metadata comprising one or more determined responders or receivers, preferences, date & time, title, priority types including high, normal, low, expiration date & time, keywords, categories, types, taxonomies, ontologies, source of action or activity or status or log item(s), sender user profile, location(s), language(s), size, source id, source profile(s), privacy settings & preferences, dynamically attached one or more active links.

In an embodiment, said active links comprising one or more applications, services, objects, multimedia data & contents, people, networks, groups, links or URLs, ID, User Profiles, profile objects, Pages, attachments, informational links, shared workspaces from networks and/or from external domains, applications, networks, services and devices with one or more metadata.

In an embodiment, advertising to users in a social network, the method comprising: maintaining a profile for a plurality of users of the social network, each profile comprising dynamic relationships or connections to each of a plurality of other users of the social network; recording activities, status, logs & actions taken by the users of the social network, each recorded action or activity or status or log including information about the action or activity or status or log;
receiving a plurality of advertisement requests to advertise on the social network, each advertisement request identifying a type of action or activity or status or log for presenting to target users of the social network or application;
for a viewing user: matching an advertising request to a recorded action or activity or status or log, wherein the recorded action or activity or status or log matches the type of action or activity or status or log identified in the advertising request, and wherein the recorded action or activity or status or log is associated with connected user of the social network, presenting an advertisement for the viewing user, wherein the advertisement comprises a message that communicates the matching recorded action or activity or status or log.

In one embodiment the said recorded actions include actions taken by users on the social network.

In one embodiment the advertisement is presented on the web page as being integrated with recorded actions associated with other connected users of the social network.

In one embodiment the advertisement requests specify targeting criteria and matching an advertising request to a recorded action comprises applying the targeting criteria including locations, languages, preferences, keywords and daily budget selection.

In one embodiment the action source comprises one or more smart devices including mobile, digital television, video camera, printer and applications, services and networks.

In an embodiment, advertising to users of a social network, the method comprising:
  maintaining a profile for a plurality of users of the social network, each profile identifying a dynamic relationship or connection to each of a plurality of other users of the social network;
  logging activities or status or logs or actions taken by users of the social network, each logged activity or status or log or action including information about the activity or status or log or action;
  receiving a plurality of advertisement requests to advertise to users of the social network, each advertisement request comprising an advertisement and targeting criteria that relate to one or more activities or status or logs or actions that can be taken by a user or related to user; and
  for one of the users of the social network: selecting an advertisement for the user, wherein one or more logged activities or status or logs or actions taken by the user matches the targeting criteria of the advertisement request associated with the selected advertisement and presenting the selected advertisement to the user.

In one embodiment the said targeting criteria further comprise, locations, languages, preferences, keywords and daily budget selection.

In one embodiment, present invention can monitoring, tracking, recording, storing, processing any types of user actions, activities, events, transactions, life stream, life stream, behavior of user(s) in one or more networks based on one or more applications, services, devices, multimedia contents, user connections, communication, interactions, searching, sharing and collaboration among users.

In another important embodiment, present invention can monitoring, tracking, recording, storing, processing any types of user actions, activities, events, transactions, life stream, life stream, behavior of user(s) in one or more networks based on specific devices including mobile, video camera, audio recorder, detector, sensors which monitors, tracks, records, stores, processes user's physical activities, works, process, movements, locations, health, conditions, environment, status including driving vehicle, entering into particular vehicle or building, purchasing of brands, subscribing of services, viewing of television, communicate with others, selecting something, viewing something, visiting anywhere, accessing something, interact with anything, going anywhere, preparing something, eating something, buying or selling something, user surrounding environment including weather, other users or connected or related users actions, activities, events, transactions, life stream, locations, interactions with user, detecting health or conditions, activities related to any types or categories of works, jobs, sports, health, entertainment, shopping, education, training, learning, arts, travels, food, lifestyle, games, finance.

In another embodiment, present invention can monitoring, tracking, recording, storing, processing any types of user actions, activities, events, transactions, life stream, life stream, behavior of user(s) in one or more networks based on human mediated input or data feeding via one or more applications, services, networks, devices & technologies including entering health information, purchase transactions, life stream, news, blogs, updated status, communications, messages, visiting tourist places, searching, sharing, learning, weather information, stock prices, scanned documents In another embodiment, present invention can monitoring, tracking, recording, storing, processing any types of user actions, activities, events, transactions, life stream, life stream, behavior of user(s) in one or more networks in sequences of actions of one or more users in categories wise, stage wise, location wise, life cycle wise, purpose wise, task wise.

In one embodiment, for example User [Y] visits mall [L] and purchase brand [A] from shop [Z], wherein system monitors, tracks, identifies and detects user's purchase of brand [A] from shop [Z] of mall [L] based on RFID, sensors, devices, identified extracts from video camera, customer card, barcode, audio or voice, online or digital transaction(s), action device or recorder, location of user, digital map, input by shop administrator or salesman or any combination thereof. After monitoring, recording & tracking, central server unit receives, stores and process said one or more action or activity or status or log item(s) and attach one or more active links, system data, metadata & advertisements or central server unit presents said action or activity or status or log item(s) for user selection or manual processing including manually attach one or more active links, metadata, privacy settings & advertisements. Central server unit then auto determined one or more receivers based on one or more preferences, privacy settings, relationships, categories & keywords of action or activity or status or log item(s), interest, behavior for sending or send said one or more action or activity or status or log item(s) to user determined one or more receivers and present said one or more filtered, processed & formatted action or activity or status or log item(s) to one or more target receivers. Target receivers are enabled to access said one or more action or activity or status or log item(s) and associate active links, wherein said active links enable target receivers to access, buy said brands, take one or more actions, share, bookmark, communicate with sender or salesman, and refer to connected users of receivers.

In one embodiment, for example system can automatically monitor, track, record, store, process health type action or status related one or more action or activity or status or log item(s) based on sensors, medical devices, video camera, voice detection via mobile or voice enabled technologies, scanned documents & text recognitions, transactions, life stream, input by health service providers or doctors or sender and associate one or more active links or user manually input health related information including health reports, food intake types, medicines currently user use and like and manually associate one or more active links and send to related target receivers including family doctors, specialist doctors, hospitals, medical stores, other marketing agencies, connected users including family, friends, co-workers, like minded users, subscribers and like, wherein said action item(s) associate one or more active links enables said receivers to consult sender, sell medicines or products & services, communicate with sender and like.

In one embodiment, for example system can automatically monitor, track, record, store, process sales type actions related one or more action or activity or status or log item(s) in which system monitors, recodes, stores & process all sales to customers related chronological actions including salesman guiding customers, customer selections of products or brands, customer negotiation, final sales based on video camera(s), transactions, life stream, RFID, barcode and other devices and send to managers, administrators, brand owners, subscribers, connected users or departments or group of users with active links, wherein said one or more active links enables receivers to guide salesman or customer, real time understand customers, negotiate with customer and like.

In one embodiment, for example system can automatically monitor, track, record, store, process one or more related actions including weather of tourist place, count number of tourist visits tourist place, number of visitors or tourist likes tourist places, recode experience of one or more tourist with said tourist place, shopping of one or more brands of one or more customers or tourist in said tourist place and system aggregates, categories, filters, processes including attach one or more active links, advertisements and send & presents said aggregated action or activity or status or log item(s) with active links to one or more related receivers including matched search queries of searching users, subscribers, connected users of each tourist, interested users of said tourist place.

In one embodiment, for example system can automatically monitor, track, record, store, process user's search query specific sequences of search process with one or more active links and send said search process to one or more determined receivers, wherein said active links enables receivers to edit, play, forward or share said search macro(s).

In one embodiment, for example system can automatically monitors, tracks, records, stores, processes user's reading of particular book(s) based on video camera, library transaction or recording system, book selection detecting by RFID with one or more active links, metadata, user mediated notes, rank, like, comments and send to connected users of user based on user privacy settings, wherein said active link enables receiving users to locate user's library or book store, buy book(s) online, read abstract of book, read comments, ranks of sender, communicate with sender or library or sale person.

In one embodiment, for example system can automatically monitors, tracks, records, stores, processes lecture of professor and send said video to subscriber, connected students with one or more active links, wherein said active link enables students or subscriber to watch real time lecture or read transcript of lecture, ask question to professor, receive answer or responses from professor.

In one embodiment, for example user manually enters food of particular hotel like by user or particular movie viewed by user or particular products or brands buys by user from particular mall or shop or any one or more actions taken by user and associate one or more active links with said one or more action or activity or status or log item(s). System receives, stores & processes said one or more action or activity or status or log item(s) and send to determined or user preferred or selected users, wherein said one or more active links enables target receivers to buy said products or brands, book said movie tickets, order for said food, communicate with sender or seller(s), refer to connected users of user, provide comments, reviews & ranks, share recipe.

In one embodiment, for example system can automatically monitors, tracks, records, stores, processes user's voice, talks, discussion, comments, reviews and extracts one or more keywords and categories specific video or audio and send said extracted video or audio action or activity or status or log item(s) to one or more keyword specific subscribers, connected users of user based on preferences including keywords, categories with one or more active links wherein said active links with action item enables receivers to view, hear, use, access, process said one or more action or activity or status or log item(s), communicate with sender, convert to text and store, process, data mining said text data including identifying customers, compiling knowledge & information, publishing, sharing, make said resource searchable for other users.

In one embodiment, for example system can automatically monitors, tracks, records, stores, processes user's viewing of particular television serials based on digital box, audio with one or more related active links and send to connected users including friends on mobile device application, wherein said attached active links enables receivers of action or activity or status or log item(s) to communicate, comment with sender user or dynamically created groups of friends based on said receivers and sender user of said particular action item(s) related to said television serial.

In one embodiment, for example system can automatically monitors, tracks, records, stores, processes vehicles or printers or machineries conditions, status, related or important actions like printer cartridge near levels, vehicles location, machineries damages with one or more active links wherein said active links enables sender to buy printer cartridge, enables receiver to communicate with sender or receiver can identifies location of vehicle and guiding drivers, giving information about location including shopping centre, location, garage, tourist places or enables receiver to communicate with sender regarding damage of machine and consult sender or give repair date & time.

In one embodiment, for example system can automatically monitors, tracks, records, stores, processes conditions, status, state or structure like building including maintenance requirement, color works requirements and like.

In one embodiment, on the social networking site, an Action or Activity or Status or Log Feed is a list of updates on user's own home page. The Action or Activity or Status or Log Feed will show updates about those people who are in user's friend's list. The Action or Activity or Status or Log Feed is actually a collection of actions, events, transactions, status from user's friend's own Action or Activity or Status or Log Feed that is intended to give user's a quick look at what user's friends or connected users of user have been doing. This is about stories about the physical or digital activities, actions, interactions, communications, responses, events, transactions, life stream, logs, locations, behavior, movement, environment, status, states & conditions of a user's friends.

In one embodiment, this is where the Action or Activity or Status or Log Feed happens. Basically, The Action or Activity or Status or Log Feed is what shows up in user's login page (and everyone's login page), right on top when users login to their account. It's basically all user's friend's actions "activity stream". It tells you what is happening on user's network of friends. What each of your friends are doing, what applications they are installing, what groups they are joining, how they are interacting with their friends, and like. All put together sequentially. When every user logs in to their account, the Action or Activity or Status or Log Feed is the first thing they see right on top. Everyone sees what their entire friend's are doing and how they are interacting. Even if a user's friend changes their profile image—it shows up on user's Action or Activity or Status or Log Feed.

In one embodiment, the "Action or Activity or Status or Log Feed" that allows users to track their friends' movements by the minute.

In one embodiment, it chronicles every physical or digital activities, actions, interactions, communications, responses, events, transactions, life stream, logs, locations, behavior, movement, environment, status, states & conditions a user's friends have recently taken anywhere including social networking web site, $3^{rd}$ parties external domains, web sites, applications, services, devices, locations, motion, shopping transaction at mall or shop.

In one embodiment, the Action or Activity or Status or Log Feed on social networking web site is a stream of information about friends' actions or activities or status or logs, such as what groups they have joined, or where they have left comments.

In one embodiment, the Action or Activity or Status or Log Feed is a method for automatically presenting up-to-date information about users' activity within the community In one embodiment, action or Activity or Status or Log Feed shows the latest actions or activities or status or logs that user's friends are taking on social network, external domain, outside world, physical actions, such as photo uploads, comments, posts, profile changes, and others.

In one embodiment, user can use Action or Activity or Status or Log Feed to stay up to date on current events just by seeing what user's friends are talking about.

In one embodiment, action or Activity or Status or Log Feed generates a list of interesting stories about what user's friends have been up to on social networking web site, external domains, outside world, and, sometimes, on the rest of the Web. User might be connected to 10, 100, or 500 friends on social networking web site, external domains, outside world, many of whom take actions on the social networking web site, external domains, outside world, that reflect news in their real lives. For example the average user has 105 friends, although clearly, some users have about 3 and others have 600. Collectively, user friends take, on average, about e.g. 20,000 actions on social networking web site, external domains, outside world, per day. If user is one of the users increasing the average, it's nearly impossible for user to keep up with all these actions. Action or Activity or Status or Log Feed takes into account how recent these actions occurred, giving higher weight to stories that happened most recently.

In one embodiment, Action or Activity or Status or Log Feed is an algorithm that generates a stream of user's activities, user friends' activities and other information drawn from that database of actions.

In one embodiment, it covers every action involving Action or Activity or Status or Log Feed (such as status updates, images and the aggregation of content), On their personal action feeds, users were given the option of removing updates from any application as well as choosing the size they show up on the page. Furthermore, the community feed (containing recent actions by the user's friends) contained options to instantly select whether to hear more or less about certain friends or applications.

In one embodiment, the feature enabled users to pre-select those actions that they made on social networking web site, external domains, outside world which would automatically generate feed stories. For example, if you changed your relationship status, a news story would automatically be generated, stating that your relationship status had changed.

In one embodiment, within applications, users are prompted as to whether or not they'd like to post a story about the action they just took. For example, if you get a new high score on Bejeweled Blitz, you will be prompted to post that score to your feed. For all features that are built into social networking web site, external domains, outside world, you aren't prompted when a story is created. Instead, it automatically generates the story based on what you had previously set in your "Action or Activity or Status or Log Feed Settings".

In one embodiment, Action or Activity or Status or Log Feed has the added capability of being the profile's action store, maintaining a running list of the user's actions on social networking web site, external domains, outside world—telling stories about actions taken, like setting a high score in a game, tagging friends in photos, or recruiting friends to a cause.

In one embodiment, user can use an action link to provide connected users with a way to take action on the stories they read in their Action or Activity or Status or Log Feeds.

In one embodiment, an action link is a short string of text that accompanies an Action or Activity or Status or Log Feeds story and invites the user to take some action related to that story. An action link is a hyperlink to a URL on your website or another third-party website.

In one embodiment, the most important thing application marketer do is to publish engaging, authentic Action or Activity or Status or Log Feed items. Whenever a user performs an action within said application, consider whether hearing about that action would be valuable to that user's friends. If so, publish an Action or Activity or Status or Log Feed item about that event.

In one embodiment, it's now Action or Activity or Status or Log Feed which shows EVERY action all of user's friends take. If user's friend likes something, joins a group, comments on something, becomes friends with someone . . . it's all listed on the action feed.

In one embodiment, the ads will appear as "stories"—short items that appear on users' profiles—describing the actions users undertake on third-party websites. One example: a multiplayer game like World of Warcraft might inform a social network user's friends that he's reached a new level. Or a music store might inform friends of a recent purchase. The ads will be based on friends' activity, not some generic commercial message.

In one embodiment, privacy page will allow users to choose which types of stories go into your Action or Activity or Status or Log Feed and user's friends' Action or Activity or Status or Log Feed, and it also lists the type of actions social network will never let any other person know about.

In one embodiment, Action or Activity or Status or Log Feed will associate social network users with an informational stream, which will be displayed to a number of other users dynamically.

In one embodiment, through Action or Activity or Status or Log Feed users can able to know information about a social networking site's user or their friends activities, attaching links about the activities to the action or activity or status or log item(s), restricting access to the user's friends or social networking group and arranging the action or activity or status or log item(s) in order while using the social network site.

In one embodiment, Action or Activity or Status or Log Feed, a bulletin or journal on users' home pages that automatically broadcasts or highlights their friends' most important activities.

In one embodiment, it made it too easy for other people to track down individual activities (such as changes in relationship status, events, and conversations with other users).

In one embodiment, users have been able to control what types of information are shared automatically with friends. Users are able to prevent friends from seeing updates about certain types of activities, including profile changes, posts, and newly added friends.

In one embodiment, in which users saw a constantly updated list of their friends' activity. Action or Activity or Status or Log Feed highlights information that includes profile changes, upcoming events, and birthdays, among other updates.

In one embodiment, Action or Activity or Status or Log Feed made it too easy for other people to track activities like changes in relationship status, events, and conversations with other users.

An activity stream is very important for driving behavior as it contains the latest trends and details about what users in your social graph are doing: updating photos or multimedia data, installing application, subscribing service, creating group, join group, viewing video, adding music to their profile, like something, bookmark from external domains, purchasing brands or products or services, hosting events, making new friends, and based on that updating, mapping user's and connected or related users of user's social graph including updating information about nodes, connections among nodes, shared and access data among connected nodes.

In one embodiment, an activity consists of an actor, a verb, and an object. It tells the story of a person performing an action on or with an object: "Yogesh posted a photo" or "Amita shared a video", time at which the activity occurred which is not necessarily the same as the time at which the activity was published, identifies the entity or object or identity of entity that performed the activity, the target of an activity represents the object to which the activity was performed. An object is a thing, real or imaginary, which participates in an activity. It may be the entity performing the activity, or the entity on which the activity was performed.

In one embodiment, the activity or action or status or log stream can serves as the nerve center of organization's social networking. It aggregates events from Social Sites with those from SharePoint, external social streams, and internal boundary systems—think Activity or Action or Status or Log Feed for enterprise. Activity or Action or Status or Log Streams can pump a continuous flow of recent business social networking activity—both explicit user-generated content and implicit information—that is generated from system level activity—to provide users with relevant and timely insights. This type of business social networking allows users to see which colleagues are uploading documents and commenting on the latest customer requirements—all in one centralized view with custom and standard filters and alerts. Social Sites Activity or Action or Status or Log Streams may provide features including view, comment, and like activities—from user's desktop or mobile device, filter business social networking activities by community, by colleague, by self, by status, by most popular, or create a custom filter, receive daily digests of user's colleague and community activity, set up email alerts that notify you when a colleague comments or likes one of user's activities.

In one embodiment, user can only send Activity or Action or Status or Log Feed to one or more connected users or subscribers but not received Activity or Action or Status or Log Feed i.e. one way communication.

In one embodiment, user can only receive Activity or Action or Status or Log Feed from one or more connected users or publishers or subscriptions of publishers but not send Activity or Action or Status or Log Feed i.e. one way communication.

In one embodiment, aggregate one or more Activity or Action or Status or Log items based on unique session or one or more groups, categories & types related series, sequence of Activity or Action or Status or Log items and send said aggregate Activity or Action or Status or Log Feed to one or more connected or related users or subscribers.

In one embodiment, Activity or Action or Status or Log item related each identified and accessible object, application, service, link, multimedia data, profile object, group, network, identity, profile link, connected users of user object, group object, network object, message, data, web page, node, communication channel can have default associate integrated, dynamic and accessible default application features— For example User Z (action actor)+Installed Application (action category)+"Travel" (action related objects or action source e.g. accessible application name & source link and by clicking on "Travel" active link, active link have default dynamic and contextual application feature or have default associate user action like installing said application) and action also have dynamic, relevant, contextual to action item and accessible one or more active links which are presented in list, links, combo box and menu form. Another example is User X (action doer or actor)+Joins Group (action or activity category)+"XYZ" (action associate accessible objects e.g. identified, action related and accessible group name).

In one embodiment, dynamically create group based on similar Activity or Action or Status or Log item or similar types or categories of Activity or Action or Status or Log or similar Activity or Action or Status or Log item associate objects & active links occurs or generated within connected or related or matched or selected users in particular similar date & time range, location, application, service, communication channels, session, keywords, categories, groups. For example Users [A], [B], & [C] which are connected with each other and installs application [Quick Calendar] or [Super Game], so they can dynamically create group or dynamically create group based on said installed applications and can share colander data or play game with each other.

In one embodiment, present suggested relevant, contextual or filtered Activity or Action or Status or Log item to users by central unit and/or one or more connected or related or selected or matched users and/or external domains, web sites, applications, services & devices regarding To-do something, participate in particular one or more activities, take one or more actions, provide user services, provide user generated contents, advertise something, install particular applications, join particular groups or networks, purchase particular deals or brands or products or services, subscribe particular services, view particular relevant videos or photos or multimedia data. For example (1) "[User Y] please fill particular survey" with active links (1) Print (2) Share and (3) Submit (survey form with dynamic application features and active links like print or share or submit survey form(s)), wherein said active link enables viewing user to fill survey and submit or share survey forms to central unit and/or one or more connected or related or selected or matched users. Another example is present Activity or Action or Status or Log item (2) "[User Y] we suggest you to install new game [World Wide]" to viewing user based on user's preferences, profile data, transactions data, user data, user actions or activities related auto generated data, shared data, privacy settings, social graph, behavior. System can further monitor, track, filter, process, generate and present one or more user actions or activities based on said one or more selected suggested Activity or Action or Status or Log items to one or more connected or related or selected or matched users.

In one embodiment, system maintains in a database a plurality of nodes of a social graph, plurality of connections in the social graph, where each connection represents a connection between two or more nodes in the social graph and maintaining in database information about one or more of the nodes and connections. Each node of social graph is identified by unique namespace. System dynamically updates connection information between nodes based on user's activities, actions, interactions, events and transactions with other nodes including connected and matched users, objects, applications, services, media data & contents, identities, pages, links and other objects from network. User can search, select, access and share one or more links of nodes with other nodes on network, wherein link or namespace enables other users to access and invoke link associate one or more resources, applications, services, media data, objects, profile, page, communication channels and like as describe in U.S. patent application Ser. No. 13/015,238, titled: "A System and Method for generating and updating information of connections between and among nodes of social network".

In one embodiment, System can also provides application framework to user, so user can search, share and install one or more applications from central unit FIG. 1-530 & one or more developers and service providers and share application data with one or more connected users based on privacy settings as describe in U.S. patent application Ser. No. 12/847,861, titled: "A System and Method for accessing applications for social networking and communication in plurality of networks".

In one embodiment, System can dynamically and selectively apply privacy setting for one or more user profiles, user data or content, communication channels, applications and services as describe in U.S. patent application Ser. No. 12/948,495, titled: "A systems and methods for dynamically generating a survey result(s)", U.S. patent application Ser. No. 12/975,046, titled: "A method and system for sharing user and connected users' data with external domains, applications & services and users' and "A System and Method for publishing, sharing and accessing selective contents in a Social Network".

In one embodiment, user can manually describe or manually edit auto generated one or more types of physical or digital activities, actions, interactions, communications, responses, events, transactions, life stream, logs, locations, behavior, movement, environment, status, states & conditions and attach one or more selected active links from dynamically presented list or list of active links as describe in PCT patent application No: PCT/IB2011/051318, titled: "A Method and System for Customized, Contextual, Dynamic & Unified Communication, Zero Click Advertisement, Dynamic E-Commerce and Prospective Customers Search Engine".

In one embodiment, user can manually or automatically send, publish, update, append, attach, update, present one or more action or activity or status or log items related to one or more types of physical or digital activities, actions, interactions, communications, responses, events, transactions, life stream, logs, locations, behavior, movement, environment, status, states & conditions to one or more external domains, web sites, applications, services, devices, databases, web pages and anywhere as describe in India patent application No: 1174/MUM/2011, titled: "A system and method for O-Mail or omnipresent communication, O-Mail address, O-Mail service, O-Mail client, O-Mail Server, network, platform and pin point communication protocol (PPP)".

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following detailed description, which is to be read in association with the accompanying drawings, wherein:

FIG. 7 illustrates examples, in accordance with an embodiment of the invention;

FIG. 9 illustrates examples, in accordance with an embodiment of the invention;

FIG. 10 illustrates examples, in accordance with an embodiment of the invention;

FIGS. 16 & 17 illustrates graphical user interface (GUI) of interactive video or multimedia action & activity feeds.

DETAILED DESCRIPTION OF THE DRAWINGS

Illustrative Operating Environment

Figure 1:
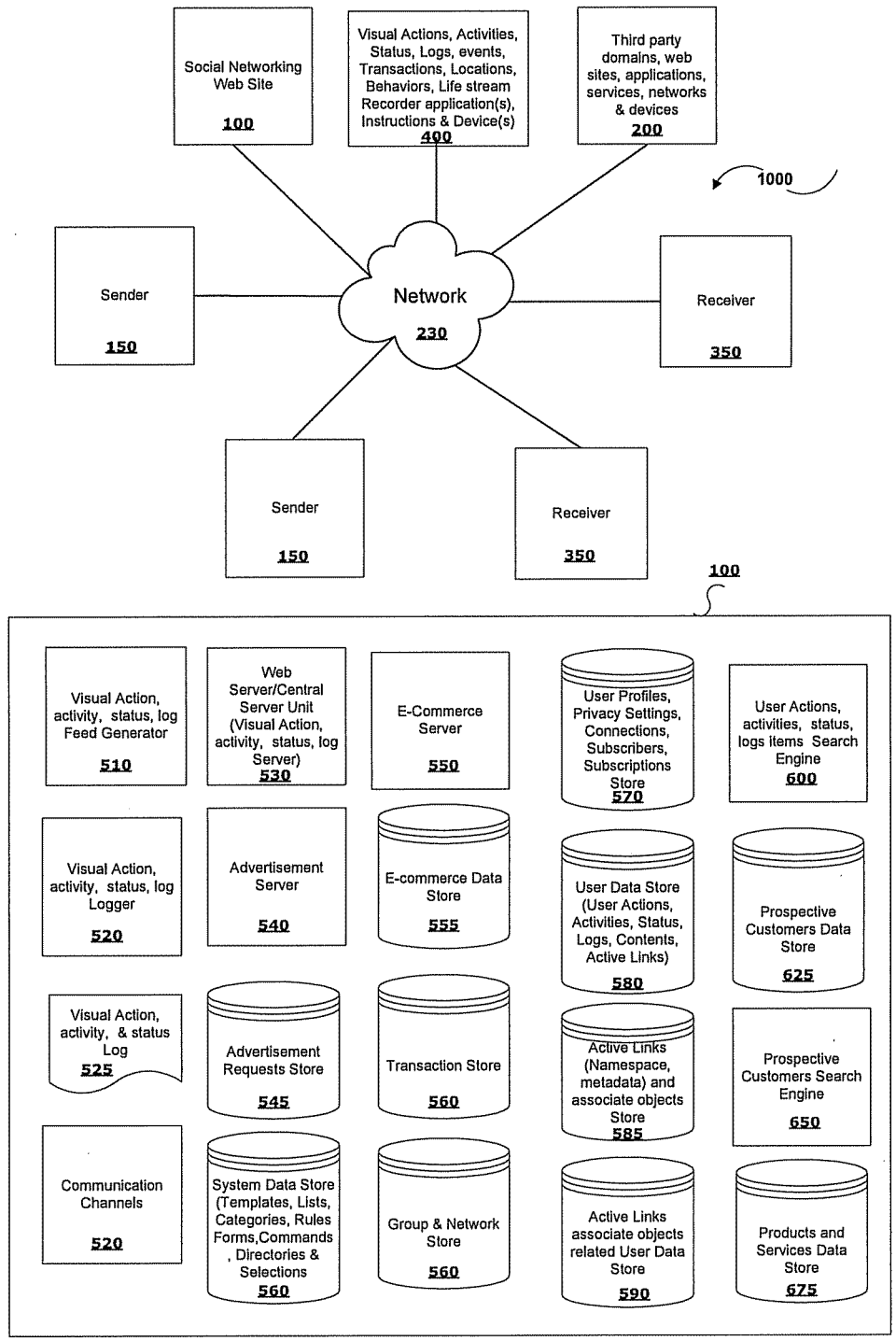
FIG. 1 is a system diagram of one embodiment of an environment in which the invention may be practiced.

FIG. 1 is a high level block diagram illustrating a system environment suitable for operation of a social networking website 100. The system environment comprises one or more client devices 150 and 350, one or more third-party third party domains, web sites, applications, services, networks & devices 200, a social networking website 100, and a network 230. In alternative configurations, different and/or additional modules can be included in the system.

The client devices 150 and 350 comprise one or more computing devices that can receive member input and can transmit and receive data via the network 230. For example, the client devices 150 and 350 may be desktop computers, laptop computers, smart phones, personal digital assistants (PDAs), or any other device including computing functionality and data communication capabilities. The client devices 150 and 350 are configured to communicate via network 230, which may comprise any combination of local area and/or wide area networks, using both wired and wireless communication systems. As described above, the third party domains, web sites, applications, services, networks & devices 200 and the action recorder-150 are coupled to the network 230 for communicating messages to the social networking website 100 about the members' actions off the website 100.

The social networking website 100 monitoring, tracking, storing, processing, attaching active links & presenting physical or digital activities, actions, interactions, responses, events, transactions, life stream, locations, behavior, movement, environment, status, states & conditions from one or more sources, wherein said active links provides customize, contextual, unified and integrated communications, collaboration, workflow, participating with sender or other users, searching, sharing, managing, take one or more actions on action item for that social networking website 100 registering each members and receives and stores each users profiles, privacy settings, preferences, connections with other users of network to user profile store 570, allow sender 150 to determine one or more target receivers 350 based on one or more connections, match making, selections, subscriptions stored at user profile & connection store 570, allow sender 150 to dynamically associate one or more identified active links with action item(s) or response of action item(s) based on active links owned, uploaded & registered, manage, controlled by user or matched active links provided by other connected users, advertisers, responders, service providers and social networking website 100 stored at active links and associate accessible objects store 585, allow sender 150 to send or post automatically as they occurs or manually said action item(s) or response of action item(s) with active link(s) to determined target receivers 350, wherein said active link(s) enables receivers 350 to sell, purchase, transact, communicate, collaborate, workflow, provide response, participate in same activities as sender and access the active link(s) for message specific purpose in an integrated, contextual and unified manner. The social networking website 100 receiving, storing and processing said action item(s) or response of action item(s) at the web server 530 and storing in user data store 580 and presenting said action item(s) or response of action item(s) to determined target receivers 350 as per preferences & privacy settings. The social networking website 100 allow user to take one or more actions on said action item(s), related response and associate active links and monitor, track, store, filter and records said one or more user actions in user data store 580.

The social networking website 100 comprises a computing system that allows members to communicate or otherwise interact with each other and access content as described herein. The social networking website 100 stores member profiles that describe the members of a social network, including biographic, demographic, and other types of descriptive information, such as work experience, educational history, hobbies or preferences, location, and the like. The website 100 further stores data describing one or more relationships between different members. The relationship information may indicate members who have similar or common work experience, group memberships, hobbies, or educational history. Additionally, the social networking website 100 includes member-defined relationships between different members, allowing members to specify their relationships with other members. For example, these member defined relationships allows members to generate relationships with other members that parallel the members' real-life relationships, such as friends, co-workers, partners, and so forth. Members may select from predefined types of relationships, or define their own relationship types as needed.

FIG. 1—100 is an example block diagram of a social networking website 100. The social networking website 100 includes a web server 530, visual action logger 520, visual action log 520, visual action item(s) or visual action feed generator 510, an ad server 540, a database of ad requests 545, en e-commerce server 550, e-commerce data store 550, a member profile including privacy settings, preferences & connections store 570, a group & network store 560, an event store, each active link related namespace, properties, metadata & associate objects store 585, each active link associate object or application related user data store 590, a transaction store 560, user data store including action item(s) or action feeds, responses, contents, active links, tracking status, user actions data store 580 and system data store including templates, lists, categories, taxonomies, keywords, rules forms, commands, directories & various selections 560, User Actions, activities, status, logs items Search Engine 600, Prospective Customers Data Store 625, Prospective Customers Search Engine 650, Products and Services Data Store 675. In other embodiments, the social networking website 100 may include additional, fewer, or different modules for various applications.

The web server 530 links the social networking website 100 via the network 230 to one or more client devices 150 and 350, as well as to one or more third party websites 200. The web server 530 may include a mail server or other messaging functionality for receiving and routing messages between the social networking website 100 and the client devices 150 and 350 or third party websites 200. The messages can be instant messages, queued messages (e.g., email), text and SMS messages, or any other suitable messaging technique.

The visual action logger 520 is capable of receiving communications from the web server 530 about member actions on and/or off the social networking website 100. The received actions can occur within the social networking website 100 as well on other websites, via an application programming interface exposed by the social networking website 100. In one embodiment, the social networking website 100 maintains the action log as a database of entries. When an action is taken on and/or off the social networking website 100, an entry for that action is generated and stored by the visual action logger 520. Examples of user actions within the social networking website 100 include adding resources & notes to user's LifeStream including adding health report, results, bills, invoices, scanned documents and describe in detail in specification, posting action item(s), receiving action item(s) related responses, attaching active links, take one or more actions on each action item(s), related response and active links including purchase or sell products, book tickets, user likes one or more brands, joining a group, communication & sharing with other users. Examples of user actions outside of the social networking website 100 include purchasing or reviewing a product or service using an online marketplace hosted by a third-party website 140, auto recorded, auto detected, auto sensed, auto selected or extracted from user's life stream, auto extracted from video or audio or images, auto identified, auto determined, auto generated and auto posted one or more action item(s) from one or more applications, services, networks and devices based on monitoring, tracking and recording of user actions, events, current location, transactions, life stream & activities by action recorder applications & devices 400.

The visual action logger 520 includes data describing the member performing the action, the date & time the action occurred, an identifier for the member who performed the action, an identifier for the member to whom the action was directed, an identifier for the categories of action performed, an identifier for an object acted on by the action (e.g., an application), content associated with the action, identifying one or more objects associate with actions, dynamically identifying and associating one or more active links & applications or application features with action, who-what-where-when-how-where about the action occurred and/or other data describing the action. The visual action logger 520 can communicate with the all active links, objects, applications, services, groups, networks, data & content stores of network related to actions and/or user related to action. The visual action logger 525 can organize the stored action data according to an action identifier which uniquely identifies each stored action.

The visual action item(s) generator 510 generates communications for each member about information that may be relevant to the member. These communications may take the form of action item(s), each action item(s) is an information message comprising one or a few lines of information about an action in the action log that is relevant to the particular member. The action item(s) are presented to a member via one or more pages of the social networking website 100, for example in each member's home page or action item(s) page. An action item(s) is a message that summarizes, condenses, or abstracts one or more member actions from the visual action log 525. The generated action item(s) can then be transmitted to one or more related members e.g., the member's connected users, friends, subscribers, and auto matched receivers or responders allowing the member's actions to be shared with related members. More about user action describe in U.S. patent application Ser. No. 11/995,343, titled: "A method and system for communication, publishing, grouping, advertising, searching, sharing and dynamically providing a Journal Feed" and divisional U.S. patent application Ser. No. 12/973,370, titled: "A System and method for publishing, communication and real time searching"

Figure 2:
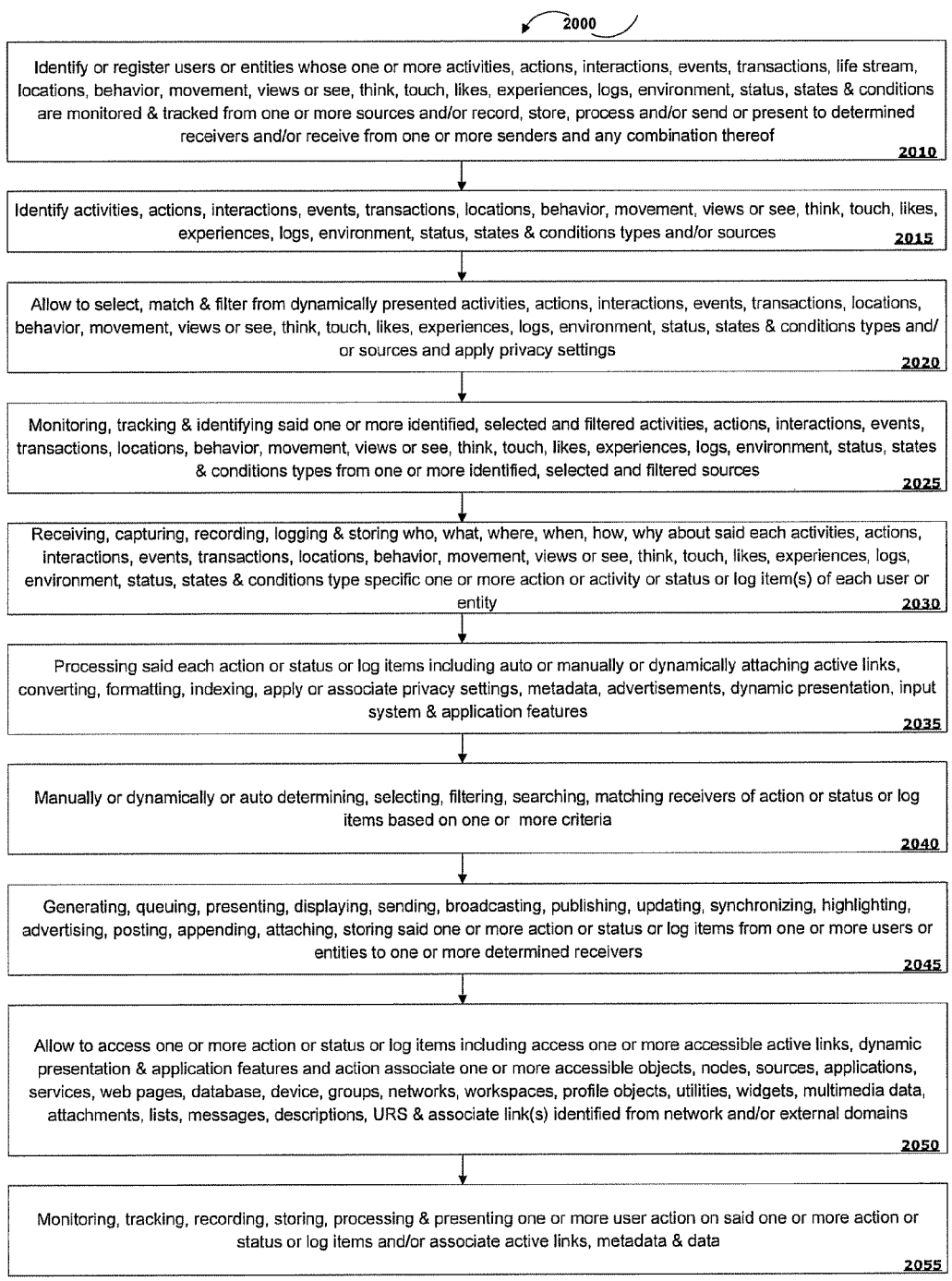
FIG. 2 illustrates flowcharts for explaining a flow diagram of an exemplary process for dynamically monitoring, tracking, storing, filtering, recording, determining, automatically generating, processing & presenting or displaying action or activity or status or log feed.

FIG. 2 is a detail logical flow diagram generally showing one embodiment of a process for monitoring, tracking, storing, processing, attaching active links & presenting physical or digital activities, actions, locations, behavior & status.

At step 2010, users or any types of entities are identified and/or registered with or without profile(s) whose one or more activities, actions, interactions, events, transactions, life stream, locations, behavior, movement, environment, status, states & conditions are monitored & tracked from one or more sources and/or record, store, process and/or send or present to determined receivers and/or receive from one or more senders and any combination thereof.

At step 2015, activities, actions, interactions, events, transactions, life stream, locations, behavior, movement, environment, status, states & conditions types and/or sources are identified.

At step 2020, Users can select, match & filter from dynamically presented activities, actions, interactions, events, transactions, life stream, locations, behavior, movement, environment, status, states & conditions types and/or sources and apply privacy settings.

At step 2025, one or more types of identified, selected and filtered activities, actions, interactions, events, transactions, life stream, locations, behavior, movement, environment, status, states & conditions are monitored & tracked from one or more identified, selected and filtered sources.

At step 2030, said each activities, actions, interactions, events, transactions, life stream, locations, behavior, movement, environment, status, states & conditions type specific one or more action or activity or status or log item(s) of each user or entity are received, recorded, logged & store with who, what, where, when, how, why about action or activity or status or log item(s) and associate accessible active links, identified action related objects, applications, services, URLs, web pages, networks, groups, associate metadata, data & privacy settings, dynamic application features.

At step 2035, said each action or activity or status or log item(s) are processed including auto or manually or dynamically attaching active links, converting, formatting, indexing, apply or associate privacy settings, metadata, advertisements, dynamic presentation, input system & application features.

At step 2040, target receivers of action or activity or status or log item(s) are manually or dynamically or automatically determined, selected, filtered, searched, matched based on one or more criteria.

At step 2045, said one or more action or activity or status or log item(s) from one or more users or entities are presented, displayed, send, broadcast, published, updated, synchronize, highlight, advertise, post, appended, attached & stored to one or more determined receivers.

At step 2050, User can access one or more action or activity or status or log item(s) including access one or more accessible active links, dynamic presentation & application features and action associate one or more accessible objects, nodes, sources, applications, services, web pages, database, device, groups, networks, workspaces, profile objects, utilities, widgets, multimedia data, attachments, lists, messages, descriptions, URS & associate link(s) identified from network and/or external domains.

At step 2055, one or more user action on said one or more action or activity or status or log item(s) and/or associate active links, metadata & data are monitored, tracked, recorded, processed and presented to user and other connected or related or matched users.

Figure 3:
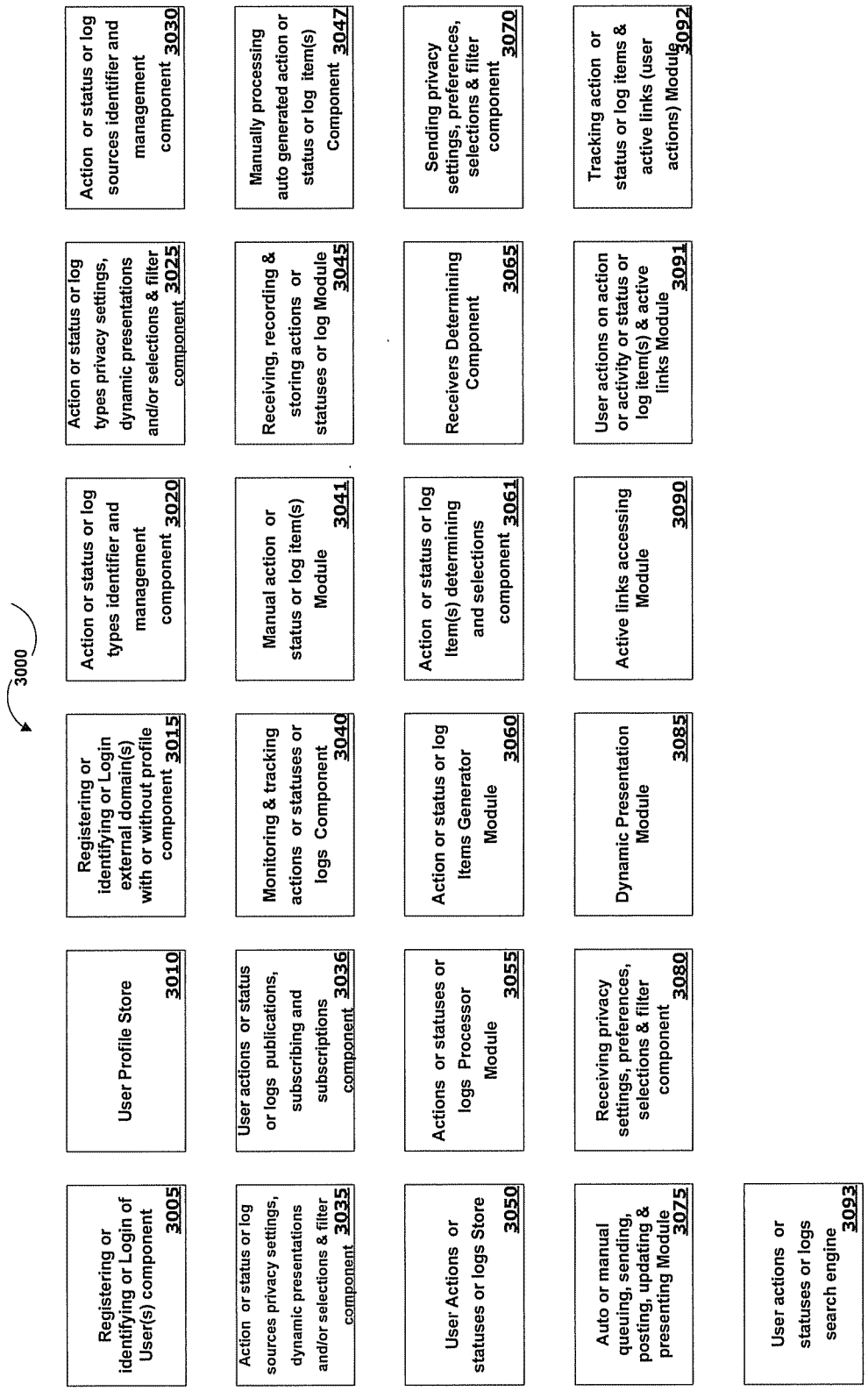
FIG. 3 illustrates a block diagram of an exemplary action feed engine.

FIG. 3, a block diagram of an exemplary social network provider, such as the social network provider 100 shown in FIG. 1, is shown.

A registering or identifying component 3010 facilitate in registering user(s) with profile(s) or identifying unregistered user(s) with or without profile(s) whose one or more activities, actions, interactions, events, transactions, life stream, locations, behavior, movement, environment, status, states & conditions are monitored & tracked from one or more sources and/or record, store, process and/or send or present to determined receivers.

A profile store 3015 or 570 is provided for storing data associated with each of the users, such as the user 150 and 350 associated with user device. When a user 150 and 350 subscribes to services provided by the social network provider 100, a user profile may be generated for user 150 and 350. For example, the user 150 and 350 may select privacy settings & preferences, provide contact information, provide personal details & interests, list connections or group other users, subscribers, subscriptions according to one or more categories. When the user 150 and 350 adds or updates additional information to the user profile, such as adding additional contacts, the user profile in the profile database 3015 or 570 may be updated with the information added. The user profile may be stored, modified, added, and so forth to any storage medium. A timestamp may be associated with the user profile. Examples of timestamp include order of occurrence in a data base, date, time of day, and the like.

In one embodiment a registering with or without profile or identifying or Log-In external domain(s) component 3015 facilitates external domains including web sites, applications, services, networks and devices to register with action server 530 for sending and/or receiving one or more types of actions or activities related user actions from and/or to one or more user selected external domains based on privacy settings.

In one embodiment action types identifier and management component 3020, identifying, adding, removing, categorizing, describing, and dynamically presenting one or more activities, actions, interactions, events, transactions, life stream, locations, behavior, movement, environment, status, states & conditions types from one or more sources In one embodiment action types privacy settings, dynamic presentations and/or selections & filter component 3025 facilitate users to select, apply privacy settings, preferences and filter said one or more identified activities, actions, interactions, events, transactions, life stream, locations, behavior, movement, environment, status, states & conditions types. System can monitors, tracks, records, stores, generates, process, determine and present one or more action or activity or status or log item(s) from one or more sources including digital and/or physical sources based on said one or more selected and filtered activities, actions, interactions, events, transactions, life stream, locations, behavior, movement, environment, status, states & conditions types.

In one embodiment action sources identifier and management component 3030 invite, allow to registers, identifies, registers, search, match, filter, select, add, remove, categories, dynamically presents one or more sources and/or destinations including one or more external domains, applications, services, web sites, networks, groups, devices, physical domains, locations for monitoring, tracking, recording, storing, generating, processing and presenting or sending and/or receiving action or activity or status or log item(s) related to one or more selected types of activities, actions, interactions, events, transactions, life stream, locations, behavior, movement, environment, status, states & conditions.

In one embodiment action sources privacy settings, dynamic presentations of sources and/or selections & filter of sources component 3035 facilitate users to get all social updates in one place from plurality of digital and/or physical sources. User can search, match, apply privacy settings, preferences, filter & select from one or more applications, services, networks, communication channels, web sites, devices that let user share what they've been doing on other websites, domains, applications, services, physical places, locations, devices and can see their friends and their updates from other applications, services, web sites, networks, devices, physical locations & places in user action profile or applications or services or communication channel or web page or presentation system in current domain or network or service or device, or can share present domain's or web site's or application's or service's or device's or location's activities or actions on other websites or domains or applications or services or devices.

Monitoring & tracking actions Component 3040 facilitates in monitoring & tracking of user's one or more selected or determined types activities, actions, interactions, events, transactions, life stream, locations, behavior, movement, environment, status, states & conditions related action or activity or status or log item(s) from one or more sources based on or from one or more action recorder applications, services, instructions, devices, sensors, detectors, transducers, video cameras, audio recorders, imaging, RFID, barcodes, touch screens, devices including mobile, digital televisions, digital watch, digital pen, automations, scanners, robotics, computer system, computer chips or processors, instruments, speech & text recognition, video & face recognition, speech or voice sources, translating system, application, services, networks, logs, programming, and human mediated actions including manually monitor or track, draft or describe & updates actions or activities, analysis, logic, guess, selections, privacy settings, preferences, settings, inspection, checking, verification.

In one embodiment user can publish one or more publications of generated actions or activities and allow other users to subscribe user's said one or more publications. In another embodiment user can subscribe other users publications of generated activities and actions via user actions and activities publications, subscribing and subscriptions component, which facilitates searching, matching, selecting, publishing, subscribing, managing one or more publications and/or subscriptions. Publications can be selective, merge or snapshot or transactional and pull and/or push types of subscriptions.

User can manually identify, monitor, track, describe, draft, edit, update, process one or more action item(s) with manually search, match, select and attach active links, action associate objects, applications, services, links, privacy settings, metadata & data via Manual action item(s) Module 3041.

Receiving, recording & storing actions Module 3045 receives, records & stores said monitored or tracked one or more selected or determined activities, actions, interactions, events, transactions, life stream, locations, behavior, movement, environment, status, states & conditions types specific action or activity or status or log item(s) from one or more selected or determined sources to User Actions & Activities Store 3050. Receiving, recording & storing actions Module 3045 receives, records & stores action or activity or status or log item(s) related to connected or related or matched users, subscribers, subscriptions of user from one or more sources including users, applications, services, communication channels, devices, databases of present network and/or external domains or web sites or networks and/or physical locations, places and sources.

In one embodiment user can manually editing, processing & updating of auto generated action item(s) via Manually procession auto generated action item(s) Component 3047 including adding, removing, editing or updating, formatting, filtering, aggregating, categorizing, ordering, sorting, converting, spell checking, spam & virus detecting one or more action or activity or status or log item(s), determining receivers, attaching one or more active links, accessible objects, applications, services links, associate metadata including categories, keywords, taxonomies & multimedia data, advertisements, privacy settings, set priority order.

Actions or Activities Processor Module 3055 can process one or more said received, recorded & stored action or activity or status or log item(s) including indexing, formatting, filtering, aggregating, categorizing, ordering, sorting, converting, spell checking, spam & virus detecting, auto determining receivers, auto attaching one or more active links, objects, applications, services, links, multimedia data, metadata, categories, keywords, taxonomies, system data, advertisements, apply privacy settings, set priority order.

Action or activity or status or log item(s) Generator Module 3060 generates action or activity or status or log item(s) based on monitored, tracked, processed action item(s) data received and stored to User Actions & Activities Store 3050, wherein action(s) item(s) comprises of user name, identity, profile link whose actions are monitored, tracked & recorded, action identity, action source(s) including web site, application, service, network, device, sensor, connected or related user, location and digital or automated sources, action date & time, action categories or types, action location(s), action details or descriptions, action associate one or more active links, action associate one or more identified objects, applications, services, people, groups, networks, action related one or more lists, attachments, multimedia data, action associate metadata including categories, keywords, ontology, taxonomies, system data, advertisement, privacy settings, preferences, dynamically associated or attach one or more services, applications, links, utilities & shared workspace link(s) for participate in the same activity as the sending user, take related actions, sharing, searching, tracking, communication, collaboration, accessing information and workflow, action source related availability status, tracking status, responses, communications, logs.

Action Item(s) determining and selections component 3061 facilitating users to search, match and select, filter, auto match, select from dynamic list, categories list and list of external domains one or more action or activity or status or log item(s) for sending or presenting to said selected actions items to determined one or more receivers.

Target Receivers Determining Component 3065 enables users to search, match, select, select from dynamically presented list, auto match one or more connected or related or matched users including friends, family members, co-workers, like minded users, subscribers, users of external domains. User can apply default privacy settings and determine and set default receivers including subscribers or user can dynamically apply privacy settings each time when user send or publish or present generated activities or actions or user can select auto matching of receivers option. System can auto determining or auto matching receivers based on user connections, subscribers, subscriptions, user profile & data, privacy settings, behavior, interest, auto match preferences including keywords, categories, location.

Sending privacy settings, preferences, selections & filter component 3070 facilitate users to apply privacy settings for sending action feed related action or activity or status or log item(s) including send one or more keywords or categories or types of generated actions or activities to one or more selected, matched, related users, subscribers and sources, scheduling action or activity or status or log item(s) for posting, filter one or more action or activity or status or log item(s) and send to filtered receivers from set of receivers.

Auto or manual queuing, scheduling, sending, posting, updating, publishing & presenting Module 3075 manually or automatically queue, schedule, sends, posts, displays, presents, updates, broadcasts, advertise, publishes, synchronize, attach, append, store one or more selected or determined action or activity or status or log item(s) to one or more determined target receivers or destinations including users, connected users of user, applications, services, networks, groups, databases, devices, communication channels, web pages, presentation systems.

Receivers of action feed or action or activity or status or log item(s) can apply one or more privacy settings, preferences, selections and filtrations, dynamic presentation settings & preferences for receiving action feed or action or activity or status or log item(s) via Receiving privacy settings, preferences, selections & filter component 3080.

Dynamic Presentation Module 3085 receives, maps, converts, formats as per user preferences or user mediated actions, sorts, orders, categories, attach one or more presentation features for selecting, attaching, detaching, adding, removing, updating, sorting, viewing as per different views including tree, tabular, web page, application format, categorizing, providing ranks and comments, sharing, forwarding to other users, searching, matching, filtering, bookmarking, printing, accessing active links, action associate accessible objects, applications, services, groups, networks, attachments, lists, workspaces, profile object, web pages, communication channels, multimedia data, objects links, providing responses, communication with sender of action or activity or status or log item(s), viewing metadata.

Active links accessing Module 3090 provides dynamically or automatically or manually associate or attach or link one or more active link(s) & one or more associate data with action item(s). User can create and update one or more categories lists of identified active links which are controlled by user and exist in social network based on user selection, uploaded by user, search & match, suggested & provided by connected & matched users, suggested list or auto generated by central unit based on user profiles, user data, user activities, recorded user's actions, past responses, interest, list of active links, list of active links of connected users, installed applications and provided by $3^{rd}$ parties developers, service providers and advertisers based on users privacy settings and preferences.

Active link(s) enables receiver(s) or viewing user(s) to access one or more applications, services, objects, multi AI agents, multimedia data & contents, people, networks, groups, links or URLs, ID, user profiles, profile objects, pages, attachments, informational links, shared workspaces from networks and/or from external domains, applications, networks, services and devices, to participate in the same activity as the sending user, take related actions, sharing, searching, tracking, communication, collaboration, accessing information, workflow, forward, share, edit, process, update, re-send, bookmark, format, buy, sale, refer, convert, dynamically present, action item(s).

Associate data of active link comprising URL or namespace of each active link for identifying and allowing to access active link associate objects, applications, services, media data, people, entities, identities, profile, group, network, page & other objects of network, active link related one or more metadata, categories, keywords, sources, providers, details, descriptions, properties, links, attachments, features, upload, created & use date & time, help, identifier & profile(s) of sender & receiver of active link, active link associate tracking status & status, active link associate object related user data and preferences, security policies, authentication information and privacy settings of accessing & sharing active link and active link associate object(s) related user data.

Sender can search, select, identify and manually attach or auto attach one or more active links with said action item(s), wherein said one or more attached active links enables receivers and/or responders to provide one or more responses & actions, communicate, collaborate, answer, share, search, workflow, take one or more actions, transact, e-commerce, social networking and participating activities of sender of message.

User actions on action or activity or status or log item(s) & active links Module 3091, user(s) can take one or more actions or group of actions on one or more selected or identified action or activity or status or log item(s) and associate active links, metadata & data comprising sort, filter, categories, share, rank, update, remove, bookmark, synchronies, send, organize & order, forward, transfer or assign, copy, search, match, present, apply privacy settings, metadata & preferences, view & access active links, user & providers actions and logs, report spam, abuse & violation, provide comments & ranks, attach or detach one or more active links, objects, profile objects, applications, services, connected, selected, matched users or group(s) of user(s) and providers, view, define & set tracking status, view statistics & analytics and set priority type.

System automatically provides or user manually set tracking status on one or more action or activity or status or log item(s) and active links via Tracking action or activity or status or log item(s) & active links (user actions) Module 3092. Tracking status & status of action or activity or status or log item(s), active link and user of active link comprising pending, online, offline, away, purchased, buy, sell, transacting, transaction complete, using, downloading, viewed, install, communication established, task completed, ticket booking and other active link associate tracking status & status.

User actions and activities search engine 3093 receives, stores, indexes each action or activity or status or log item(s) and associate active links, metadata & data based on privacy settings and processes said action or activity or status or log item(s) including formats, converts, apply privacy settings, spam or virus detection, spell checking, associate keywords, categories, taxonomies, advertisements, metadata and making them searchable for other users based on one or more search criteria.

The said one or more components of action or activity or status or log feeds server can interact with each other's in any order and steps. One or more component works in any combination and separately. All components are not necessary and fewer or more components may comprise action or activity or status or log feeds server. Components can work concurrently or step by step. One or more components are on same server or different server.

Figure 4:
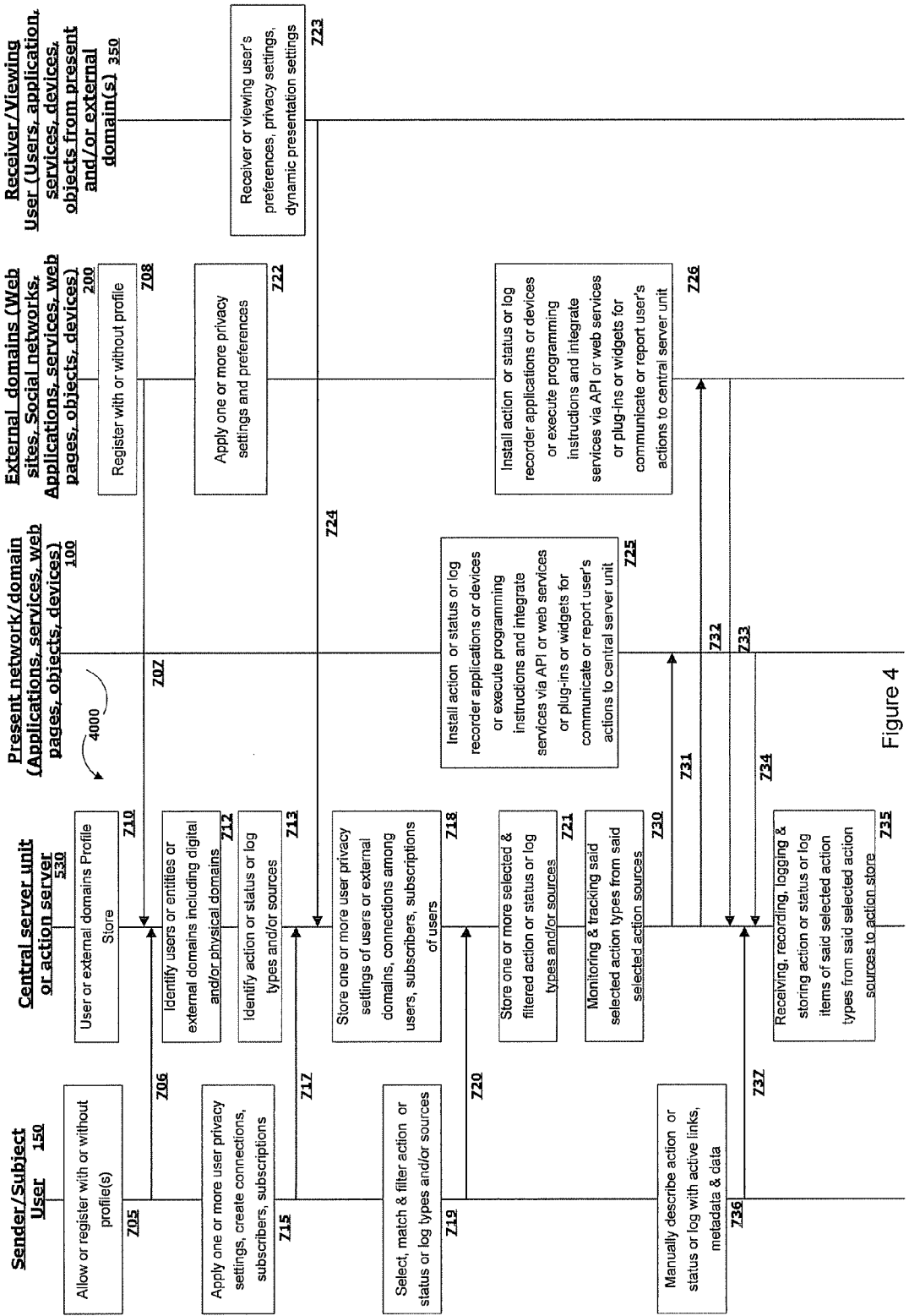
FIGS. 4 and 5 is an interaction diagram of a process for monitoring, tracking, storing, filtering, recording, determining, automatically generating, processing & presenting or displaying action or activity or status or log item(s) or action feed, in accordance with an embodiment of the invention.
Figure 5:
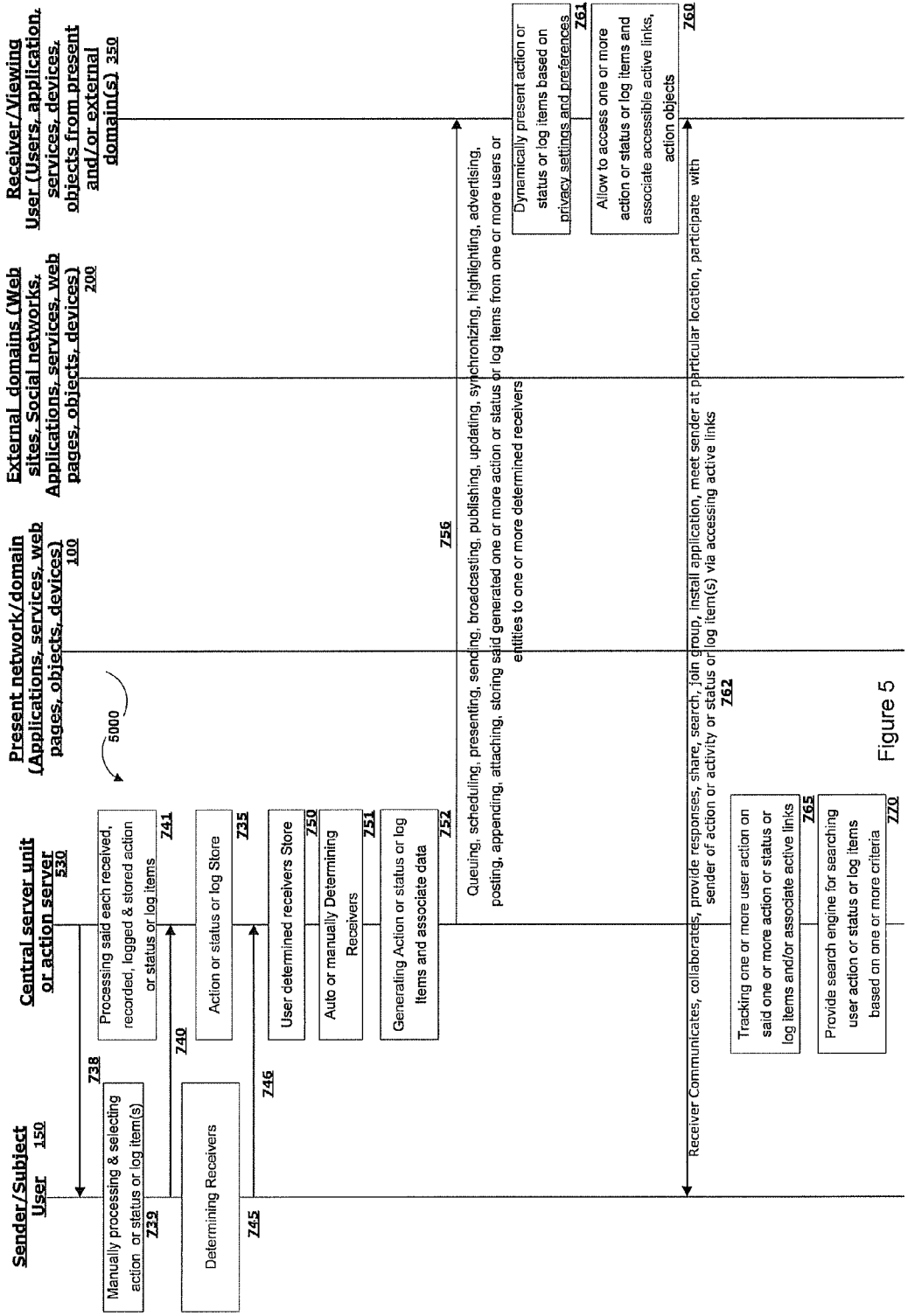

FIGS. 4 and 5 is an interaction diagram of a process for monitoring, tracking, storing, filtering, recording, determining, automatically generating, processing & presenting or displaying action or activity or status or log item(s) or action feed, in accordance with an embodiment of the invention.

In a process 705, users 150 are allow to register with or without profile with central server unit 530 for monitoring, tracking, recording, storing, processing user's one or more activities, actions, interactions, events, transactions, life stream, locations, behavior, movement, environment, status, states & conditions from one or more sources and/or send or present said generated action or activity or status or log item(s) to determined receivers.

In a process 706, registered users profile and registering information are stored to user profile store 710.

In a process 708, external domains, web sites, social networks, applications, services, objects, web pages, devices, external physical sources 200 including mall, shop, building, location, places, tree, smart devices, vehicle, cinema theatre, airport register with or without profile and privacy settings and preferences 722 with central server unit 530 of social network 100, wherein profile data and registration information are store 707 to external domain profile store 710.

In a process 712, central server unit or action server 530 without registration identifies users or entities or external domains including digital and/or physical domains whose one or more activities, actions, interactions, events, transactions, life stream, locations, behavior, movement, environment, status, states & conditions are monitored & tracked from one or more sources and/or record, store, process and/or send or present to determined receivers.

In a process 713, central server unit or action server 530 identifies activities, actions, interactions, events, transactions, life stream, locations, behavior, movement, environment, status, states & conditions types and/or sources for allowing users in process 719 to select, match & filter from dynamically presented activities, actions, interactions, events, transactions, life stream, locations, behavior, movement, environment, status, states & conditions types and/or sources and apply privacy settings and store one or more selected & filtered action types and/or sources to 721 and based on that in process 730 monitoring, tracking said one or more identified, selected and filtered activities, actions, interactions, events, transactions, life stream, locations, behavior, movement, environment, status, states & conditions types from one or more identified, selected and filtered sources including from 731 present network or domain, Applications, services, web pages, objects, devices 100 and/or from 732 external domains, Web sites, Social networks, Applications, services, web pages, objects, devices, physical sources, locations 200 based on 725 and/or 726 installed action recorder applications or devices or executing programming instructions and integrated services via API or web services or plug-ins or widgets for communicate or report user's actions to central server unit 530 via communication interface 733 and/or 734.

In a process 715, user can apply one or more user privacy settings, create connections, subscribers, subscriptions and store one or more said privacy settings of users or external domains, connections among users, subscribers, subscriptions of users to central server unit or action server 530 via communication interface 717.

In one embodiment in process 736, user can manually describe activities, actions, interactions, events, transactions, life stream, locations, behavior, movement, environment, status, states & conditions and manually associate or attach action categories, action date & time, profile object link, one or more active links, action associate one or more identified objects, applications, services, groups, networks, workspaces, connected users profile object links, attachments, lists, dynamic presentation & application features, privacy settings, multimedia data, and metadata.

In process 735, central server unit or action server 530 receives, records, logs & stores selected action types specific action or activity or status or log item(s) from said selected one or more action sources to action store including manually described 736 and send by user via communication interface 737, from 731 present network or domain, Applications, services, web pages, objects, devices 100 and/or from 732 external domains, Web sites, Social networks, Applications, services, web pages, objects, devices, physical sources, locations 200 based on 725 and/or 726 installed action recorder applications or devices or executing programming instructions and integrated services via API or web services or plug-ins or widgets for communicate or report user's actions to central server unit 530 via communication interface 733 and/or 734.

In a process 723, receivers or viewing user of action or activity or status or log item(s) can apply or provide or set one or more preferences, privacy settings, dynamic presentation settings which are store to 718 via communication interface 724.

In a process 739 user can manually editing, processing & updating of auto generated action item(s) including adding, removing, editing or updating, formatting, filtering, aggregating, categorizing, ordering, sorting, converting, spell checking, spam & virus detecting one or more action or activity or status or log item(s), determining receivers, attaching one or more active links, accessible objects, applications, services links, associate metadata including categories, keywords, taxonomies & multimedia data, advertisements, privacy settings, set priority order and store processed action or activity or status or log item(s) to action store 735 via communication interface 740.

In a process 741, central server unit or action server 530 can processing said each received, recorded, logged & stored action or activity or status or log item(s) 738 from one or more sources including indexing, formatting, filtering, aggregating, categorizing, ordering, sorting, converting, spell checking, spam & virus detecting, auto determining receivers, auto attaching one or more active links, objects, applications, services, links, multimedia data, metadata, categories, keywords, taxonomies, system data, advertisements, apply privacy settings, set priority order and store processed action or activity or status or log item(s) to action store 735 via communication interface 746.

In a process 745, user can dynamically determining receivers each time user send selected action or activity or status or log item(s) based on dynamically presented list or set of receivers including connected or related or matched users of user and/or apply or update default privacy settings for sending one or more selected generated action or activity or status or log item(s) and/or one or more types of action or activity or status or log item(s) to one or more receivers and/or subscribers and/or any destinations including applications, services, objects, web pages, communication channels, networks, groups, profiles of users and/or present domain and/or external domains or user can automatically send action or activity or status or log item(s) to receivers based on auto match making preferences or auto determined by central server unit or action server option.

In a process 745, sender can determining one or more action feed receivers based on selecting one or more connected or matched or filtered users, connected users of connected users or one or more degrees of separations, subscribers or categories of subscribers, verified & expert service providers, all users (public) of network and determine by other users including user selected, connected, matched users and store said user determined receivers and privacy settings to user determined receivers store 750 via communication interface 746, wherein said categorized contacts or connections or dynamic relationships comprise contacts determined by searching and selecting known connections of connected users, unknown likeminded users based on one or more search criteria, said categorized contacts optionally enabled by accepting invitations from users and said subscription based on selections, send request or invite others, connections, contacts, search people, find friends from contacts, search sources from message(s) associate source(s), search subscribers & subscriptions of each public user, one or two way match making preferences, rules, conditions, categories, taxonomy wise directories & lists, auto match making based on preferences, profile, user data and user activities, actions, events & transactions, life stream.

In a process 751, central server unit or action server 530 can auto or manually determining target receivers for said action or activity or status or log item(s). Auto determining one or more action feed receivers by the central unit by auto match making of receivers based on action item(s) & associate metadata, sender and/or receiver's matchmaking preferences including filters, conditions, ranks, categories, keywords, sender profiles, sender privacy settings, user data, interest, behavior, available receivers, receivers profiles, responses.

In a process 752, central server unit or action server 530 can generating action or activity or status or log item(s) and associate data for sending or presenting to determined receivers based on said stored and processed action or activity or status or log item(s), associate active links, metadata & data, privacy settings, preferences, presentation settings, determined receivers. Generated action(s) item(s) comprising user name, identity, profile link whose actions are monitored, tracked & recorded, action identity, action source(s) including web site, application, service, network, device, sensor, connected or related user, location and digital or automated sources, action date & time, action categories or types, action location(s), action details or descriptions, action associate one or more active links, action associate one or more identified objects, applications, services, people, groups, networks, action related one or more lists, attachments, multimedia data, action associate metadata including categories, keywords, ontology, taxonomies, system data, advertisement, privacy settings, preferences, dynamically associated or attach one or more services, applications, links, utilities & shared workspace link(s) for participate in the same activity as the sending user, take related actions, sharing, searching, tracking, communication, collaboration, accessing information and workflow.

In a step 756, central server unit or action server 530 can queuing, scheduling, presenting, sending, broadcasting, publishing, updating, synchronizing, highlighting, advertising, posting, appending, attaching, storing said generated one or more action or activity or status or log item(s) to one or more determined receivers of present network and/or external domains including connected or related or selected or matched users of user or subscribers of user, applications, services, web pages, communication channels, databases, presentation systems, devices, networks, groups and any digital sources or destinations.

In a process 761, receiver's domain process said received action or activity or status or log item(s) including formatting, converting, detecting spam and virus, spell checking, attaching or associating or linking one or more active links, accessible applications, services, objects, groups, profile objects, advertisements, dynamic presentation & application features, applying privacy settings, preferences and presentation settings and dynamically presents, displays, attaches, appends, stores to one or more target receivers including user or sender or source of action, determined or selected or connected or matched or related user of sender, applications, services, web pages, communication channels, databases, presentation systems, devices, networks, groups and any digital sources or destinations.

In a process 760, user(s) can take one or more actions or group of actions on one or more selected or identified action or activity or status or log item(s) and associate active links, metadata & data comprising sort, filter, categories, share, rank, update, remove, bookmark, synchronies, send, organize & order, forward, transfer or assign, copy, search, match, present, apply privacy settings, metadata & preferences, view & access active links, user & providers actions and logs, report spam, abuse & violation, provide comments & ranks, attach or detach one or more active links, objects, profile objects, applications, services, connected, selected, matched users or group(s) of user(s) and providers, view, define & set tracking status, view statistics & analytics and set priority type.

In a process 765, central server unit or action server 530 automatically provides or user manually set tracking status on one or more action or activity or status or log item(s) and active links via Tracking action or activity or status or log item(s) & active links (user actions) Module 3092. Tracking status & status of action or activity or status or log item(s), active link and user of active link comprising pending, online, offline, away, purchased, buy, sell, transacting, transaction complete, using, downloading, viewed, install, communication established, task completed, ticket booking and other active link associate tracking status & status.

In a process 770, central server unit or action server 530 receives, stores, indexes each action or activity or status or log item(s) and associate active links, metadata & data based on privacy settings and processes said action or activity or status or log item(s) including formats, converts, apply privacy settings, spam or virus detection, spell checking, associate keywords, categories, taxonomies, advertisements, metadata and making them searchable for other users based on one or more search criteria.

The said one or more components or modules of action server can interact with each other's in any order and steps. One or more components or modules work in any combination, separately and remotely. All components or modules are not necessary and fewer or more components or modules may comprise action server. Components or modules can work concurrently or step by step. One or more components or modules are on same server or different server.

Figure 6:
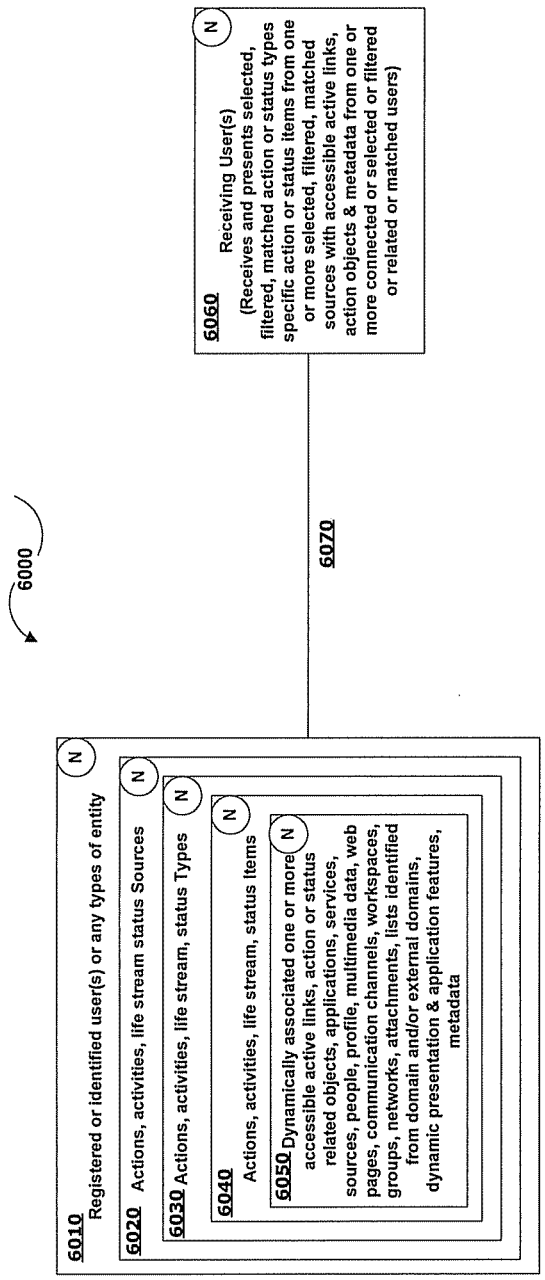
FIG. 6 illustrates examples, in accordance with an embodiment of the invention.

FIG. 6, in one embodiment illustrated diagram for explaining present invention. Present invention can plurality of ways 6010 identifies, registers, monitors, tracks, records, logs and receives, imports, maintains & stores action or activity or status or log item(s) related to plurality of 6030 types of activities, actions, interactions, events, transactions, life stream, locations, behavior, movement, environment, logs, status, states & conditions of plurality types of users and entities from plurality of 6020 sources and plurality of ways processes & generates action or activity or status or log item(s) 6040 and 6070 send, post, present, display, update, attach, append, store, dynamically process & present, broadcast, advertise, publish, synchronize, highlight to plurality of ways determined receivers of plurality types. Receivers can access plurality types of active links in plurality of ways for plurality of action item specific purposes and take plurality types of actions on action item(s). System can automatically provide tracking status or user can manually provide tracking status in plurality of types:

plurality of ways identifies users or entities (sender and/or receiver of action or activity or status or log item(s)) whose one or more activities, actions, interactions, events, transactions, life stream, locations, behavior, movement, environment, logs, status, states & conditions are monitored & tracked from one or more sources and/or record, store, process and/or send or present to determined receivers comprising auto identifying user based on real time user permission for particular action, auto detecting user action, permission of user data owner including user transactions data from one or more sources, current location of user, based on $3^{rd}$ parties permission where users are registered and provide permission and privacy settings including external domains, web sites, applications, services, databases, devices, networks, groups, sources, communication channels, sensors.

plurality of ways to registers users or entities (sender and/or receiver of action or activity or status or log item(s)) comprising register with present network with or without profile, import user registration and profile information from $3^{rd}$ parties including external domains, web sites, applications, services, databases, devices, networks, groups, sources, communication channels, sensors based on user(s) and external domain(s) permissions, preferences and privacy settings, register as guest user(s) or trial user(s), temporary register with action server, group registration, register from remote or $3^{rd}$ parties domains and register by connected users of user.

plurality of ways to automatically and/or manually monitors, tracks, records, logs of action or activity or status or log item(s) comprising monitoring & tracking user's one or more activities, actions, events, transactions, life stream, locations, behavior, facial expressions, emotions, movement, workflow, logs, follow-ups, environment, status & conditions based on one or more sensors, detectors, transducers, video cameras, audio recorders, imaging, RFID, barcodes, touch screens, devices including mobile, digital televisions, digital watch, digital pen, automations, scanners, robotics, computer system, computer chips or processors, instruments, speech & text recognition, video & face recognition, speech or voice sources, translating system, application, services, networks, logs, programming, and human mediated actions including analysis, logic, guess, selections, privacy settings, preferences, settings, inspection, checking, verification.

plurality of ways to receives, imports, maintains & stores action or activity or status or log item(s) from plurality of sources of action or activity or status or log item(s) at the central unit or action server comprising receive action or activity or status or log item(s) from automatically and/or manually generated or drafted, monitored & tracked from plurality of sources including user, connected users of user, applications, services, communication channels, networks, groups, databases of present network and/or external domains and/or physical domains or places or locations or manually drafted and/or selected and/or send by user or connected, matched, related users of user or imports from external domains, web sites, web pages, databases, repositories, applications, services, devices, sensors and any digital sources.

plurality of types of activities, actions, interactions, events, transactions, life stream, locations, behavior, movement, environment, logs, status, states & conditions for monitoring, tracking, recording, storing, processing and presenting action or activity or status or log items.

plurality of types of users or entities (sender and/or receiver) comprising registered user, unregistered user, users of social network, connected or related users of user, group(s) of user, objects, animals, birds, tree, vehicles, machineries, fixture & furniture, building, structure or infrastructure, location, tourist places, non-living things, digital or automated sources & destinations, applications, services, networks including communication networks, external networks, non-social networks, centralized or peer to peer networks, groups, devices, sensors, automations, communication systems, multi artificial intelligence agent(s), $3^{rd}$ parties web sites, applications, services, devices, sensors, databases, repositories, networks, other users on behalf of user including connected or related users, friends, family members, co-workers, classmates, sellers, teachers, doctors, lawyers, professionals, and any combination thereof action item comprising plurality types of action associate or attached data including user name, identity, profile link whose actions are monitored, tracked & recorded, action identity, action source(s) including web site, application, service, network, device, sensor, connected or related user, location and digital or automated sources, action date & time, action categories or types, action location(s), action details or descriptions, action associate one or more active links, action associate one or more identified objects, applications, services, people, groups, networks, action related one or more lists, attachments, multimedia data, action associate metadata including categories, keywords, ontology, taxonomies, system data, advertisement, privacy settings, preferences, dynamically associated or attach one or more services, applications, links, utilities & shared workspace link(s) for participate in the same activity as the sending user, take related actions, sharing, searching, tracking, communication, collaboration, accessing information and workflow, action source related availability status, tracking status, responses, communications, logs.

plurality of ways of processing action or activity or status or log item(s) comprising storing, updating, indexing, validating & formatting including editing, clarifying, update details, fonts settings, spell checking, language & spam detecting, translating, transcribing, converting to other formats like voice, text, associating priority types including high, normal, low, expiration, date & time, categories, keywords, locations, advertisements, payment information, profile data, URL, dynamically attaching one or more system data, active links, informational links, attachments, multimedia contents, applications and service including communication utilities and shared workspace for providing response, collaboration, participation, tracking, answering, communication, workflow, services & task fulfillment, searching, sharing, social networking, purchasing, transactions, information and determining one or more receivers for sending or routing or publishing said action item(s) to one or more determined receivers.

plurality of ways of generating action or activity or status or log item(s) comprising auto generating action or activity or status or log item(s) by central server unit based on sender's preferences, privacy settings, real time permissions and manually generating action or activity or status or log item(s) based on user selection of action or activity or status or log item(s), action types, action sources, user mediated processing, editing, drafting, describing of action item(s), attaching or associating active links, metadata & data with action item(s) by user.

plurality of ways of sending or presenting action or activity or status or log item(s) to determined receivers comprising sending action or activity or status or log item(s) based on send action or activity or status or log item(s) in real time and/or near real time, queuing action or activity or status or log item(s) and send, scheduling action or activity or status or log item(s) for sending, send to relay server and then present to determined receivers, when user login or session established or receivers including applications, services, devices initiates or invoke or starts then send or present action or activity or status or log item(s), dynamically send and/or present action or activity or status or log item(s) based on sender(s)' and/or receiver(s)' and/or domain's of sender(s) and receiver(s)' selections, auto sending option selection or setting, permissions and privacy settings and dynamically present action or activity or status or log item(s) to receivers based on dynamic presentation settings of receiver(s) including processing, formatting, converting, mapping, customization settings, real time settings. In one embodiment user's actions are monitored, tracked and directly send to user's device including mobile or smart devices. In another embodiment user can manually monitor & track and/or manually prepare or describe action item(s) and/or manually send or publish or update or present or attach to one or more user determined receivers and/or destination including email, instant messenger (IM), databases, applications, services, communication channels, web sites, profile of user and/or connected or determined users or subscribers of user. In another embodiment server(s), devices, sensors, applications, and services automatically monitors, tracks, records, process, determine receivers, send to determined receivers of action or activity or status or log item(s), and tracks actions on action or activity or status or log item(s).

plurality of ways to determining receivers comprising determining receivers based on selecting one or more connected users, connected users of connected users, subscribers, verified & expert service providers, all users (public) of network and determine by other users including user selected, connected, matched users, applying default privacy settings for sending one or more types of action item(s) to one or more selected or set or groups of receivers, selecting from dynamically presented list based on action item(s) data, action item(s) types and select auto match or auto determine by central server unit option. Auto determine one or more target receivers by the central unit by auto match making of receivers/responders based on action item(s) & associate metadata, sender and/or receiver's matchmaking preferences including filters, conditions, ranks, categories, keywords, sender profiles, sender privacy settings, user data, interest, behavior, random, available receivers/responders, receivers/responder's profiles, responses of responders.

plurality types and use of action item(s) attached or associate active links comprising active links associate with said action item enables receivers to communicate, collaborate, edit, update, process, access, order, direct, consult, warning, alerts, notification, send something via courier, provide comments, assign jobs & tasks, provide alternative works or tasks to available users, fulfill workflow, provide service, purchase products & services, accept deals, negotiate with customers, guiding somebody, sharing photos, provide directions and location information, refer brands, products & services to connected users and allow them to buy products & services, teach how to play sports, prescribe medicines, share brands purchase or preferred or like by user, modify food prepared by cook as per customers requirements, send person for repairing, maintenance, training, helping, selling, preparing, guide based on user preferences, profile, interest, education, age and like, and takes any types of user actions.

plurality of user actions on action item(s) comprising user(s) can take one or more actions or group of actions on one or more selected or identified action or activity or status or log item(s) and associate active links, metadata & data comprising sort, filter, categories, share, rank, update, remove, bookmark, synchronies, send, organize & order, forward, transfer or assign, copy, search, match, present, apply privacy settings, metadata & preferences, view & access active links, user & providers actions and logs, report spam, abuse & violation, provide comments & ranks, attach or detach one or more active links, objects, profile objects, applications, services, connected, selected, matched users or group(s) of user(s) and providers, view, define & set tracking status, view statistics & analytics and set priority type.

plurality of tracking status comprising system automatically provides or user manually set tracking status on one or more action or activity or status or log item(s) and active links. Tracking status & status of action or activity or status or log item(s), active link and user of active link comprising pending, online, offline, away, purchased, buy, sell, transacting, transaction complete, using, downloading, viewed, install, communication established, task completed, ticket booking and other active link associate tracking status & status.

FIG. 7 illustrates some examples of one embodiment of present invention. 8010 show dynamically presented or presented one or more types of physical or digital activities, actions, interactions, communications, responses, events, transactions, life stream, logs, locations, behavior, movement, environment, status, states & conditions for user selections. User can select one or more types for allowing system to monitor, track, record, store, process, determine receivers, generates and present or send said one or more types specific one or more actions or statuses or logs items. 7011 shows, dynamically presented identified, registered, and subscribed one or more external domains or destinations of present domain to user for user selections. User or sender of action or status or log items can send, present, update, publish, synchronize said one or more types of one or more action or status or log items to one or more web sites, external domains and one or more applications, services, devices, databases, objects, web pages, networks, groups, user's or receivers profile(s), connected users of user, communication channels of present domain or web site and/or external domains. 7012 shows list of identified, listed, registered, subscribed, invited one or more external domains including one or more web sites, applications, services, devices, databases, objects, web pages, networks, groups, user's profile(s), profile of connected users of user, communication channels with which user's are registered or identified and from that one or more selected said sources user want to receive one or more selected or determined types of action or status or log items in present domain or web site or action or status or log feed application or web pages, profile of user, one or more applications, services, networks, groups, devices, databases.

7013 shows exemplary monitored, tracked, recorded, stored, generated, and presented action or status or log items related some of database fields, metadata, parameters, items including action data & time 7015, action originator or source user's or actor's identity, name & profile link 7020, action one or more categories & taxonomy classifications 7025, action description or details 7030 comprising who-what-where-when-how-why about action & action related anything, location of action, log reports, status details, action sources 7030 including user profile, user data, connected users of user, applications, services, objects, devices, mobiles, sensors, physical locations, RFID, databases, networks, groups, web pages, interacted users, external domains, multimedia data, messages, communications, responses and any types of digital and/or physical sources, action related or associate or identified any objects, applications, services, links, groups, network, profile objects, database, messages, communications, communication channels, connected users names, profile links & identities, people, web pages, devices, AI agents, multimedia data, action associate or attached attachments 7035, lists 7040, multimedia data, metadata, workspaces 7045, services 7050, dynamic presentation & application features, active links 7055, tracking status 7060 and communication details 7065 related to one or more types of physical or digital activities, actions, interactions, communications, responses, events, transactions, life stream, logs, locations, behavior, movement, environment, status, states & conditions.

Physical activities, actions, status of user or any types of entities further comprising plurality of fields, metadata, data including weight, size, height, time, duration, length, condition, status, heat, motion, Light, motion, temperature, magnetic fields, gravity, humidity, vibration, pressure, electrical fields, sound, and other physical aspects of the external environment, Physical aspects of the internal environment, such as stretch, motion of the organism, and position of appendages, Environmental molecules, including toxins, nutrients, and pheromones, Estimation of bimolecular interaction and some kinetics parameters, Internal metabolic milieu, such as glucose level, oxygen level, Internal signal molecules, such as hormones, neurotransmitters, and cytokines.

Figure 8:
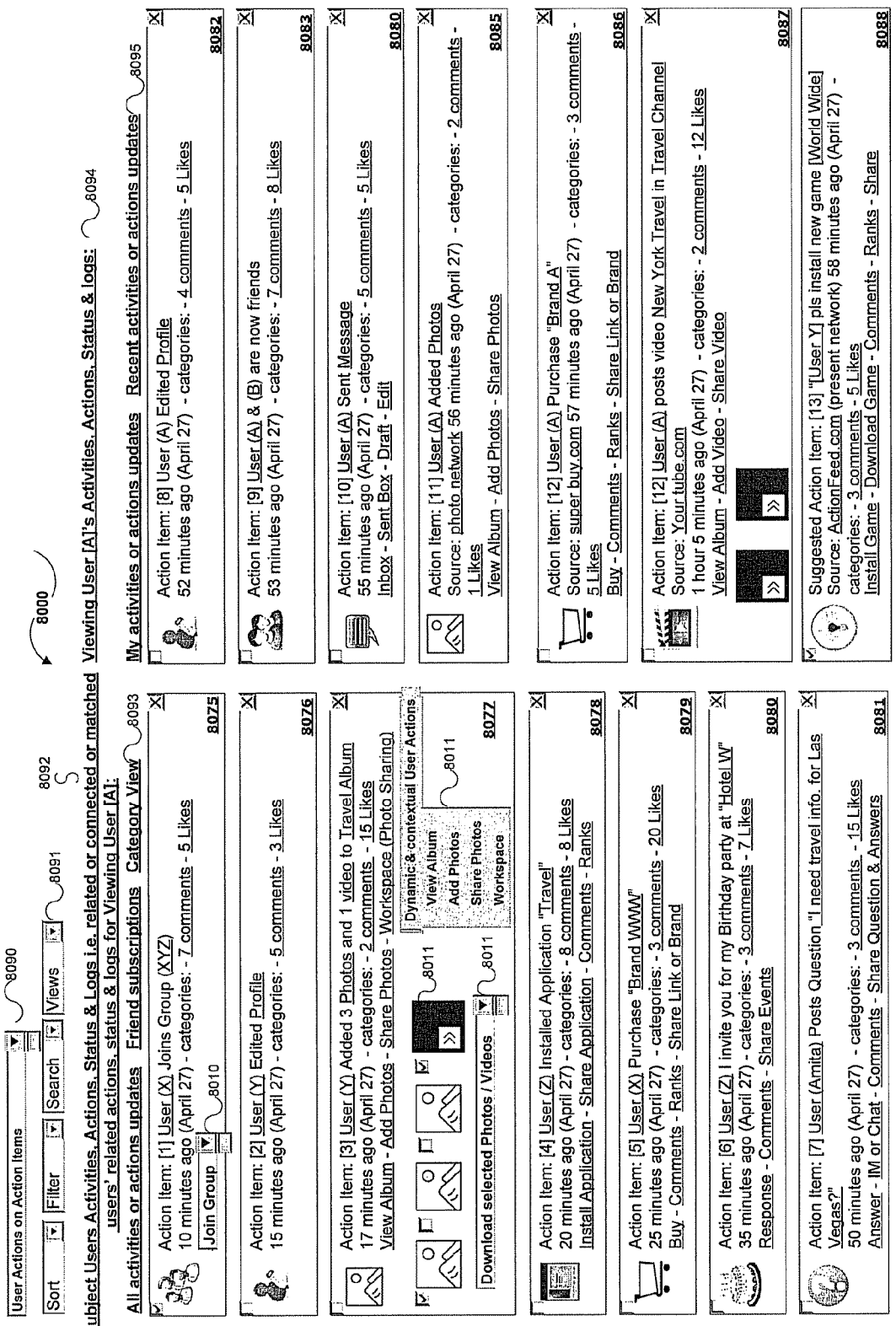
FIG. 8 illustrates examples, in accordance with an embodiment of the invention.

FIG. 8 shows user friendly presentation of said examples, For example screen 8000 shows all presented action feed including action or status or log items of 8094 User [A]'s and 8092 connected or sender or related or matched users [X], [Y], [Z], & [Amita] of viewing user [A] in chronological order. Each action item presented based on concatenate text of above discussed one or more action item related fields, metadata, parameters, and any action related, recorded, monitored, tracked, processed, stored data. For example 8075 action item [1] is "User (X) Joins Group (XYZ)" in which User (X) is action source user or originating user or action doer or connected user of user or sender of action item and present with accessible sender's profile object link to viewing user, "Joins Group" is action category or type, (XYZ) is one of identified and accessible action associate group object. Action item also provide action date & time, categories, keywords, current location, provided comments & ranks or likes, action item also comprising action item associate or attach dynamic, contextual & accessible one or more active links for example user can "Join Group" active link from list of active links 8010 or Joins Group (XYZ) default active link, which enables viewing user [A] to join group [XYZ] of connected or sender user [X]. For example User [Y] selects "Edit Profile"

type action for monitoring, tracking, detecting, recording, processing user action with active links and metadata when user edit or update or change profile. 8076 shows action item of user[Y] regarding "User (Y) edited (Profile)" in which link of User (Y) or (Profile) are accessible sender user[Y]'s action related profile objects which enables user [A] i.e. receiving or viewing or connected user of user [Y] to view edited or updated or changed profile of user [Y]. Another example 8077 shows action item "User (Y) Added 3 Photos and 1 video to Travel Album in which action related or recorded or identified objects including sender profile object—User (Y), adding photo action type specific attachments including multimedia data links—Photos and video which are also presented to user with action item for easy viewing and interactions. Action item specific dynamic application features or dynamic and contextual active links are present to viewing user including View Album—Add Photos—Share Photos—Workspace (Photo Sharing) or presented in menu form 8011, wherein View Album active link enables receiving user [A] to view said album in which new photos are added or photo adding action type is identified or monitored or detected, Add Photos active link enables receiving user to participate with sender of action item like add one or more photos to said album, Share Photos or Workspace (Photo Sharing) enables receiving user to further share or collaboratively share said action item or attached photos and/or video with one o more connected or selected or related or matched users of user [A]. Other examples 8078 enables receiving user [A] to install or share same application as user [Z] installed by clicking on active link Installed Application "Travel" which are associate with default action "install application" or user can click on Install Application, or Share Application active links options, 8079 enables receiving user [A] to purchase same brand as purchase by user [X], 8080 shows reply to birth day party and 8081 shows provide answer of user[Amita]'s question by using associate answer application, instant messenger application active links. In one embodiment user can select or click on one or more active links. In one embodiment user can select one or more attachments or lists and take one or more user actions on said selected one or more lists or attachments. For example 8011 shows user can select one or more photos or videos and take one or more user actions on said selected one or more photos or videos like use can select or click "Download selected Photos/Videos" user action for downloading said selected one or more photos or videos.

In one embodiment, presenting suggested relevant, contextual or filtered Activity or Action or Status or Log item to users which are prepared (attaching active links) by central unit and/or one or more connected or related or selected or matched users and/or external domains, web sites, applications, services & devices regarding To-do something, participate in particular one or more activities, take one or more actions, provide user services, provide user generated contents, advertise something, install particular applications, join particular groups or networks, purchase particular deals or brands or products or services, subscribe particular services, view particular relevant videos or photos or multimedia data. For example (1) "[User Y] please fill particular survey" with active links (1) Print (2) Share and (3) Submit (survey form with dynamic application features and active links like print or share or submit survey form(s)), wherein said active link enables viewing user to fill survey and submit or share survey forms to central unit and/or one or more connected or related or selected or matched users. Another example is presenting Activity or Action or Status or Log item (2) "[User Y] we suggest you to pls install new game [World Wide]" 8088 to viewing user [Y] based on user's preferences, profile data, transactions data, user data, user actions or activities related auto generated data, shared data, privacy settings, social graph, behavior. User[Y] can install said suggested application via active link [World Wide] or Install Game or Download Game. System can further monitor, track, filter, process, generate and present one or more user actions or activities based on said one or more selected suggested Activity or Action or Status or Log items to one or more connected or related or selected or matched users. In one embodiment user can set suggested Activity or Action or Status or Log feeds preferences including select one or more filter types or Activity or Action or Status or Log categories for receiving particular types of applications, services, users, deals, keywords, categories, locations related suggested Activity or Action or Status or Log feeds.

FIG. 9 provides various examples of one embodiment of invention and presents various physical activities, actions, status & logs of user [Yogesh Rathod] which are presented to viewing user [Amita Rathod]. For example 9010 shows "Yogesh Rathod purchase ABC brand watch from Super Mall." action item of user [Yogesh Rathod] in "Yogesh Rathod" link is link of profile object of action sender user [Yogesh Rathod] and action associate identified, related accessible objects are brand page (ABC) and (Super Mall) which enables receiving users to access said action associate objects and view brands related information, purchase brands and action item associate dynamically attached accessible active links including (1) Chat (2) IM (3) Deals (4) Map (5) Buy (6) Share enables receiving or sending user to chat or messaging with each others, accept deals or buy products, make payment, view brand information, share said action item with other users. System also monitors, tracks, records, process and presents User [Amita Rathod] actions on said action item includes when user click active link buy and purchase brand ABC mobile or user physically buys brand ABC mobile from "Smart Mall" system monitors, tracks, records, process and presents said action and present to user and connected or related or matched users of user or determined receiving users by user. System also presents various tracking status based on user actions including pending, viewed, received, installed, download, user is online or offline or away, buy something and like. System also presents or display accessible list of one or more sources of action including for example in this action item—video camera & recognition application, transaction database of super mall, RFID tag & reader, mobile device of user for identifying user, user details, purchased brand name, shop details and like, receivers of action or activity or status or log item(s), action item associate communications, log reports, messages, attachments, workflow messages, responses and comments.

Example 9020 shows user's location status or action is identified by system via mobile device and present to user and connected users of user with accessible, dynamic active links comprising one or more communication applications, e-commerce applications, Map 7 sharing utilities, action associate objects, web pages, profile objects, user actions, tracking status, and associate responses.

Example 9030 shows identifying user's physical location and interacted user's physical location and identifying events based on human mediated action, sensors, video camera of source e.g. Taj hotel, event note of user and generating action item with one or more accessible active links, metadata, target receivers list, metadata, communication details related to said action item and tracks action item associate user actions and present tracking status.

Example 9040 shows action or location of particular car e.g. BMW Car of User [Yogesh Rathod] based on location detection devices including smart devices integrated in car for identifying car's locations.

FIG. 10—10010 shows action or activity or status or log item(s) for viewing user or action or activity or status or log item(s) related of User [Yogesh Rathod] and connected users of user [Yogesh Rathod]. 8610 shows action or activity or status or log item(s) which are generates when user takes photos via video camera of mobile device based on mobile device.

FIG. 10—10020 shows action item which are generates when user communicates or interacts with other user via mobile device based on mobile device.

FIG. 10—10030 shows action or status item regarding user's availability and providing particular services based on availability status manually provides by user or availability status detected by system based on user profiles, service profiles, user data, one or more types of sensors, human mediated actions, video camera and other smart devices and technologies.

FIG. 10—10040 shows action or status item regarding user [BMW Car]'s availability based on availability status manually provides by owner of car or availability status detected by system based on one or more types of sensors, human mediated actions, video camera and other smart devices and technologies.

Figure 11:
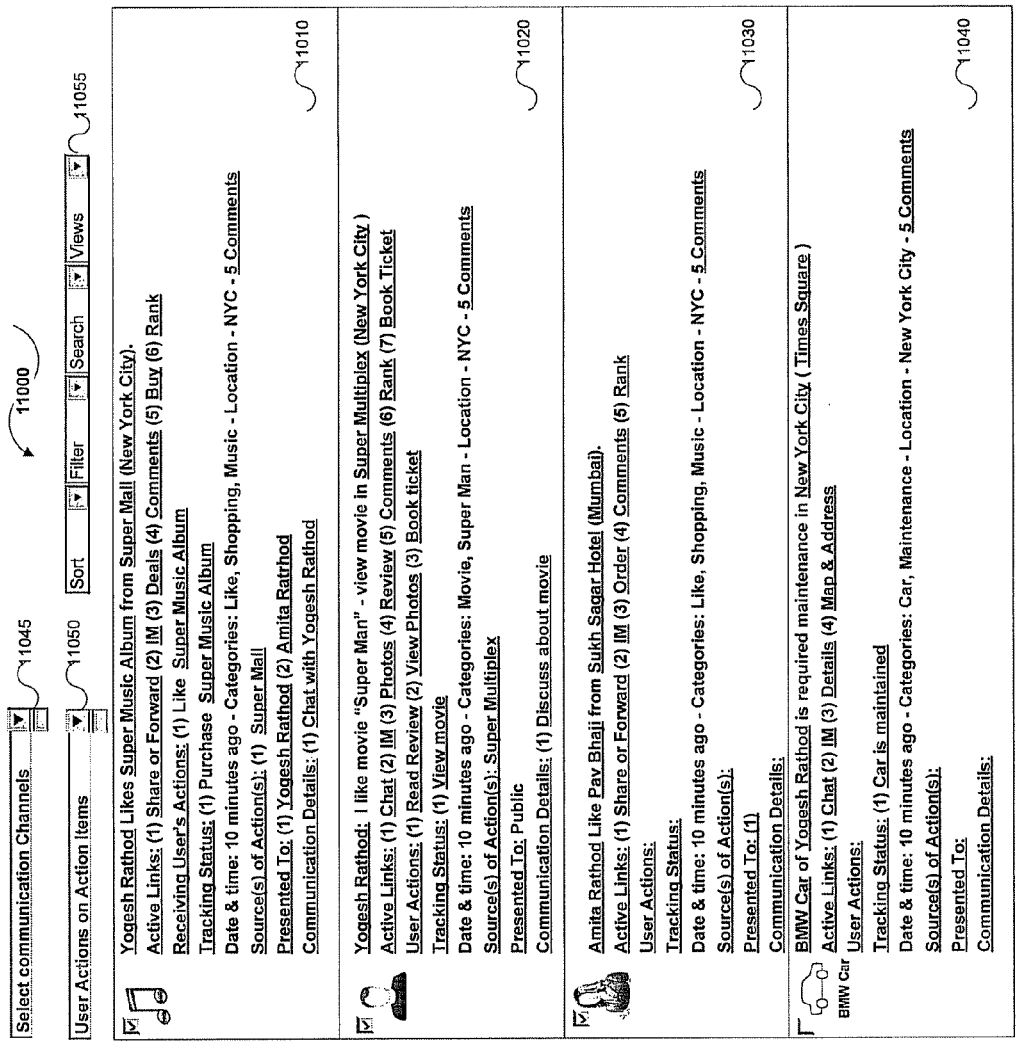
FIG. 11 illustrates examples, in accordance with an embodiment of the invention.

FIG. 11—11010 shows action item regarding User [Yogesh Rathod] visiting "Super Mall" and like "Super Music Album", wherein said physically like particular brand i.e. "Super Music Album" from physical location or mall "Super Mall" is monitored, tracked, detected, sensed and recorded based on video camera & video recognition application, user mediated actions, RFID & RFID reader, touch screen selection, pressing physical like button, mobile device, voice recognition, sensors. Action item associate active links enables receiving user to buy said album by clicking on said active link which invokes or opens buying application and receiving user can buy said album.

Similar examples are 11020 and 11030 shows action or activity or status or log item(s) which indicate or records user's physically like something including particular brand or movie or food items.

FIG. 11—11040 shows action item about maintenance requirement of particular car. For example 11040 display action or activity or status or log item(s) based on sensors, user mediated actions and video camera integrated with car which detects, monitors & records maintenance requirement of car and generates and/or send said action item to central server unit which in turn determine receiver and send to maintenance service providers.

Figure 12:
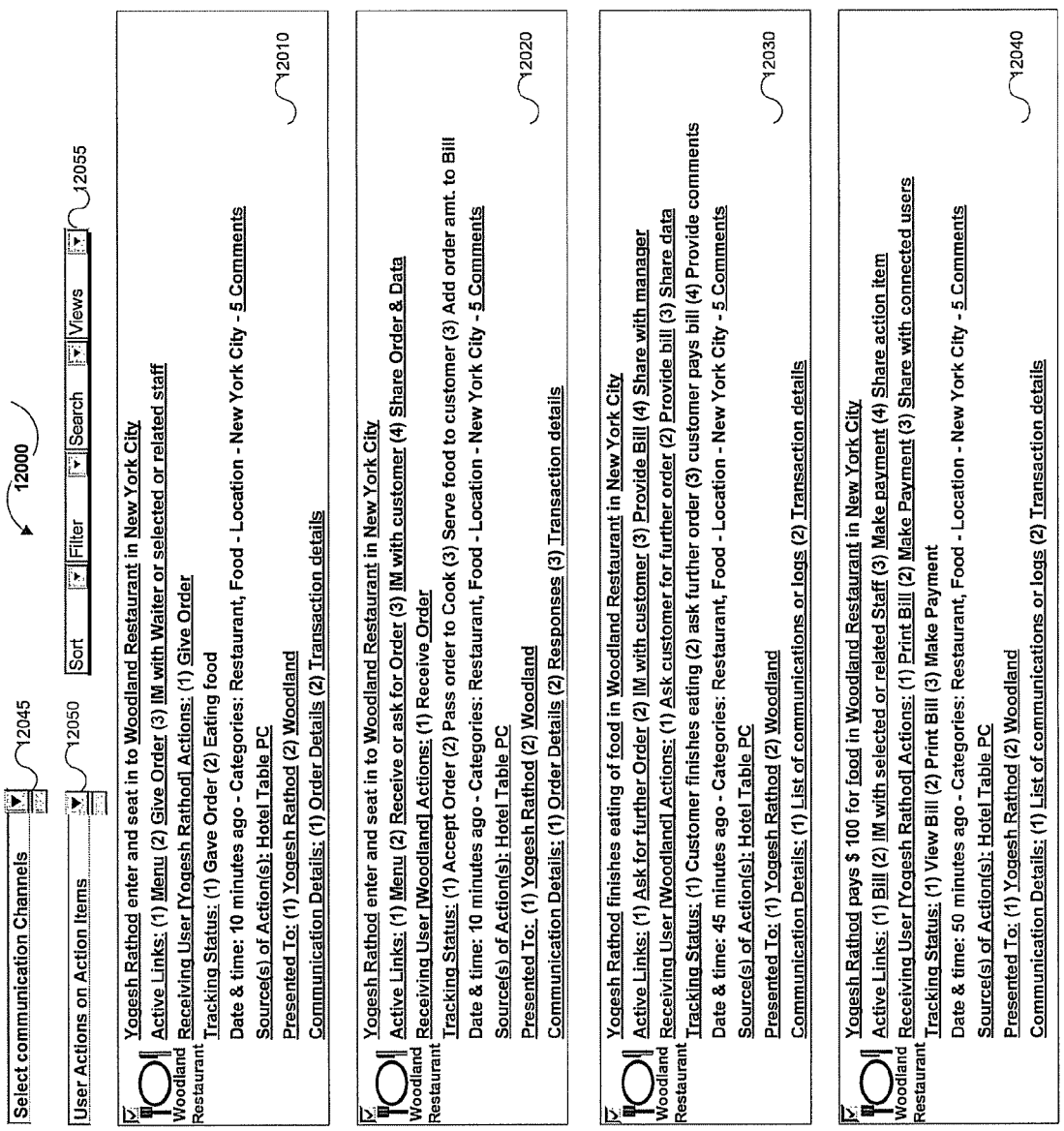
FIG. 12 illustrates examples, in accordance with an embodiment of the invention.

FIG. 12—12010 to 12040 shows workflow related action or activity or status or log item(s) and associate dynamic, contextual and accessible active links for facilitating workflow regarding identifying entered customer(s), presenting menu, communicate with each other including customer(s), cook, waiter, manager, other staff, connected or related or matched users of user, giving and receiving order, preparing bill, making payment, updating inventory, FIG. 12—12010 shows user's physical action "entering in to woodland restaurant" which are monitored, tracked, recorded, processed and presented based on restaurant's video camera, mobile device or mobile device identity of user [Yogesh Rathod], RFID tags & reader and any other detection, monitoring or tracking device which detects, identifies, monitors, logs, tracks and generates action item for that particular person who entered in to restaurant and present to said entered user e.g. [Yogesh Rathod] and/or hotel administrator or manager or cook or waiter or billing department. Action or activity or status or log item(s) are automatically and/or manually attach with action item which are same or different for sending and one or more receiving users. Action item associate active links enables user [Yogesh Rathod] to select food items from menu, give order and communicate with waiter or cook for providing food preparation instructions. System can also monitor, track, record, store and present one or more actions on said action item and associate one or more active links.

FIG. 12—12020 shows same generated action item as presented in 12010 but different active links for hotel administrator or may further different active links for cook or manager or waiter for workflow, wherein said one or more active links attach with said action item enables cook or manager or waiter to present and discuss menu, ask or receive order, communicate with customer, and share action item associate all communication, transaction, log data with one or more other connected or related users or staff of restaurant. System can also monitor, track, record, store and present one or more actions on said action item and associate one or more active links.

FIG. 12—12030 shows status or condition item related to status or action of user related to eating of food which are monitored, tracked, recorded, generated and presented based on hotel table integrated tablet pc or smart device or video camera or voice enabled technologies and devices which recognize user activities or actions or status including customer finishes eating of food in hotel and generates action or status item and send to hotel administrator or manager or waiter with active links, wherein said active link enables hotel administrator or manager or waiter to ask any further order based on presented menu, communicate with customer, provide bill and share said transaction data with manger. System also maintains, monitors, tracks, records and presents one or more actions on said action or status item and associate or attached active links and presents tracking status and communication details or logs.

FIG. 12—12040 shows action item related to "customer pays bill amount" and action item associate active links enables customer to view bill, communicate with manager, make payment and share action item with comments with connected or related or matched users of user. System also maintains, monitors, tracks, records and presents one or more actions on said action or status item and associate or attached active links and presents tracking status and communication details or logs.

Figure 13:
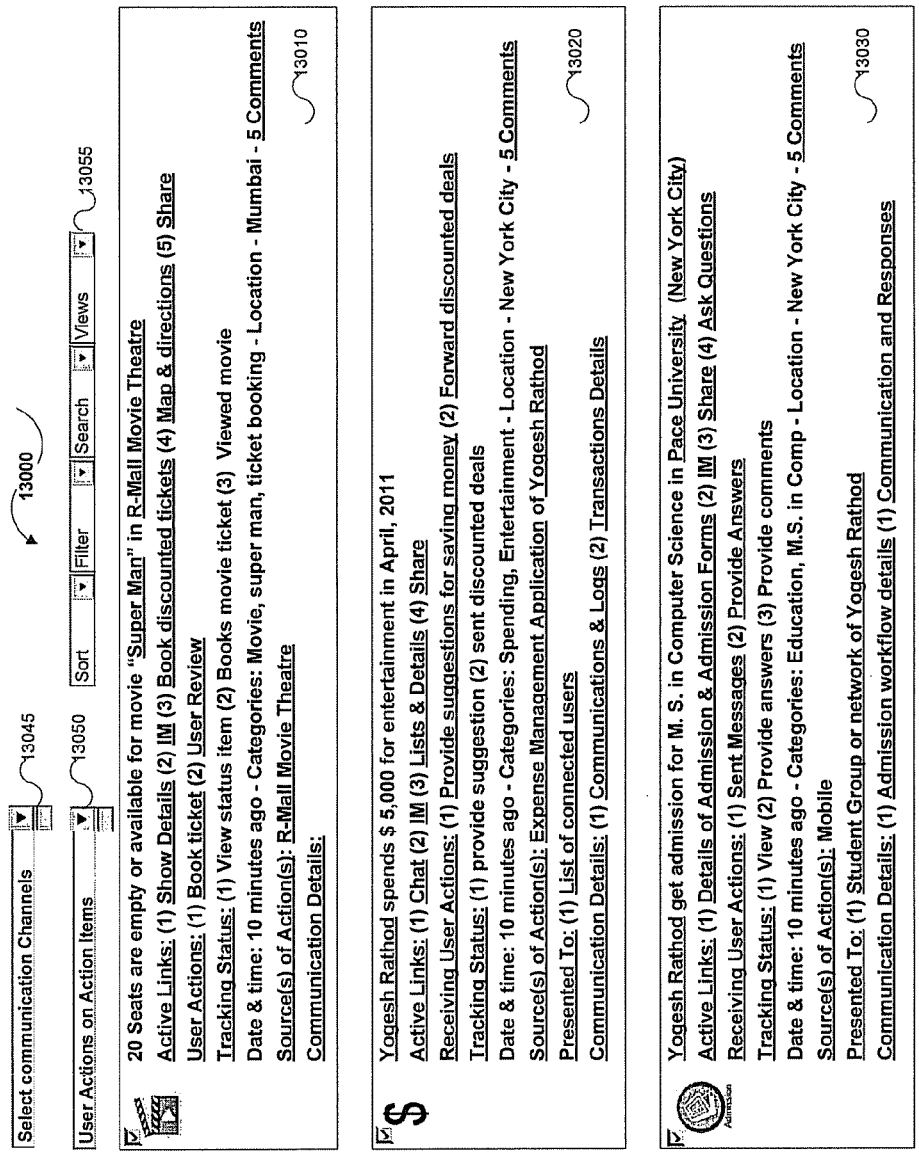
FIG. 13 illustrates examples, in accordance with an embodiment of the invention.

FIG. 13—13010 shows status or condition item related to availability status of cinema seats including empty seats. So cinema administrator can send said empty seat status item recording few minutes before starting show e.g. 10 to 15 minutes to prospective customers or related viewers with active links, wherein said active links enables prospective viewing users to buy cinema tickets at discount rate, share said action item with connected users of receiving user.

FIG. 13—13020 shows log item of user's spending of money in particular category e.g. entertainment based on or log item generated from user's expense management application source with one or more attached dynamic, contextual & accessible active links, wherein said active links enables receiving users to communicate with sending user, give suggestion for saving money or decrease expenses, send or forward discounted deals and like.

FIG. 13—13030 shows manually describe activity item by user [Yogesh Rathod] regarding "getting admission in pace university for M.S." with one or more manually attached dynamic, contextual or purpose specific or related accessible active links, wherein said active links enables receiving users to click on "sent messages" active link and sent one or more messages, click on "provide answers" active link and provide answer for one or more questions ask by sender, view admission details and workflow, communicate with each other and like.

Figure 14:
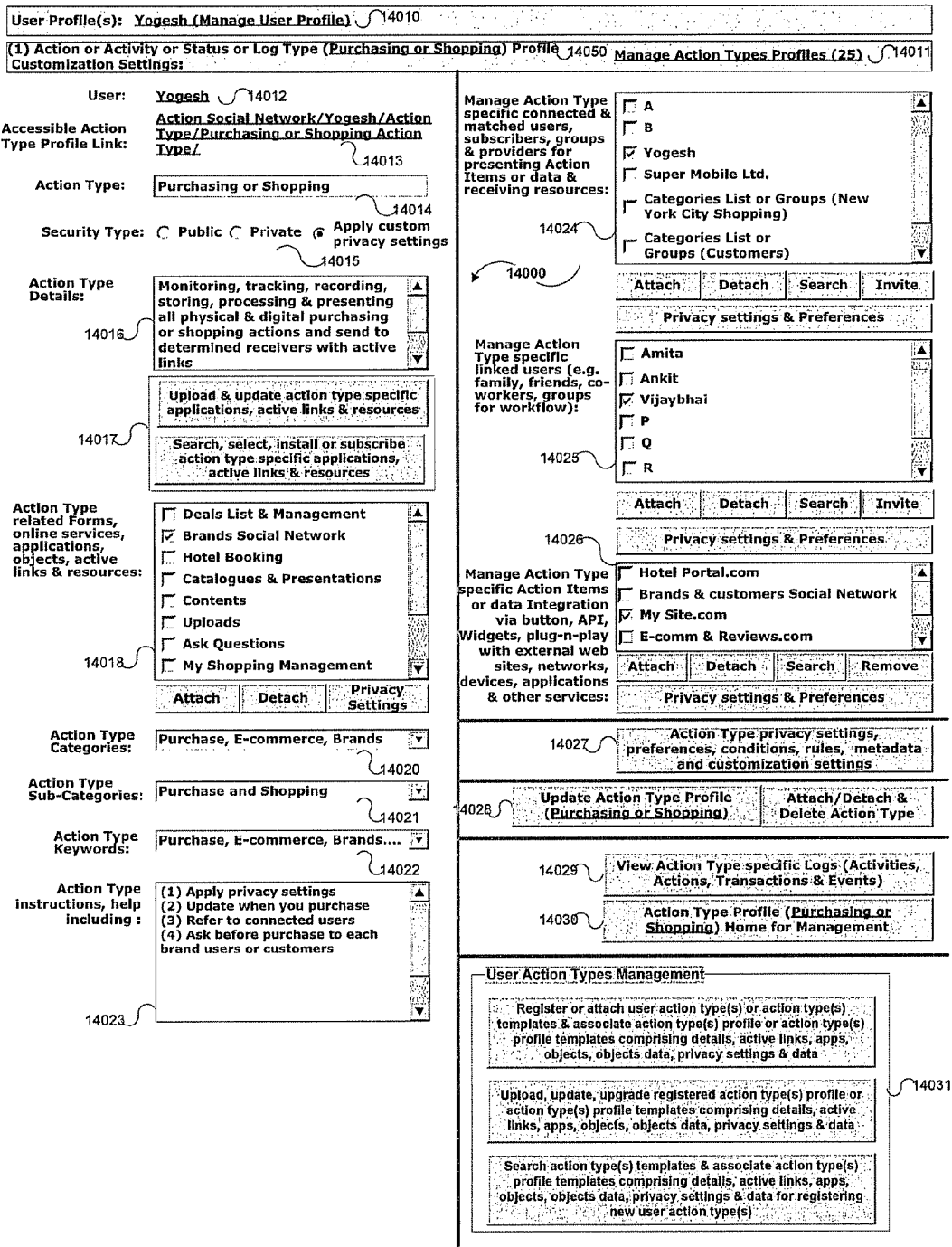
FIG. 14 illustrates graphical user interface (GUI) for user's exemplary action or activity type specific profile.

In one embodiment FIG. 14 illustrates action type profile of user. user can create one or more action type and/or sources profile for setting, updating and applying one or more privacy settings, preferences, categories, keywords, selecting or associating connected or related or matched or linked users with said action or status or log type for sending or receiving said action type specific action or activity or status or log items or communicating with receivers, searching, matching, uploading, creating list of one or more action or activity or status or log type specific accessible active links and associate one or more objects, applications, services, multimedia data, attachments, lists, workspaces, web pages, networks, groups, databases, devices, communication channels and other objects.

FIG. 14 illustrates an exemplary GUI 14000 for Action or Activity or Status or Log Type profile customization settings where user can manage one or more Action or Activity or Status or Log type's specific profiles customization settings 14050 and Action or Activity or Status or Log type profiles 14011. Action or Activity or Status or Log Feed social networking web site 100 allow user to create & register with social network one or more Action or Activity or Status or Log type profiles with or without using Action or Activity or Status or Log type profile templates. User can manage user profile 14010 and access & update user profile via link 14012. Each registered Action or Activity or Status or Log type profile assign unique links 14013 for accessing, viewing and managing Action or Activity or Status or Log type profile. Each Action or Activity or Status or Log type metadata comprising Action or Activity or Status or Log type name 14014, security type 14015 including public, private and custom settings, Action or Activity or Status or Log type details 14016, Action or Activity or Status or Log type categories 14020, Action or Activity or Status or Log type sub-categories 14021, Action or Activity or Status or Log type related keywords 14022, Action or Activity or Status or Log type instructions & helps 14023. User can search, select, update, upgrade, subscribe or install and attach one or more active links 14017, wherein active links comprising associate objects, applications, services, dynamic application features, groups, networks, web page, identities, links, widgets and multimedia data. User can search, bookmark, create categories list of active links and attach or detach and apply privacy settings to one or more active links 14018. User can manage, attach or detach 14024 one or more connected, selected, matched users or group of users & subscribers and search and invite one or more connected or users of networks based on one or more criteria. User can link 14025 user's Action or Activity or Status or Log type specific other users including connected and related users like family, friends, and co-workers. User can attach or detach linked users, apply privacy settings & preferences and search & invite linked users for linking. User can integrate 14026 one or more user's Action or Activity or Status or Log type specific Action or Activity or Status or Log items or selective Action or Activity or Status or Log items with 3$^{rd}$ parties external domains, web sites, applications, services, devices and networks via button, API, widgets, plug-n-play. User can attach or detach, remove said integrations and apply privacy settings & preferences for said each integration for accessing, updating, viewing, providing response, participating with user's Action or Activity or Status or Log type specific items. User can apply one or more privacy settings, preferences, conditions, rules, metadata and customization settings 14027 for each registered Action or Activity or Status or Log type profile enabling other users including selected, connected, matched users, subscribers and providers, responders and service providers to access, update, provide response, access active links, view user actions and access data. User can update said one or more customization settings related to one or more Action or Activity or Status or Log type profiles and attach or detach or remove one or more Action or Activity or Status or Log type specific profiles 14028 and/or Action or Activity or Status or Log items. User can view Action or Activity or Status or Log type specific logs 14029 based on monitoring, storing, tracking, recording of user's one or more activities, actions, interactions, events, transactions and location. After applying customization settings user can view, update and manage Action or Activity or Status or Log type profile 14030. User can any time search, update, create and register one or more additional Action or Activity or Status or Log types, Action or Activity or Status or Log type templates with associate Action or Activity or Status or Log type profile and apply above discussed all customization settings 14031.

Figure 15:
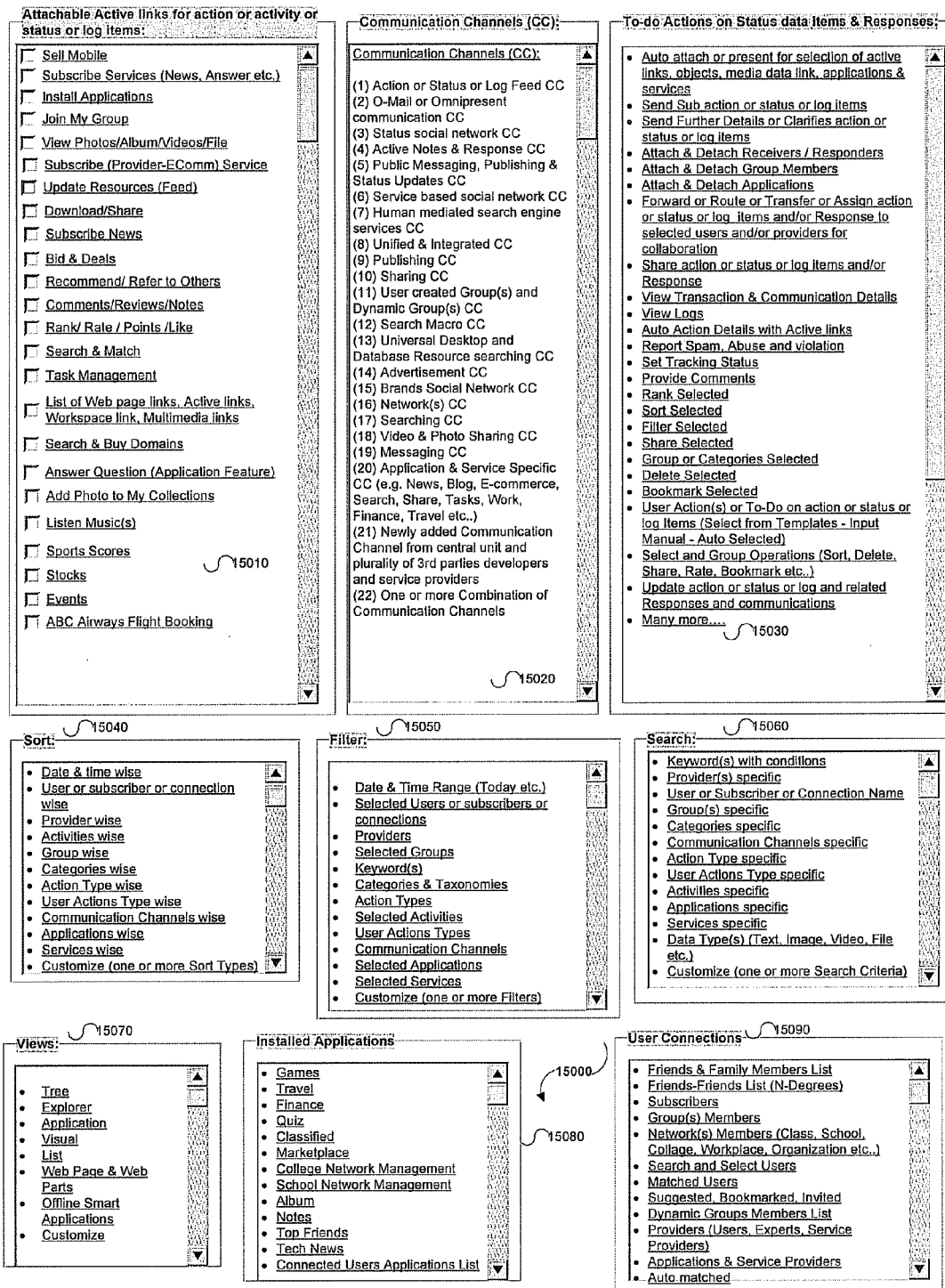
FIG. 15 illustrates graphical user interface (GUI) for manually selecting one or more active links for attaching with auto generated or manually describe one or more action or activity or status or log items, selection one or more user actions, searching, filtering, sorting, sharing, viewing options based on one or more selected action or status or log items and associate active links and selecting one or more communication channels and/or applications.

FIG. 15 illustrates graphical user interface (GUI) for manually selecting one or more active links for attaching with auto generated or manually describe one or more action or activity or status or log items, selection one or more user actions, searching, filtering, sorting, sharing, viewing options based on one or more selected action or status or log items and associate active links and selecting one or more communication channels and/or applications. List 15010 comprises plurality of attachable and accessible objects of network that host and link by central unit FIG. 10—530 or from external network & domain, developer of application, develop by user, service providers including one or more profiles of user and connected users, identity of user and resources, contents, publications, media data & items including image, photo, video, audio, message, communications, lists, attachments, applications, services, groups, networks, links or URLs, AI Agents, pages, search results, brands name or objects name, advertisements, logs, search macros, auto generated messages, relationships, one or more or list of user connections objects, subscribers, privacy settings, structured data like list of brands, domain specific categories survey forms for getting more details in structured way and any other objects.

For example FIG. 15 (15010) user can select & attach "Sell Mobile" active links & apps from list of active links & apps with message "I am Selling Mobile at discount price" and send to matched or connected or subscriber or responder users of network, wherein said links enable said users to buy mobile by clicking and using said active links or applications and system tracks the user action on said Active Note(s) and related response.

Another example is that user send message "I want to buy mobile—Attachments" and send to matched or connected or subscriber or responder users of network and related one or more responders can attach one or more active links and apps with said response like responder send response "Purchase mobile from SuperMobile Store, near shop for you" and attach active links or applications or application features or services like Links: (1) Purchase from SuperMobile Store, (2) Mobile Presentation Video and send said response to said action or activity or status or log item(s) provider, wherein said links enable said users to buy mobile by clicking and using said active links or applications and system automatically tracks user's actions on said response like "User Actions: (Auto: Tracking Status: Like & Viewed)" and related active links or apps or stores user defined action and comments like "Purchase from SuperMobile Store at Mulund". Central unit FIG. 10—530 receives, stores, indexes and process said action or activity or status or log item(s), related responses & active links & applications and associate system generated or user defined one or more user actions on said action or activity or status or log item(s), related responses & active links & applications and making them searchable for other users based on ranking and one or more search criteria.

User can determine and select one or more receivers and/or responders of action or activity or status or log item(s) based on auto match making, search, match, filter & select from categories list(s) of user connections including friends, friends of friends, family, co-workers, classmates, Search, invite & select users from central search engine and other sources or external domains, select from one or more categories list of subscribers, search, subscribe & select one or more verified service providers or responders from categories lists, online available matched public providers, select based on one & two way match making preferences, select from bookmarks of receivers and/or responders or users, select from suggested receivers and/or responders or users or service providers, select receivers and/or responders based on dynamically created Group based on online available matched users, similar activities, location, applications, interest, categories, select service provider responders based on a service profile, select one or more user networks, groups, customize selection of receivers or responders including selection conditions, rules, search specific name, connections, networks, groups, interest, activities, location. User can select or update receivers and/or responders for all action or activity or status or log item(s) (default) or for each action or activity or status or log item(s). User can save or post one or more action or activity or status or log item(s).

User can manage all action or activity or status or log item(s), related response(s) and communications from all receivers, responders, sources & communication channels including user's own all action or activity or status or log item(s), related response(s) & communication where user can receive action or activity or status or log item(s), responses from and communicate with plurality of related senders, responders and communication channels.

User can select or switch one or more or combination of communication channels and set default communication channel e.g. default "Action or Activity or Status or Log Feed" communication channel.

User can select various types of Sort, Filter & Search options for action or activity or status or log item(s), related response(s) & communication data and select view type for presenting and managing action or activity or status or log item(s), related response(s) & communication.

FIG. 15 illustrates an exemplary GUI 15040 for presenting to user various Sort options or selections for sorting of action or activity or status or log item(s), related response(s) & communication data and source of responses including user or subscriber or connection wise, date & time wise, provider wise, activities wise, group wise, categories wise, action Type wise, user actions Type wise, communication channels wise, applications wise, services wise, customize sorting and any combination thereof.

FIG. 15 illustrates an exemplary GUI 15050 for presenting to user various Filter options or selections for filtering action or activity or status or log item(s), related response(s) & communication data including date & time range, selected one or more users, subscribers, connections, providers, groups, networks, keyword(s), categories & taxonomies, ranking & rating, active links & apps types, activities, user actions types, communication channels, applications, services, resource or media data types including image, video, audio, text, docs, file, status types and any combination thereof.

FIG. 15 illustrates an exemplary GUI 15060 for presenting to user various Search options or selections for searching action or activity or status or log item(s), related response(s) & communication data including searching based on one or more keyword(s) with conditions, provider(s), users, subscribers, connections name, group(s) specific, categories specific, communication channels specific, action type specific user actions type specific, activities specific, applications specific, services specific, media data type(s) including text, image, video, file and any combination thereof or customize one or more search criteria.

FIG. 15 illustrates an exemplary GUI 15070 for presenting to user various Views options or selections for selecting presentation and management type for managing action or activity or status or log item(s), related response(s) & communication data including Tree-Branch style, Explorer style, Application style, Visual style, List style, Web Page & Web Parts, Offline Smart Applications and Customize.

Figure 16:
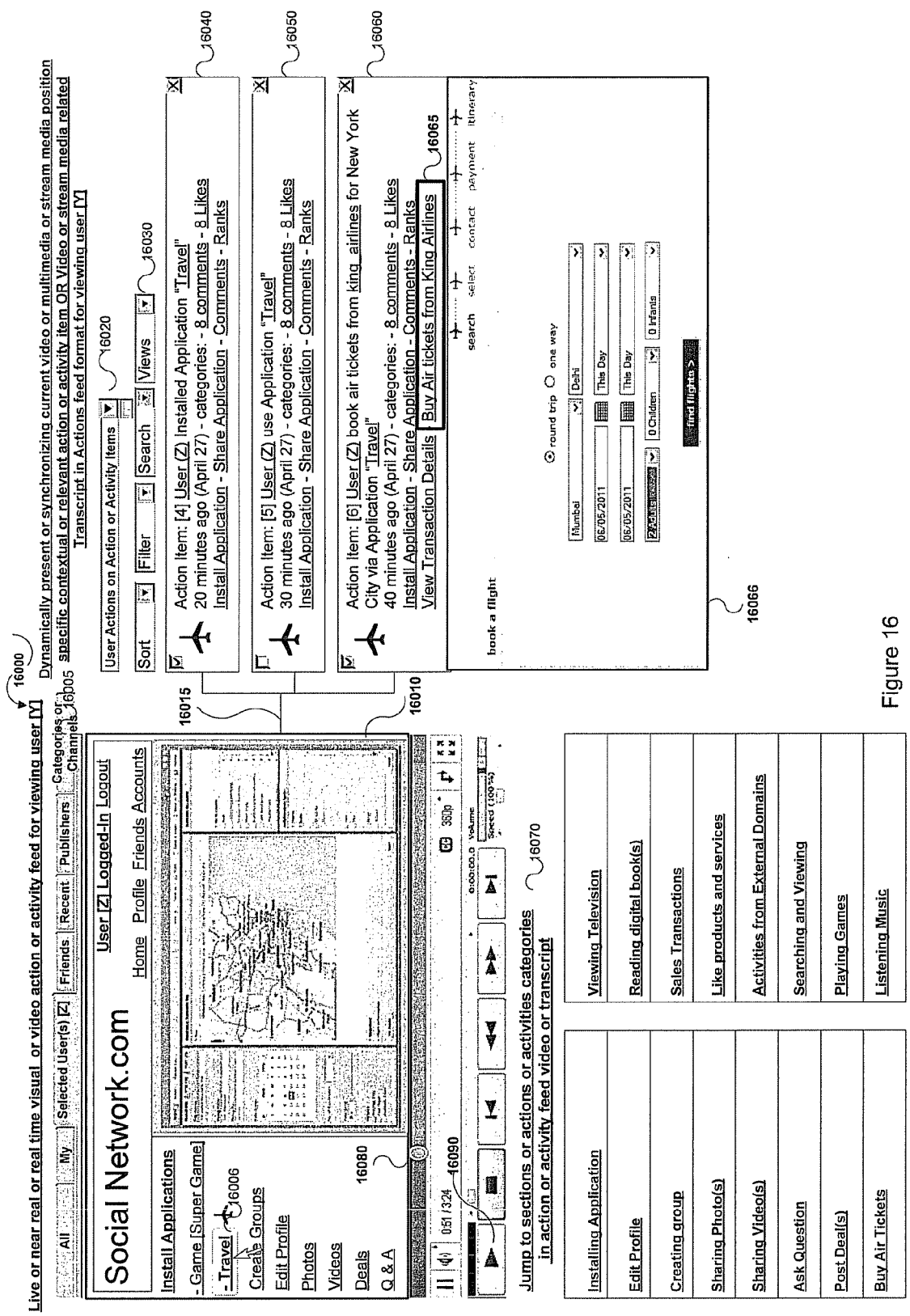
Figure 18:
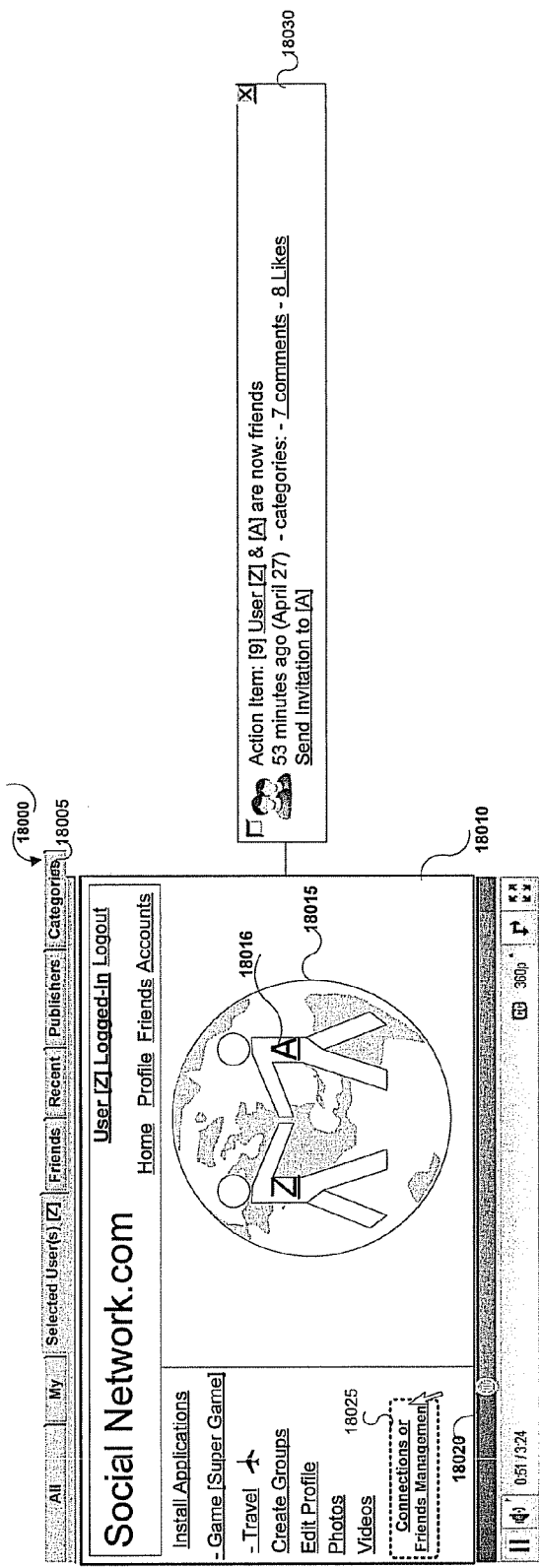

FIG. 16 illustrates in one embodiment an exemplary GUI 16000 for presenting and accessing visual or video or stream media actions and activities feeds based on monitoring, tracking, capturing & recording 400 each user's sequence of a plurality of actions and activities with associate data and metadata and storing 580 and processing each user's said plurality of actions and activities in a database in image frame(s), video, streaming media or multimedia data format with video, streaming media position specific contextual and relevant one or more actions or activities items & associate data and metadata. Sender 150 can determine one or more target receivers 350 based on selecting one or more connected users, subscribers and receivers. Senders 150 and receivers 350 can edit, apply one or more filters, provide preferences and privacy settings for sending and/or receiving said visual or video actions and activities feeds. System or central unit 100 can generates 510 and processes said image frame(s), video, streaming media or multimedia data for one or more actions or activities items with video, streaming media position specific contextual and relevant one or more actions or activities items & associate data and metadata based on said one or more filters, preferences and privacy settings of sender(s) and/or receiver(s) and dynamically presents said visual or video actions and activities feeds from one or more senders to one or more determined receiving or viewing users based on said one or more filters, preferences and privacy settings of sender(s) and/or receiver(s). Viewing or receiving users can select, search, match, load, download, edit, filter, process and play, forward, backward, pause, stop said visual or video actions and activities feeds 16010 based on one or more selections & preferences 16005, 16070 and system dynamically presents currently played or paused image frame(s), video, stream or multimedia data position specific one or more contextual, associate and relevant action or activity item(s) 16040, 16050 & 16060 with associate data and metadata and allow viewing user(s) to access said one or more presented contextual, associate and relevant action or activity item(s) with associate data and metadata.

For example viewing user [Y] has connection with sender user [Z] and both users provides permission to each other regarding sending and/or receiving said generated actions or activities feeds. For example chronologically or sequentially user [Z] installs application "Travel" and use the said "Travel" application and then book the airlines tickets via said installed "Travel" application. System monitors, tracks, records, captures, stores, processes and generates said user

[Z]'s each said actions or activities in image frame(s), video, streaming media or multimedia data or video clip(s) with video, streaming media position specific contextual and relevant one or more actions or activities items & associate data and metadata.

Each said video clip dedicated to or stores one action or activity item specific data and stores said action or activity item associate, contextual and relevant data and metadata. For example user [Z] installs [Travel] application is record in said one video clip and stores with said action or activity item associate, contextual and relevant data and metadata and then dynamically each said video clip can merge with other video clips for next sequences of user's actions or activities. For example recording sequence of user [Z]'s one or more actions or activities chronologically including user [Z] installs application [Travel], then user [Z] use said application [Travel], and then user [Z] books airlines tickets via said [Travel] application. Merging of video clips based on merge last frame of first or previous video clip with start frame of any next video clip.

After generating of said visual or video news or journal or actions or activities feeds of user [Z], central unit presents said video news or journal or actions or activities feeds 16010 in real or near real time to connected or subscribed or determined receiving or viewing user [Y] based on user[Y]'s preferences, privacy settings and selections 16005 and 16070. User [Y] can any time select user [Z]'s live or near or real time news or journal or actions or activities feeds via customize tabs 16005 or User [Y] can jump to sections or actions or activities categories in action or activity feed video or transcript 16070.

For example when user [Y] selects user [Z]'s action or activity feed via tab 16005 and play 16090, pause 16080, backward, forward said video clip or video or video stream or stream media or multimedia data or sequence of image frame(s), system dynamically presents video, streaming media position specific or individual video clip specific contextual and relevant one or more actions or activities items 16015 & associate data and metadata including 16040, 16050 and 16060. User [Y] can set video speed settings for making video slow or fast or pause after each video clip or after each related action item or group or categories of action items. User [Y] can scan video and view associate actions or activities item(s) and pause when like one or more associate actions or activities item(s) 16015. Viewing or receiving User[Y] can take one or more user actions 16020 on said one or more selected action or activity items including search, sort, filter, view 16030, bookmark, categories, share, save, mark as read or important or like or pending, provide rank & comments, assign order, attach, detach, remove and other user actions.

For example when viewing User [Y] pause 16080 said action or activity feed video 16010, system dynamically presents current video clip specific or current video position specific contextual or associate actions or activities items 16015 and User [Y] can access said one or more presented actions or activities items 16015, wherein said action item 16040 and 16050 specific active links enables viewing user [Y] to install application [Travel], share application [Travel], communicate, collaborate and participate with same activity as sender, provide comments and ranks and said action item 16060 enables receiving user [Y] to view transaction details of user [Z] regarding purchasing of air tickets from "king airlines" and can access "Buy Air tickets from "King Airlines" active link 16065 and purchase air tickets via active link associate application 16066.

In one embodiment said video streams or video clips or stream media or image frame(s) of digitized video data are real time or near real time, live, on demand, updated, converted, filtered, processed, dynamic, existing, pre-recorded, pre-loaded, series of still images, single image, merging and splitting of image frame(s) and video stream(s) or any formats including captured series of screenshots, FLV, MPEG, AVI, WMV, MOV formats, flash or a digitized version of an original analog image sequence and can be seen in two-dimensional and three-dimensional view(s).

In one embodiment user can zoom-in, zoom out, change quality of video resolution, search and switch action or activity video stream based on selection, set presentation settings, In one embodiment source user can set length or duration of one or more action or activity type or item specific video clips. User can manually edit or dynamically reduce one or more video clips or types of video clips.

In one embodiment can jump from one action & activity item related video clip or media stream to another action & activity item related video clip or media stream or selected action & activity item related video clip or media stream from index or categories list of action or activity items or categories of action or activity types.

In one embodiment said action & activity feed video stream can integrated with $3^{rd}$ parties or external domains, web sites, applications, services and devices via web services, embedded code or link, application programming interface (API), plug-n-play and any communication interface.

In one embodiment system provides hit statistics and analytics of each action or activity item, action or activity item related to particular user(s), application, service, action or activity types, location, group, network, brands, products & services, source, domain, keywords, categories including number of hits or views, user actions, transactions, communications, status, ranks, number of comments provided.

In one embodiment interactive video or multimedia action & activity feed can be voice enabled, transcribe or convert text of action & activity item into voice with video or multimedia. So user can listen action & activity items of other users and/or animated character or pre-recorded real talking person with various action specific expressions can read said action & activity item for viewing user [Y] and/or display with accessible text and active links data. For example user [Z]'s install application "Travel" action & activity item can listen by receiving or viewing user [Y] with video or multimedia.

In one embodiment interactive video or multimedia action & activity feed can send, synchronize, update, broadcast, present or display, in any device, personal computer, touch screen, mobile, digital television, web site, smart client application, integrated with other applications, services, networks and devices.

In one embodiment, a screenshot (or screen shot), screen capture (or screencap), screen dump, screengrab (or screen grab), or print screen is an image taken by the computer to record the visible items displayed on the monitor, television, or another visual output device. Usually this is a digital image taken by the host operating system or software running on the computer, but it can also be a capture made by a camera or a device intercepting the video output of the display (such as a DVR).

In one embodiment Video is the technology of electronically capturing, recording, processing, storing, transmitting, and reconstructing a sequence of still images representing scenes in motion.

In one embodiment said generated action or activity feed related video streams or video clips or stream media or image frame(s) of digitized video data are can be broadcasting, screening, telecasting, playing, distributing, synchronizing, streaming, transmitting, showing, delivering, recording, storing via multiple communication networks on multiple types of user(s) device(s) to viewers.

In one embodiment said action or activity feed related video, streaming media or multimedia data integrate or embedded with associate contextual and relevant one or more actions or activities items & associate data and metadata and dynamically presented with on or above of video or video clip or media stream data.

In one embodiment said sequencing of said video clips can based on matching, selecting and executing the rules.

In one embodiment, system or central unit can dynamically attach one or more multimedia data including text, sounds, audio, images, links, advertising, metadata and system data with said video or video clip or media stream In one embodiment, user can search within said presented one or more videos or video clips or stream media data.

In one embodiment, user can concurrently play one or more videos or video clips or stream media data and access one or more action or activity items and active links.

In one embodiment, user can select one or more connected or related or matched users, publishers or one or more categories, keywords, types of activities specific one or more sources of action or activity feeds. Central unit dynamically generates and merge said filters, preferences and privacy settings specific action or activity items related video clips or stream media and presents said generated or merged video clips with associate action or activity items and active links. In one embodiment user can share said video or video clips or stream media with one or more connected, selected or matched users.

Figure 17:
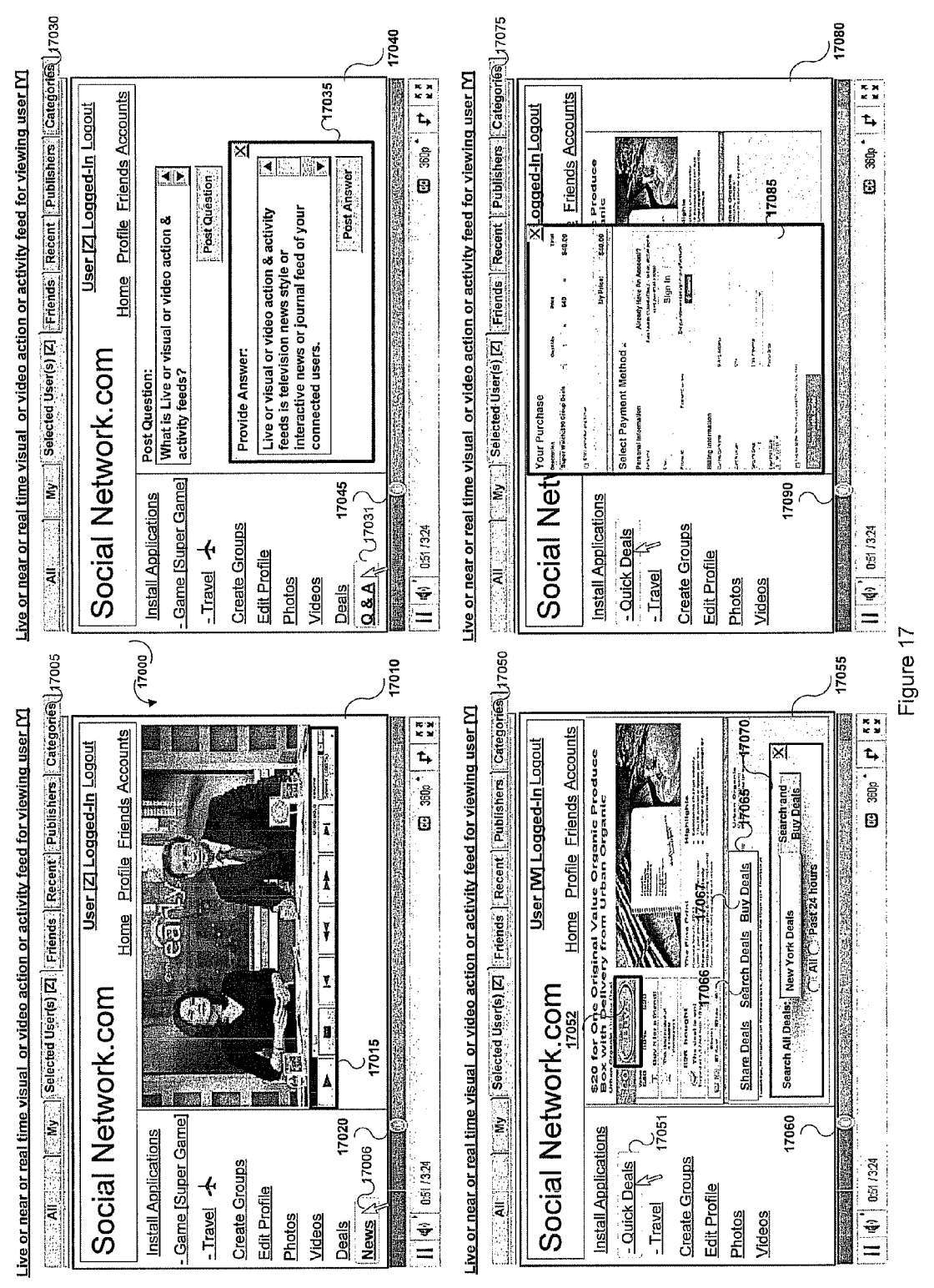

FIG. 17 illustrates in one embodiment an exemplary GUI 17000 for presenting and accessing interactive visual or video or stream media actions and activities feeds.

In one embodiment said image frame(s) of video stream or of digitized video data of action or activity feed presentation has the capability to be merged with or video or series of video clips or media stream of action or activity feed can embedded or integrate with web services and interactive animation, runtime customization, HTML, DHTML, XML, embedded programming & scripting languages, multiple layers, graphics, images, visual system, text, multimedia data, voice technology, hyperlinks, file, audio, video and interactive programmable controls & components including ToolTip, Tab, Toolbar, Popup, Grid, Menu, Calendar, Button, Input, Navigation, transparent, List, Database, Resizing & Graphical User interface. User can directly access video, streaming media position specific contextual and relevant one or more actions or activities items & associate data and metadata including active links, associate applications, services, objects, groups, networks.

For example 17010 shows user [Y] viewing action & activity feeds 17010 and pause interested action or activity item "News reading of user [Z]" and user [Y] can interactively view news preferred or liked and viewed by user [Z] directly in video or visual or multimedia news or journal or action & activity feeds via interactive or embedded or integrated video controls or objects 17015. User can play, pause, forward, backward said video via video control object 17015.

Another example of interactive multimedia action & activity feeds shows user [Y] viewing action & activity feeds 17040 and pause interested action or activity item "Question post by user [Z]" and system dynamically presents identified, dynamic, contextual and relevant active links associate application "Provide Answer" 17035 to user [Y] in an integrated, ready to use & unified manner and user [Y] can interactively access said active link associate application "Provide Answer" 17035 directly in user[Z]'s multimedia or video or visual action or activity feed and provide & post answer of said question shown in paused 17045 screenshot or action & activity item 17040. Thus user can read question ask by sender or source of action or activity feed or connected user and give answer directly from video or multimedia enabled action or activity feed 17040.

In an another example shows user [Y] viewing action & activity feeds 17055 and pause 17060 interested action or activity item "Deals purchase by User [W]", when user [Y] pause, system dynamically presents contextual and said video or media stream position specific accessible active links 17065 including (1) Share Deals, (2) Search Deals 17066 and (3) Buy Deals 17067. For example User [Y] access or clicks on active link "Search Deals" 17066, system dynamically presents said active links associate search deals application 17070 in integrated and unified manner. User [Y] can access said application directly from said interactive video or visual or multimedia action or activity feed or item and search desired deals. In another example 17080 User [Y] access or clicks on active link "Buy Deals" 17067, system dynamically presents said active links associate buy deals application or web page or service or object 17085 in integrated and unified manner. User [Y] can access said application directly from said interactive video or visual or multimedia action & activity feed or item and same buy deals that buy by connected user [W] of user [Y] or participate in the same activity as of sender user [W].

In one embodiment viewing user can directly click on screenshots or video or image(s) same way as sender click. For example when sender click on link of "install application Travel", sender's action of installing application via clicking on said "install application Travel" link can monitored, tracked, captured, processed, recorded in interactive video or multimedia action & activity item(s) or feeds and present or send to related viewing users. Viewing user receives and view said interactive video or multimedia action & activity item(s) or feeds and can directly click on "install application Travel" link of screenshot of said action for installing said application. Interactive video or multimedia action & activity item(s) or feeds is integrated or embedded with object associate with "install application Travel" link, which enables receiving or viewing users to directly click on "install application Travel" link of screenshot of said action for installing said application. For example viewing user[Y] can directly click 16006 on interactive video or multimedia action & activity item(s) or feeds 16010 of sender or source or subject user [Z] and install "Travel" application. Link of "travel" application is embedded or integrated with or above said screenshot image(s) of said interactive video or multimedia action & activity item(s) i.e. Action Item: [4] User (Z) Installed Application "Travel". Similarly another example shows user [Y] can click on "News" 17006 and view news directly from said video or visual action & activity feed player 17010. Similarly another example shows user [Y] can click on "Quick Deals" 17051 directly from said video or visual action & activity feed player 17055 and then can click on buy 17052 for accepting or purchasing said same deals as sender user [Z] selected & buys.

In one embodiment interactive video or multimedia action & activity feed can be visual representation or presentation of one or more actions or description of action including dynamic multimedia data, images, videos, animation selections or merging based on action type including user's photos, action type specific graphics. For example 18015 shows visual presentation of action i.e. "Action Item: [9] User

[Z] & [A] are now friends" 18030. User [Y] can directly click on User [A] link 18016 to send invitation to user [A] for inviting for friendship.

In one embodiment interactive video or multimedia action & activity feed comprising snippet of video, songs, actions, events, transactions, search process, sequences of action process, In one embodiment interactive video or multimedia action & activity feed comprising scripts based interactive video or multimedia action & activity feed. Viewing or receiving user can dynamically change runtime environment of interactive video or multimedia action & activity feed. A scripting language, script language or extension language is a programming language that allows control of one or more applications, multimedia presentation, interactive video or multimedia action & activity feed. "Scripts" are distinct from the core code of the application and interactive video or multimedia action & activity feed, as they are usually written in a different language and are often created or at least modified by the end-user. Scripts are often interpreted from source code or bytecode, whereas the application is typically first compiled to native machine code.

In one embodiment interactive or visual or multimedia or video clip of advertisement can integrated or embedded with interactive video or multimedia action & activity feed or within or between set of action & activity items. After certain number of action & activity items one or more matched, contextual & relevant advertisements can be presented to viewing user. For example text of action item(s) matched with advertisement text and targeting criteria and presenting or highlighting matched advertisements to viewing users.

In one embodiment user can set order of action & activity video clips or presentation of interactive video or multimedia action & activity items including set order of presentation of one or more types or categories or keywords specific of activities, actions, transactions, one or more selected or connected users, location, application specific, date & time wise, range wise and like.

In one embodiment interactive video or multimedia action & activity feed API, plug-n-play, widget, and button can integrate with external domains, web sites, applications, services, networks and devices for monitoring, tracking, identifying, recording, capturing user's one or more actions and activities from external domains e.g. domain 200 and send, store, present to current domain e.g. domain 100 or connected, related users and subscribers of current domain e.g. domain 100.

In one embodiment interactive video or multimedia action & activity feed can be suggested actions or activities items as discuss in detail in 8088.

In one embodiment interactive video or multimedia action & activity feed automatically and dynamically edited, processed and updated. For example when source user e.g. User [Z] edit profile, system monitors, tracks, records, captures and stores user's profile editing action in visual or video or multimedia form with accessible data and dynamically and automatically edit, process and update said profile editing action and present to viewing users only final version or saved version of profile editing action and does not show each keyword by keyword actions.

In one embodiment interactive video or multimedia action & activity feeds can be view only for example when source user e.g. User [Z] play game or search something system monitors, tracks, records, captures and stores user's sequences of important part of games playing action and shows to viewing user highlights or trailer like recorded game playing actions or system monitors, tracks, records, captures and stores user's sequences of searching process and shows edited version of interactive video or multimedia action & activity feed including only source user's selected, viewed and liked search results or parts of sequences of searching process related user's actions and enables viewing user of interactive video or multimedia action & activity feed to access said filtered or selected, viewed and liked search results or parts of sequences of searching process.

In one embodiment enabling users to provide, update, set and apply different privacy settings for different users for accessing, receiving and viewing interactive video or multimedia action & activity feeds.

In one embodiment interactive video or multimedia action & activity feeds comprising physically recorded user's actions and activities via video camera or any types of imaging or image capturing device and dynamically attach one or more active links with each action or activity item.

In one embodiment user can dynamically attach, detach, order, add, remove, update, edit, drag & drop, provide ranks & comments, categories one or more presented or currently viewed interactive video or multimedia action & activity feeds related action or activity items or set of action or activity items.

In one embodiment interactive video or multimedia action & activity feeds can video podcasting and/or collaboratively view, access and use by related users. For example action item related to posting of question action or activities 17040 can collaboratively view by users [Y], [W], and [L] and collaboratively provide answer(s) via active link associate application 17035. In and another example action item related to deals related action or activities 17055 can collaboratively view by users [Y], [W], and [L] and collaboratively purchase or offer deals via active link 17067 associate application 17085.

In one embodiment sender or source and receiver or destination of action or activity feeds comprising present network and/or one or more external domains, web sites, web pages, networks, devices, operating systems, applications, services, platforms, locations, social networks, databases, objects, registered or unregistered users, connected users of user, profile object, groups, communication networks, non-social networks, centralized or peer to peer networks, sensors, automations, communication systems, web services, multi artificial intelligence agent(s), speech or voice sources, translating system.

In one embodiment invoking active link(s) based on clicking via mouse, keyboards inputs, voice enabled command, touch input, auto invoking or presenting, invoking via remote controls, sensors, gestures, behaviors, infrared, RFID, human mind, and devices.

Interactive video, media stream or multimedia action & activity feeds works on online, offline, peer to peer mode and provides multiple users, multiple visual styles, multiple administration levels, multiple localization & globalization, multiple platform & device support, multi tasking, multiple versions (universal, enterprise & customized versions), multiple clients (rich, thin or smart clients) functionalities and operates with all devices including computers, laptops, smart devices, mobile, kiosk & in-store kiosks, multi touch screen such as interactive walls and tabletops, digital projector, any digital display system, digital theatre system (DTS), other video capable devices, customize device(s), RFID and processing, storage and display device(s) & hardware with Interactive video, media stream or multimedia action & activity feeds applications and services, automation & embedded systems, IPTV, set-top-box, smart computers, tablet PC, Microsoft surface pc, Linux MPX and HP huge multi touch screen, OQO Pocket PC & laptops, voice enabled technology, remote control selection system, wireless technologies such as Bluetooth, infrared, WiFi, GPRS, GSM, WLAN and WiMax and can integrate with applications, multimedia, virtual tours, virtual world, games, visual & interactive technology, digital maps (location based service), Voice enabled technology, multi AI agents, automation (robotics like robotic hands, sensors and embedded systems), and e-commerce and enterprise platform or services and special effects, visual effects, film making and editing technologies, video and image processing, editing and composition may be applied to the said video or video clips or media stream or multimedia data.

Interactive video, media stream or multimedia action & activity feeds system may preferably use Microsoft DOT-NET, web services, SQL server, Microsoft Silverlight, Flash Video Stream, Flash Video stream player and Action scripts, Adobe Flex and other flash authoring tools, Convert to Flash Video Tools, AJAX and JavaFx technologies for development of applications, framework, network and services.

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Furthermore, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. Additionally, although the foregoing embodiments have been described in the context of a social network website, it will apparent to one of ordinary skill in the art that the invention may be used with any social network service, even if it is not provided through a website. Any system that provides social networking functionality can be used in accordance with the present invention even if it relies, for example, on e-mail, instant messaging or any other form of peer-to-peer communications, or any other technique for communicating between users. Systems used to provide social networking functionality include a distributed computing system, client-side code modules or plug-ins, client-server architecture, a peer-to peer communication system or other systems. The invention is thus not limited to any particular type of communication system, network, protocol, format or application.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

I claim:

1. The method of presenting and accessing visual, video, stream media or multimedia actions and activities feeds comprising:

storing each user's profile, connections among users, subscribers, subscriptions, lists, groups, filters, preferences and privacy settings for sending/receiving visual or video actions and activities feeds;

monitoring, tracking, capturing & recording each user's sequences of a plurality of actions and activities with associate data and metadata from one or more sources based on one or more preferences, privacy settings and filtering of action or activity types;

storing and processing each user's said plurality of actions and activities in a database in image frame(s), video, streaming media or multimedia data format with contextual, relevant and location & position specific one or more actions or activities items & associate data and metadata;

determining receivers of action & activity feeds;

generating visual, video, stream media or multimedia actions and activities feeds for one or more actions or activities for one or more determined receiving users based on one or more filters, preferences and privacy settings of sender(s)/receiver(s), wherein visual, video, stream media or multimedia actions and activities feeds comprising one or more said actions or activities specific video clips or streaming and each corresponding action or activity specific contextual and relevant one or more actions or activities items & associate data and metadata;

dynamically presenting said visual or video actions and activities feeds from one or more sources or senders to one or more determined receiving or viewing users based on one or more filters, preferences and privacy settings of sender(s)/receiver(s);

allow to select, search, match, load, download, edit, filter, access, process and play, forward, backward, pause, stop said visual or video actions and activities feeds based on one or more preferences and settings;

dynamically present current image frame(s), video, stream or multimedia data position specific or action or activity item(s) video clip specific one or more contextual, associate and relevant action or activity item(s) with associate data and metadata; and allow to dynamically access said one or more presented dynamic, contextual, associate and relevant action or activity item(s) and associate data and metadata.

2. The system of presenting and accessing visual, video, stream media or multimedia actions and activities feeds comprising:

the central unit is configure to store user profile, connections, subscribers, subscriptions, lists, groups, filters, preferences and privacy settings of user for sending/receiving visual or video actions and activities feeds, to monitor, track, capture & record each user's sequences of a plurality of actions and activities with associate data and metadata from one or more sources based on one or more preferences, privacy settings and filtering of action or activity types, to store and process each user's said plurality of actions and activities in a database in image frame(s), video, streaming media or multimedia data format with contextual, relevant and location & position specific one or more actions or activities items & associate data and metadata, to determine receivers of action & activity feeds, to generate visual, video, stream media or multimedia actions and activities feeds for one or more actions or activities for one or more determined receiving users based on one or more filters, preferences and privacy settings of sender(s)/receiver(s) and/or receiver(s), wherein visual, video, stream media or multimedia actions and activities feeds comprises of one or more said actions or activities specific video clips or streaming and each corresponding action or activity specific contextual and relevant one or more actions or activities items & associate data and metadata, to dynamically present said visual or video actions and activities feeds from one or more sources or senders to one or more determined receiving or viewing users based on one or more filters, preferences and privacy settings of sender(s)/receiver(s), to allow viewing user or receiver to select, search, match, load, download, edit, filter, access, process and play, forward, backward, pause, stop said visual or video actions and activities feeds based on one or more preferences and settings, to dynamically present current image frame(s), video, stream or multimedia data position specific or action or activity item(s) video clip specific one or more contextual, associate and relevant action or activity item(s) with associate data and metadata, to allow viewing user or receivers to dynamically access said one or more presented dynamic, contextual, associate and relevant action or activity item(s) and associate data and metadata;

the sender or source of action or activity is enabled to perform one or more activities, to apply privacy settings, preferences and filters for monitoring, recording, processing, generating and sending action or activity feeds, to determine receivers of action & activity feeds;

the receiver or viewing user is enabled to apply privacy settings, preferences and filters for receiving action or activity feeds, to determine sources or senders for receiving action or activity feeds, to view and access visual or video actions and activities feeds from one or more sources or senders based on one or more filters, preferences and privacy settings of sender(s)/receiver(s), to select, search, match, load, download, edit, filter, access, process and play, forward, backward, pause, stop said visual or video actions and activities feeds based on one or more preferences and settings and to dynamically access said one or more presented dynamic, contextual, associate and relevant action or activity item(s) with associate data and metadata.

3. The method according to claim 1, wherein determining receivers of action & activity feeds comprising searching, auto matching & selecting one or more connected or matched or filtered users or groups of users, dynamic groups based on location, date & time, categories, activities, events, transactions, collaboration, action types, online presences or availability, connected users of connected users or one or more degrees of separations, subscribers or categories or lists of subscribers, verified & expert service providers, all users of network, broadcasting based on categories channels & schedule, determine by other users including user selected, connected, matched users and auto determining one or more action feed receivers by the central unit by auto match making of receivers based on action item(s) & associate metadata, subscribers, pull and push subscription preferences, user data, interest, behavior, affinity, relevancy, contextual, hits, ranks, weights, rules, sender/receiver matchmaking preferences including filters, conditions, rules, ranks, weights, categories, keywords, sender profiles, sender privacy settings, available receivers, receivers profiles, responses.

4. The method according to claim 1, wherein said activities & actions comprise user's actions, events, logs, transactions, interactions, behavior, motion, status, life stream including but not limited to adding a photo, editing a profile, posting a question, posting a blog, subscribing to a service, joining a network, installing an application, sharing content or search results, publishing or broadcasting, forming new relationships, interacting with other users, sending a notification or message, commenting, exchanging feedback, transacting via e-commerce, viewing television, reading digital e-book(s), sales transactions, like products and services, searching and viewing information, playing games, listening music and any types of activities and actions from one or more sources including present network/external domains, web sites, networks, devices, operating systems, applications, services and platforms.

5. The method according to claim 1, wherein sender or source and receiver or destination of action or activity feeds comprising present network/external domains, web sites, web pages, networks, devices, operating systems, applications, services, platforms, locations, social networks, databases, objects, registered or unregistered users, connected users of user, profile object, groups, communication networks, non-social networks, centralized or peer to peer networks, sensors, automations, communication systems, web services, multi artificial intelligence agent(s), speech or voice sources, translating system.

6. The method according to claim 1, wherein dynamic, contextual, & accessible active links associated or attached with said action & activity item enables sender(s)/receiver(s) to communicate, collaborate, edit, update, process, access, order, direct, consult, warning, alerts, notification, send something via courier, provide comments, assign jobs & tasks, provide alternative works or tasks to available users, fulfill workflow, provide service, purchase products & services, accept deals, negotiate with customers, guiding somebody, sharing photos, provide directions and location information, refer brands, products & services to connected users and allow them to buy products & services, teach how to play sports, prescribe medicines, share brands purchase or preferred or like by user, modify food prepared by cook as per customers requirements, send person for repairing, maintenance, training, helping, selling, preparing, guide based on user preferences, profile, interest, education, age and like, and takes any types of user actions.

7. The method according to claim 1, wherein said one or more contextual data, metadata and active links can dynamically integrated and superimpose with video action or activity feed and enables user to dynamically access said active links directly from action or activity video stream.

8. The method according to claim 1, wherein invoking active link(s) based on clicking via mouse, keyboards inputs, voice enabled command, touch input, auto invoking or presenting, invoking via remote controls, sensors, gestures, behaviors, infrared, RFID, human mind, and devices.

9. The method according to claim 1, wherein user can filter predetermined activities & actions based on one or more criteria comprising selection of one or more connected or like minded or matched users, groups, networks, applications, keywords, locations, languages, devices, activities or actions types, searching, matching, predefined schedule, rules, categories, behavioral characteristics, random filtering of said activities, tracking of activities, preferences, subscription, ranks & hits, interactions, privacy policies, automatically selected by the central unit based on selections, searching, matching, connections, relationships, affinity, location, events, transactions, life stream, levels, preferences, contents, profiles, transactions, life stream, behavior, privacy settings, one or more filters, ranks, rules, relevancy and context, random.

10. The method according to claim 1, wherein processing of said video or multimedia action & activity feeds comprising storing, updating, indexing, validating & formatting including editing, clarifying, update details, spell checking, language & spam detecting, translating, transcribing, converting to other formats like voice, text, video, multimedia data, media stream and image processing, editing and composition may be applied to the one or more clips including resizing, compressing, dynamic formatting as per application, device, preferences, internet connection speed, add & dynamically integrate and embedded multimedia data including video, sounds, audio, text, links or URLs, objects, applications, application features, image, attach or associate one or more advertisements may be added dynamically, associate system data, metadata, associating priority types including high, normal, low, expiration, date & time, categories, keywords, locations, advertisements, payment information, profile data, URL, dynamically attaching or associating one or more action or activity item specific accessible active links, metadata & system data, determining one or more receivers of action item(s) and applying privacy settings of sender, sender's domain, receiver and receiver's domain, and dynamic presentation preferences.

11. The method according to claim 1, wherein action(s) item(s) or generated action item(s) or associate data and metadata comprising accessible user name, identity, profile link whose actions are monitored, tracked & recorded, accessible action identity, action source(s) including present/external web site, social network, application, service, network, device, sensor, connected or related user, location and digital or automated sources, action date & time, action categories or types, action location(s), action details or descriptions, action associate one or more accessible active links, action associate one or more identified & accessible objects, applications, services, people, groups, networks, action related one or more accessible lists, accessible attachments, accessible multimedia data & content types including text, video, audio, image, file, application, service, URL or links, conditions, rules, structured list, action associate metadata including categories, keywords, ontology, taxonomies, system data, advertisement, privacy settings, preferences, one or more determined responders or receivers & profile object and identity of each determined responders or receivers, title or subject, sending priority types including high, normal, low, expiration date & time, sender user profile, location(s), language(s), size, source id, source profile(s), dynamically associated or attach one or more accessible services, applications, links, utilities & shared workspace link(s) for participate in the same activity as the sending user, take related actions, sharing, searching, tracking, communication, collaboration, accessing information and workflow, action source related availability status, tracking status, responses, communications, logs.

12. The method according to claim 1, wherein said active link comprising one or more applications, services, objects, multi AI agents, multimedia data & contents, people, networks, groups, links or URLs, ID, User Profiles, profile objects, pages, attachments, informational links, shared workspaces for collaboration from network/external domains, applications, networks, services and devices with one or more associate data.

13. The method according to claim 1, wherein said associate data of active link comprising URL or namespace of each active link for identifying and allowing to access active link associate objects, applications, services, media data, people, entities, identities, profile, group, network, page & other objects of network, active link related one or more metadata, categories, keywords, sources, providers, details, descriptions, properties, links, attachments, features, upload, created & use date & time, help, identifier & profile(s) of sender & receiver of active link, active link associate tracking status & status, active link associate object related user data and preferences, security policies, authentication information and privacy settings of accessing & sharing active link and active link associate object(s) related user data.

14. The method according to claim 1, wherein identifying, monitoring, tracking, recording, logging, storing, ranking, processing & presenting said one or more user defined and system generated actions on said each action item(s), related responses and active links with action date & time, action categories, user provided or auto recorded action related details, action related response & message, one or more action source(s) including people, applications, services, shared workspace, media data or contents, objects, groups, networks, pages, items, links and any action related identified objects from network/external domains, attachments, lists, tracking status, further communication details, ratings or ranks, comments and user provided/dynamically associated one more active links, services, objects, media data, shared workspaces and applications based on one or more filters & privacy settings.

15. The method according to claim 1, further comprising: tracking interaction of the user with the at least one of the plurality of action or activity item(s); and utilizing the interaction to present tracking status to user and generate or record one or more action or activity item(s).

16. The method according to claim 1, wherein said video streams or video clips or stream media or image frame(s) of digitized video data are real time or near real time, live, on demand, updated, converted, filtered, processed, dynamic, existing, pre-recorded, pre-loaded, series of still images, single image, merging and splitting of image frame(s) and video stream(s) or any formats including captured series of screenshots, FLV, MPEG, AVI, WMV, MOV formats, flash or a digitized version of an original analog image sequence and can be seen in two-dimensional and three-dimensional view(s).

17. The method according to claim 1, wherein said image frame(s) of video stream or of digitized video data of action or activity feed presentation has the capability to be merged with or video or series of video clips or media stream of action or activity feed can embedded or integrate with web services and interactive animation, runtime customization, HTML, DHTML, XML, embedded programming & scripting languages, multiple layers, graphics, images, visual system, text, multimedia data, voice technology, hyperlinks, file, audio, video and interactive programmable controls & components including tooltip, tab, toolbar, popup, grid, menu, calendar, button, input, navigation, transparent, list, database, resizing & graphical user interface and user can directly access video, streaming media position specific contextual and relevant one or more actions or activities items & associate, data and metadata including active links, associate applications, services, objects, groups, networks.

18. The system according to claim 2, wherein determining receivers of action & activity feeds comprises of search, auto match & select one or more connected or matched or filtered users or groups of users, dynamic groups based on location, date & time, categories, activities, events, transactions, collaboration, action types, online presences or availability, connected users of connected users or one or more degrees of separations, subscribers or categories or lists of subscribers, verified & expert service providers, all users of network, broadcasting based on categories channels & schedule, determine by other users including user selected, connected, matched users and auto determining one or more action feed receivers by the central unit by auto match making of receivers based on action item(s) & associate metadata, subscribers, pull and push subscription preferences, user data, interest, behavior, affinity, relevancy, contextual, hits, ranks, weights, rules, sender/receiver matchmaking preferences including filters, conditions, rules, ranks, weights, categories, keywords, sender profiles, sender privacy settings, available receivers, receivers profiles, responses.

19. The system according to claim 2, wherein said activities & actions comprise user's actions, events, logs, transactions, interactions, behavior, motion, status, life stream including but not limited to adding a photo, editing a profile, posting a question, posting a blog, subscribing to a service, joining a network, installing an application, sharing content or search results, publishing or broadcasting, forming new relationships, interacting with other users, sending a notification or message, commenting, exchanging feedback, transacting via e-commerce, viewing television, reading digital e-book(s), sales transactions, like products and services, searching and viewing information, playing games, listening music and any types of activities and actions from one or more sources including present network/external domains, web sites, networks, devices, operating systems, applications, services and platforms.

20. The system according to claim 2, wherein sender or source and receiver or destination of action or activity feeds comprising present network/external domains, web sites, web pages, networks, devices, operating systems, applications, services, platforms, locations, social networks, databases, objects, registered or unregistered users, connected users of user, profile object, groups, communication networks, non-social networks, centralized or peer to peer networks, sensors, automations, communication systems, web services, multi artificial intelligence agent(s), speech or voice sources, translating system.

21. The system according to claim 2, wherein dynamic, contextual, & accessible active links associated or attached with said action & activity item enables sender(s)/receiver(s) to communicate, collaborate, edit, update, process, access, order, direct, consult, warning, alerts, notification, send something via courier, provide comments, assign jobs & tasks, provide alternative works or tasks to available users, fulfill workflow, provide service, purchase products & services, accept deals, negotiate with customers, guiding somebody, sharing photos, provide directions and location information, refer brands, products & services to connected users and allow them to buy products & services, teach how to play sports, prescribe medicines, share brands purchase or preferred or like by user, modify food prepared by cook as per customers requirements, send person for repairing, maintenance, training, helping, selling, preparing, guide based on user preferences, profile, interest, education, age and like, and takes any types of user actions.

22. The system according to claim 2, wherein user is enable to dynamically access said one or more contextual data, metadata and active links directly from action or activity video stream which are dynamically integrated and superimpose with video action or activity feed.

23. The system according to claim 2, wherein invoking active link(s) based on clicking via mouse, keyboards inputs, voice enabled command, touch input, auto invoking or presenting, invoking via remote controls, sensors, gestures, behaviors, infrared, RFID, human mind, and devices.

24. The system according to claim 2, wherein user can filter predetermined activities & actions based on one or more criteria comprises of select one or more connected or like minded or matched users, groups, networks, applications, keywords, locations, languages, devices, activities or actions types, searching, matching, predefined schedule, rules, categories, behavioral characteristics, random filtering of said activities, tracking of activities, preferences, subscription, ranks & hits, interactions, privacy policies, automatically selected by the central unit based on selections, searching, matching, connections, relationships, affinity, location, events, transactions, life stream, levels, preferences, contents, profiles, transactions, life stream, behavior, privacy settings, one or more filters, ranks, rules, relevancy and context, random.

25. The system according to claim 2, wherein processing of said video or multimedia action & activity feeds comprises of store, update, index, validate & format including edit, clarify, update details, check spell, detect language & spam, translate, transcribe, convert to other formats like voice, text, video, multimedia data, media stream and process image, edit and composition may be applied to the one or more clips including resizing, compressing, dynamic formatting as per application, device, preferences, interne connection speed, add & dynamically integrate and embedded multimedia data including video, sounds, audio, text, links or URLs, objects, applications, application features, image, dynamically add, attach or associate one or more advertisements, system data, metadata, priority types including high, normal, low, expiration, date & time, categories, keywords, locations, advertisements, payment information, profile data, URL, dynamically attaching or associating one or more action or activity item specific accessible active links, metadata & system data, determining one or more receivers of action item(s) and applying privacy settings of sender, sender's domain, receiver and receiver's domain, and dynamic presentation preferences.

26. The system according to claim 2, wherein action(s) item(s) or generated action item(s) or associate data and metadata comprises of accessible user name, identity, profile link whose actions are monitored, tracked & recorded, accessible action identity, action source(s) including present/external web site, social network, application, service, network, device, sensor, connected or related user, location and digital or automated sources, action date & time, action categories or types, action location(s), action details or descriptions, action associate one or more accessible active links, action associate one or more identified & accessible objects, applications, services, people, groups, networks, action related one or more accessible lists, accessible attachments, accessible multimedia data & content types including text, video, audio, image, file, application, service, URL or links, conditions, rules, structured list, action associate metadata including categories, keywords, ontology, taxonomies, system data, advertisement, privacy settings, preferences, one or more determined responders or receivers & profile object and identity of each determined responders or receivers, title or subject, sending priority types including high, normal, low, expiration date & time, sender user profile, location(s), language(s), size, source id, source profile(s), dynamically associated or attach one or more accessible services, applications, links, utilities & shared workspace link(s) for participate in the same activity as the sending user, take related actions, sharing, searching, tracking, communication, collaboration, accessing information and workflow, action source related availability status, tracking status, responses, communications, logs.

27. The system according to claim 2, wherein said active link comprises of one or more applications, services, objects, multi AI agents, multimedia data & contents, people, networks, groups, links or URLs, ID, User Profiles, profile objects, pages, attachments, informational links, shared workspaces for collaboration from networks/external domains, applications, networks, services and devices with one or more associate data.

28. The system according to claim 2, wherein said associate data of active link comprises of URL or namespace of each active link for identifying and allowing to access active link associate objects, applications, services, media data, people, entities, identities, profile, group, network, page & other objects of network, active link related one or more metadata, categories, keywords, sources, providers, details, descriptions, properties, links, attachments, features, upload, created & use date & time, help, identifier & profile(s) of sender & receiver of active link, active link associate tracking status & status, active link associate object related user data and preferences, security policies, authentication information and privacy settings of accessing & sharing active link and active link associate object(s) related user data.

29. The system according to claim 2, wherein identify, monitor, track, record, log, store, rank, process & present said one or more user defined and system generated actions on said each action item(s), related responses and active links with action date & time, action categories, user provided or auto recorded action related details, action related response & message, one or more action source(s) including people, applications, services, shared workspace, media data or contents, objects, groups, networks, pages, items, links and any action related identified objects from network/external domains, attachments, lists, tracking status, further communication details, ratings or ranks, comments and user provided/dynamically associated one more active links, services, objects, media data, shared workspaces and applications based on one or more filters & privacy settings.

30. The system according to claim 2, further comprising: track interaction of the user with the at least one of the plurality of action or activity item(s); and
utilize the interaction to present tracking status to user and generate or record one or more action or activity item(s).

31. The system according to claim 2, wherein said video streams or video clips or stream media or image frame(s) of digitized video data are real time or near real time, live, on demand, updated, converted, filtered, processed, dynamic, existing, pre-recorded, pre-loaded, series of still images, single image, merging and splitting of image frame(s) and video stream(s) or any formats including captured series of screenshots, FLV, MPEG, AVI, WMV, MOV formats, flash or a digitized version of an original analog image sequence and can be seen in two-dimensional and three-dimensional view(s).

32. The system according to claim 2, wherein said image frame(s) of video stream or of digitized video data of action or activity feed presentation has the capability to be merged with or video or series of video clips or media stream of action or activity feed can embedded or integrate with web services and interactive animation, runtime customization, HTML, DHTML, XML, embedded programming & scripting languages, multiple layers, graphics, images, visual system, text, multimedia data, voice technology, hyperlinks, file, audio, video and interactive programmable controls & components including tooltip, tab, toolbar, popup, grid, menu, calendar, button, input, navigation, transparent, list, database, resizing & graphical user interface and user can directly access video, streaming media position specific contextual and relevant one or more actions or activities items & associate data and metadata including active links, associate applications, services, objects, groups, networks.

33. The method according to claim 3, wherein subscription can based on selections, send request or invite others, connections, contacts, search people, find friends from contacts, search sources from message(s) associate source(s), search subscribers & subscriptions of each public user, one or two way match making preferences, rules, conditions, categories, taxonomy wise directories, categories lists, auto match making based on preferences, profile, user data and user activities, actions, events & transactions, life stream.

34. The system according to claim 18, wherein subscription can based on selections, send request or invite others, connections, contacts, search people, find friends from contacts, search sources from message(s) associate source(s), search subscribers & subscriptions of each public user, one or two way match making preferences, rules, conditions, categories, taxonomy wise directories, categories lists, auto match making based on preferences, profile, user data and user activities, actions, events & transactions, life stream.

* * * * *